(12) United States Patent
Njar et al.

(10) Patent No.: US 12,528,776 B2
(45) Date of Patent: Jan. 20, 2026

(54) COMPOSITION AND METHOD FOR TREATING DERMATOLOGICAL DISORDERS USING RETINAMIDES

(71) Applicant: UNIVERSITY OF MARYLAND, Baltimore, Baltimore, MD (US)

(72) Inventors: Vincent C. O. Njar, Glen Burnie, MD (US); Senthilmurugan Ramalingam, Ellicott City, MD (US); Lalji K. Gediya, Rockville, MD (US); Hannah W. Mbatia, Cary, NC (US); Vidya P. Ramamurthy, Ellicott City, MD (US)

(73) Assignee: UNIVERSITY OF MARYLAND, BALTIMORE, Baltimore, MD (US)

( * ) Notice: Subject to any disclaimer, the term of this patent is extended or adjusted under 35 U.S.C. 154(b) by 838 days.

(21) Appl. No.: 17/787,065

(22) PCT Filed: Dec. 18, 2020

(86) PCT No.: PCT/US2020/066015
§ 371 (c)(1),
(2) Date: Jun. 17, 2022

(87) PCT Pub. No.: WO2021/127438
PCT Pub. Date: Jun. 24, 2021

(65) Prior Publication Data
US 2023/0114498 A1 Apr. 13, 2023

Related U.S. Application Data

(60) Provisional application No. 62/950,542, filed on Dec. 19, 2019.

(51) Int. Cl.
*C07D 233/56* (2006.01)
*A61K 31/203* (2006.01)
*A61K 31/4164* (2006.01)
*A61P 17/00* (2006.01)
*A61P 35/00* (2006.01)

(52) U.S. Cl.
CPC .......... *C07D 233/56* (2013.01); *A61P 17/00* (2018.01); *A61K 31/203* (2013.01); *A61K 31/4164* (2013.01); *A61P 35/00* (2018.01)

(58) Field of Classification Search
CPC .............. A61K 31/4164; A61K 31/203; A61P 17/00; A61P 35/00
See application file for complete search history.

(56) References Cited

U.S. PATENT DOCUMENTS

| | | | |
|---|---|---|---|
| 6,653,331 B2 | 11/2003 | Zhao et al. | |
| 9,156,792 B2 * | 10/2015 | Njar | C07D 251/02 |
| 10,793,525 B2 * | 10/2020 | Njar | A61K 31/203 |
| 2003/0109555 A1 | 6/2003 | Zhao et al. | |
| 2006/0105915 A1 | 5/2006 | Naleway et al. | |
| 2011/0059974 A1 | 3/2011 | Njar et al. | |
| 2019/0002411 A1 | 1/2019 | Njar et al. | |

FOREIGN PATENT DOCUMENTS

WO    WO-0203912 A2 *    1/2002    ........... C07C 323/61

OTHER PUBLICATIONS

International Search Report dated Mar. 23, 2021 in International (PCT) Application No. PCT/US2020/066015, and Written Opinion of the International Searching Authority dated Mar. 23, 2021.
The Second Office Action issued Jul. 27, 2024 in corresponding Chinese Patent Application No. 202080095988.8, with English translation.
Extended European Search Report issued Dec. 21, 2023 in corresponding European Patent Application No. 20901777.1.
V.C.O. Njar., "Cytochrome P450 Retinoic Acid 4-Hydroxylase Inhibitors: Potential Agents for Cancer Therapy", Mini Reviews in Medicinal Chemistry, vol. 2, pp. 261-269, 2002.
Vincent C.O. Njar et al., "Retinoic acid metabolism blocking agents (RAMBAs) for treatment of cancer and dermatological diseases", Bioorganic & Medicinal Chemistry, vol. 14, pp. 4323-4340, 2006.
Hannah W. Mbatia et al., "Novel C-4 Heteroaryl 13-cis-Retinamide Mnk/AR Degrading Agents Inhibit Cell Proliferation and Migration and Induce Apoptosis in Human Breast and Prostate Cancer Cells and Suppress Growth of MDA-MB-231 Human Breast and CWR22Rv1 Human Prostate Tumor Xenografts in Mice", Journal of Medicinal Chemistry, vol. 58, pp. 1900-1914, 2015.

* cited by examiner

*Primary Examiner* — Kevin E Weddington
(74) *Attorney, Agent, or Firm* — Wenderoth, Lind & Ponack, L.L.P.

(57) ABSTRACT

Novel retinamides with unique properties and biological activities, including inhibition of retinoic acid metabolism and modulation of Mnk1/2-eIF4E and androgen receptor (AR) signaling pathways, are synthesized and developed. The novel retinamides are capable of effecting treatment of a variety of dermatological conditions while limiting adverse side effects.

20 Claims, 10 Drawing Sheets

| Treatments: | GI$_{50}$ Values (µM) | Fold GI$_{50}$ Enhancement |
|---|---|---|
| ATRA | 63.09 | N/A |
| ATRA + VNLG-152 (40 nM) | 0.316 | 200 |
| 13-CRA | 75.85 | N/A |
| 13-CRA + VNLG-152 (40nM) | 0.616 | 123 |

A Untreated

SC→
SG→
SS→
SB→

B Vehicle (Ethanol)

C ATRA 0.02% solution

D 13 cis-RA 0.02% solution

COMPOSITION AND METHOD FOR TREATING DERMATOLOGICAL DISORDERS USING RETINAMIDES

CROSS-REFERENCE TO RELATED APPLICATIONS

This application is a national stage application filed under 35 U.S.C. § 371 of International application no. PCT/US2020/066015 filed Dec. 18, 2020, which claims priority to U.S. Provisional Application No. 62/950,542 filed Dec. 19, 2019, which is incorporated by reference in its entirety.

STATEMENT OF FEDERALLY SPONSORED RESEARCH AND DEVELOPMENT

This invention was made with government support under CA129379 awarded by the National Institutes of Health. The government has certain rights in the invention.

TECHNICAL FIELD

The present disclosure generally relates at least to the fields of medicine, molecular biology, and dermatology therapeutics. In particular, the disclosure relates to the treatment of various dermatological conditions using novel agents.

BACKGROUND

There continues to be the need for highly effective therapeutic agents for treating dermatological disorders, such as acne, eczema, psoriasis, ichthyosis, cold sores, wounds, burns, sunburns (photoaging) and skin cancers, that have no or limited side effects. The present inventors have discovered novel retinamides with unique properties and biological activities, including inhibition of retinoic acid metabolism and modulation of Mnk1/2-eIF4E and androgen receptor (AR) signaling pathways, that are capable of effecting treatment of a variety of dermatological diseases while limiting adverse side effects.

BRIEF SUMMARY OF INVENTION

The present disclosure provides a method of treating a dermatological condition. The method may comprise administering a pharmaceutical composition comprising a therapeutically effective amount of a first compound having the following General Formula 1A:

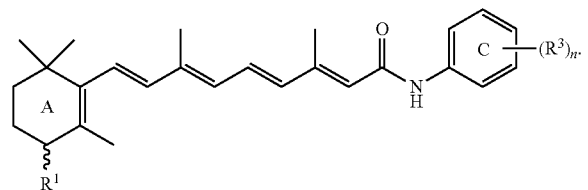

In some embodiments, $R^1$ in General Formula 1A may be an azole group, a sulfur-containing group, an oxygen-containing group, a nitrogen-containing group, a pyridyl group, an ethinyl group, a cyclopropyl-amine group, an ester group, a cyano group, a heteroaryl ring, or an 1H-midazole group, or $R^1$ forms, together with the C-4 carbon atom, an oxime, an oxirane or aziridine group. In some embodiments, $R^3$ in General Formula 1A may be independent from $R^1$, and is a halogen group, a cyano group, a thiol group, or an alkyl group substituted with at least one of a halogen group, a cyano group, and a thiol group. In some embodiments, n in General Formula 1A may be an integer from 0 to 5.

In some embodiments, $R^1$ in General Formula 1A may be an azole group.

In some embodiments, the first compound has the following General Formula 1A':

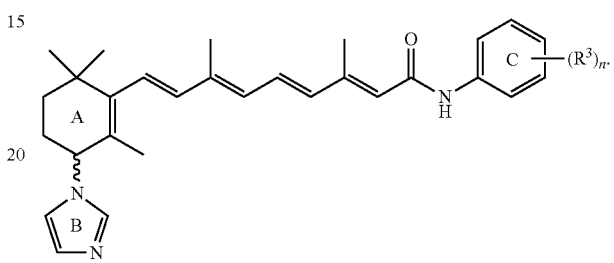

In some embodiments, $R^3$ in General Formula 1A' may be a halogen group, a cyano group, a thiol group, or an alkyl group substituted with at least one of a halogen group, a cyano group, and a thiol group. In some embodiments, n in General Formula 1A' may be an integer from 0 to 5.

In some embodiments, $R^3$ in General Formula 1A' may be a halogen group, and n may be an integer from 1 to 5.

In some embodiments, the first compound may be Compound VNLG-152 having the following formula:

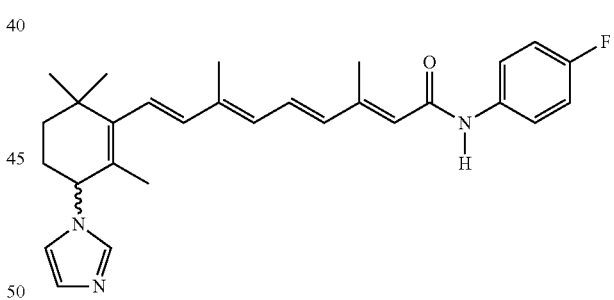

VNLG/152

In some embodiments, the dermatological condition may be one selected from the group consisting of acne, eczema, psoriasis, ichthyosis, cold sores, wounds, burns, sunburns, and skin cancers. In some embodiments, the dermatological condition may be acne.

In some embodiments, the pharmaceutical composition may be administered topically or orally.

In some embodiments, the pharmaceutical composition may further comprise at least one of all-trans-retinoic acid, 13-cis-retinoic acid, and 9-cis-retinoic acid.

In some embodiments, the pharmaceutical composition further comprises a second compound having the following General Formula 6:

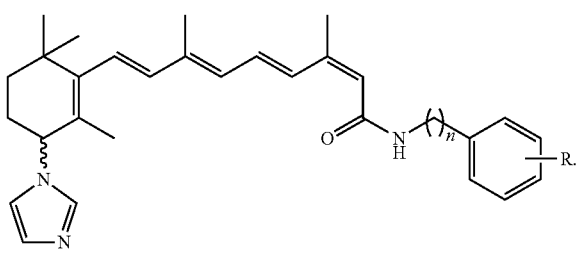

In some embodiments, R in General Formula 6 may be a benzyl group or a heterocyclic group that is mono-, di-, or tri-substituted at either at the para, meta, or ortho position with OH, OMe, CN, CO$_2$H, CO$_2$Me, SO$_2$NRH; imidazole; or 1H-tetrazole. In some embodiments, n in General Formula 6 may be an integer from 1 to 6.

In some embodiments, the second compound may be Compound VNHM-1-73 having the following formula:

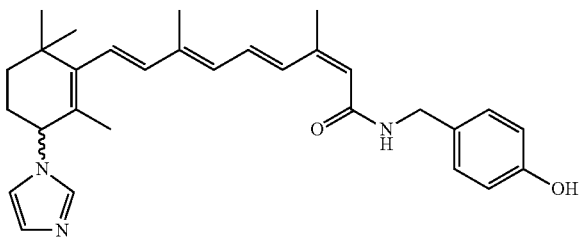 [SMILES: CC1=C(/C=C/C(C)=C/C=C/C(C)=C\C(=O)NCc2ccc(O)cc2)C(C)(C)CCC1n1ccnc1]

The present disclosure also provides a method of treating a dermatological condition, the method comprising administering a pharmaceutical composition comprising a therapeutically effective amount of a compound having the following General Formula 7:

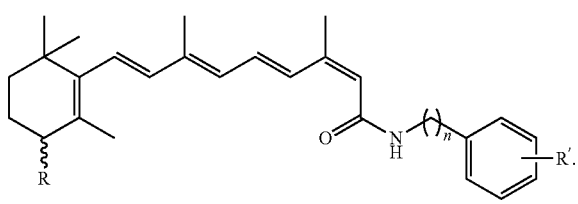

In some embodiments, R in General Formula 7 may be a heteroaryl group. In some embodiments, R' in General Formula 7 may be a hydrogen, a halide, a hydroxyl group, an alkyl group, an ester group, an ether group, a benzyl group, a thio group, a Weinreb amide group, or a heterocyclic group. In some embodiments, n in General Formula 7 may be an integer from 0 to 6.

In some embodiments, the compound may have the following General Formula 6:

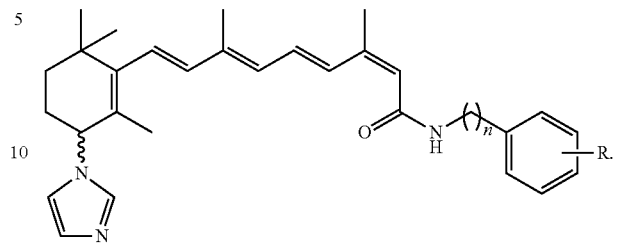

In some embodiments, R in General Formula 6 may be a benzyl group or a heterocyclic group that is mono-, di-, or tri-substituted at either at the para, meta, or ortho position with OH, OMe, CN, CO$_2$H, CO$_2$Me, SO$_2$NRH; imidazole; or 1H-tetrazole. In some embodiments, n in General Formula 6 may be an integer from 1 to 6.

In some embodiments, R may contain at least one —OH group.

In some embodiments, the compound may be Compound VNHM-1-73 having the following formula:

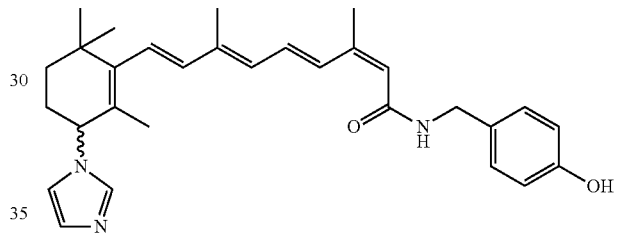

In some embodiments, the dermatological condition may be one selected from the group consisting of acne, eczema, psoriasis, ichthyosis, cold sores, wounds, burns, sunburns, and skin cancers. In some embodiments, the dermatological condition may be acne.

In some embodiments, the pharmaceutical composition may be administered topically or orally.

In some embodiments, the pharmaceutical composition may further comprise at least one of all-trans-retinoic acid, 13-cis-retinoic acid, and 9-cis-retinoic acid.

In some embodiments, the pharmaceutical composition may further comprise Compound VNLG-152 having the following formula:

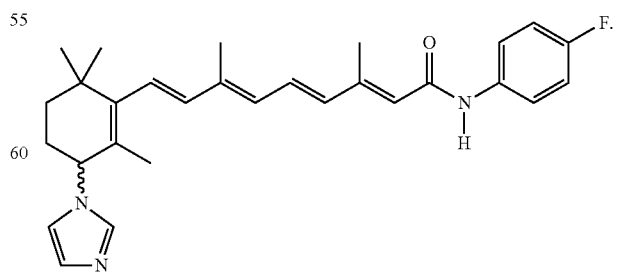

VNLG/152

BRIEF DESCRIPTIONS OF DRAWINGS

The subject matter that is regarded as the invention is particularly pointed out and distinctly claimed in the claims at the conclusion of the specification. The objects, features, and advantages of the present disclosure are apparent from the following detailed description taken in conjunction with the accompanying drawings in which:

FIGS. 1A and 1B show the growth inhibitory effects of retinamides according to the present disclosure and other retinoids in dermatologist human cell lines in vitro. FIG. 1A shows the growth inhibitory effects in adult normal human keratinocytes (NHAKs). FIG. 1B shows the growth inhibitory effects in SEB-1 human primary sebocytes.

FIGS. 2A and 2B show the anti-proliferative effects of all-trans-retinoic acid (ATRA) or 13-cis-retinoic acid (13-CRA), alone or in combination with low dose of a retinamide according to the present disclosure (namely, VNLG-152), on adult normal human keratinocytes (NHAKs). FIG. 2A shows the effects as dose-response curves. FIG. 2B shows the effects as fold $GI_{50}$ enhancements.

FIGS. 3A to 3C compare the apoptosis inducing potential of a retinamide according to the present disclosure (namely, VNLG-152) with that of ATRA and 13-CRA in keratinocytes. FIGS. 3A and 3B show acridine orange/ethidium bromide (AO/EB) dual staining images. FIG. 3C shows quantification of the number of apoptotic cells, the data being relative to vehicle treated control.

FIGS. 4A and 4B compare, via TUNEL assay, the apoptosis inducing potential of a retinamide according to the present disclosure (namely, VNLG-152) with that of ATRA and 13-CRA in keratinocytes. FIG. 4A shows images of increased TUNEL positive staining cells of control, 13-CRA, ATRA, and VNLG-152 treatments of adult normal human keratinocytes (NHAKs) at 72 hours. FIG. 4B shows quantification of the number of apoptotic cells, the data being relative to vehicle treated control.

DETAILED DESCRIPTION

Figure 1A:
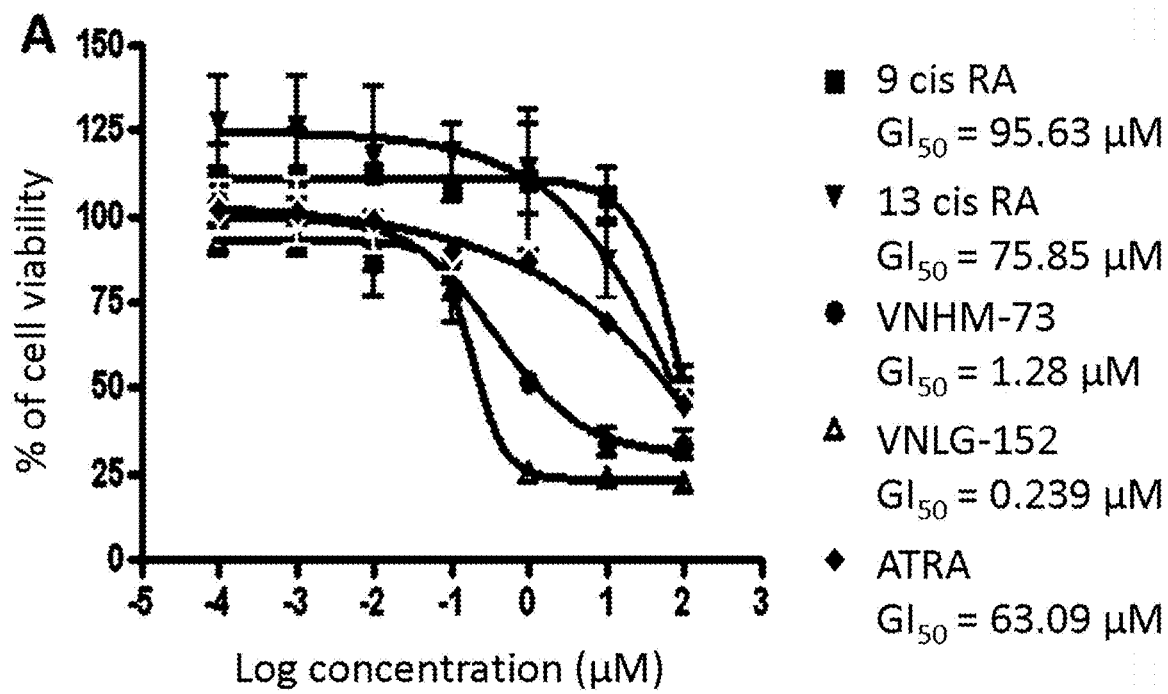

Dermatological disorders are characterized by hyperkeratinization and desquamation and include diseases such as acne, eczema, psoriasis, ichthyosis, cold sores, wounds, burns, sunburns (photoaging), and skin cancers,[21,72] all of which are plausible targets for the multitarget novel retinamides therapy according to the present disclosure.

Acne vulgaris, or more commonly, acne, is a skin disorder initiated by sebaceous gland hyperactivity and hyperseborrhea abnormal hyperproliferation of ductal keratinocytes and keratinization of the acroinfundibular epithelium of the sebaceous follicle and inflammatory signaling giving rise to microcomedones.[1] It is the most prevalent skin disease, affecting 40-50 million individuals of all races and ethnicities in the United States.[2,3] The pathogenesis of acne is multifactorial and originates at the pilosebaceous unit (PSU), which consists of sebaceous glands, an epithelial-lined follicular canal, and a hair.[4] It involves the interplay of four main factors: excess sebum production, disturbed keratinization within the follicle, colonization of the pilosebaceous duct by the oxygen-tolerant, anaerobic bacterium. *Propionibacterium acnes* (*P. acnes*), and the release of inflammatory mediators into the skin. Although individual acne lesions spontaneously regress, persistent cases of acne often require pharmacological intervention.[4]

Psoriasis is a common, chronic inflammatory skin disease that affects 2-3% of the population and is associated with a reduced quality of life and a shortened life expectancy due to the association with the metabolic syndrome and cardiovascular pathologies.[73,74] Although modern biologics targeting different inflammatory mediators show promising therapeutic success, comprehensive knowledge about the molecular events in psoriatic keratinocytes that contribute to the pathogenesis and could serve as therapeutic targets is still scarce.[75,76] However, recent efforts to understand the deregulated signal transduction pathways have led to the development of small molecule inhibitors, including, for example, tofacitinib targeting the Jak/Stat cascade that opens additional therapeutic options. Recently, the PI3-K/Akt/mTOR signaling pathway has emerged as an important player in the control of epidermal homeostasis.[77]

Atopic dermatitis (AD), also called eczema, is a chronically relapsing inflammatory skin disease. It is prevalent in approximately 10.7% and 7.2% of children and adults, respectively, in the United States.[78,79] The onset of AD is usually in early childhood, and it can have an impact on the entire family unit. Additionally, AD is increasingly recognized as a disease that often persists into or begins in adulthood.[80] Thus, AD can have a detrimental effect on the lives of patients and their families throughout the lifespan.[81] AD requires a manifold approach to therapy. The goal of therapy is to restore the function of the epidermal barrier and to reduce skin inflammation. This can be achieved with skin moisturization and topical anti-inflammatory agents, such as topical corticosteroids and calcineurin inhibitors. Furthermore, proactive therapy with twice weekly use of both topical corticosteroids and calcineurin inhibitors in previously affected areas has been found to reduce the time to the next eczematous flare.[82] Adjunctive treatment options include wet wrap therapy, anti-histamines, and vitamin. D supplementation.[82]

Ichthyoses comprise a large heterogenous group of inherited skin disorders resulting from abnormality of the keratinization process.[83,84] Lamellar ichthyosis (LI), a member of the nonsyndromic autosomal recessive congenital ichthyosis group of ichthyoses, has an incidence of 1~250,000 live births.[84,86] Patients with LI typically have severe generalized hyperkeratosis and dry scaly skin across the entire body, and the disorder is associated with decreased quality of life (QoL).[87,88] Treatment options for LI include mechanical scale removal, hydrating and lubricating creams or ointments and topical keratolytic drugs such as oral retinoids, and most recently, liarozole, a retinoic acid metabolism blocking agent (RAMBA).[89]

Skin Cancers comprise three principal types, including, squamous cell carcinoma (SCC), basal cell carcinoma (BCC) and melanoma.[90,91] These skin cancers are dangerous therapy-resistance cancers, while melanoma and SCC tend to aggressively metastasize. Although a host of therapeutic interventions have been attempted to treat these cancers, none is satisfactory. Thus, there is a pressing need for new strategies. There is compelling evidence that Supports the role of human eukaryotic translation initiation factor 4E (eIF4E; and by implication, Mnk1/2, which is the only know in vivo kinases of eIF4E) in skin cancer development, progression and therapy resistance.[92-94]

Other dermatological diseases, such as cold sores, wounds, burns, and sunburns (photoaging) are commonly driven inflammations, which are modulated by cellular levels of cytokines, retinoids, and androgens.

Retinoids are a group of natural and synthetic analogues of vitamin A. They comprise a family of polyisoprenoid compounds, and are currently the subject of intense biological interest prompted by the discovery and characterization of retinoid receptor and the realization of these compounds as nonsteroidal small-molecule hormones.[5] Since retinoids are capable of inhibiting growth, inducing terminal differentiation and apoptosis in cultured cancer cell lines, there is a wide interest in their use in not only cancer therapy, but also in treatments for dermatological diseases.[14]

Retinoids have been used to treat hyperproliferative skin disorders, particularly acne.[6,7] When used in pharmacotherapy of acne, retinoids help normalize the disturbed differentiation and hyperproliferation of the follicular epithelium, thereby preventing the formation of microcomedones and decreasing the formation of both inflammatory and non-inflammatory acne lesions. By normalizing differentiation and desquamation, topically administered retinoids also facilitate the entry of other topically applied agents such as antibiotics and benzoyl peroxide. (BPO) into the deeper parts of the pilosebaceous unit. Retinoids are also effective for the treatment of post-inflammatory hyperpigmentation which is particularly important for acne patients from darker racial ethnic groups.[8,9,10,11]

All-trans-retinoic acid (ATRA) is biologically the most active metabolite of vitamin A, and plays a major role in the regulation of gene expression, cellular differentiation, and proliferation of epithelia cells.[12] ATRA has been used in the treatment of dermatological diseases, including acne, psoriasis, and ichthyosis.[13] Retinoids, and particularly, ATRA and synthetic retinoids, potentiate anti-dermatological effects in dermatologic cells via modulation of sebum production. 9-cis-retinoic acid (9-CRA) and 13-cis-retinoic acid (13-CRA, isotretinoin) are two natural isomers of ATRA. The two isomers have demonstrated efficacy in treating hyperproliferative skin disorders, and in particular, 13-CRA has secured effective treatment of acne.[15] The anti-proliferative effect of isotretinoin on sebocytes is manifested through its isomerization into ATRA and binding to nuclear retinoic acid receptors.[16,17] The therapeutic effects of these retinoids are, however, limited. It has been suggested that the therapeutic effects of ATRA are undermined by its rapid in vivo metabolism and catabolism by cytochrome P450 enzymes.[18] To prevent in vivo catabolism of ATRA, the inhibition of the P450 enzymes responsible for this process has been proposed. This seems to be an emerging approach that may yield effective agents for chemoprevention and/or treatment of cancers and dermatological diseases.[19,20] A family of compounds known as retinoic acid metabolism blocking agents (RAMBAs) inhibit enzymes responsible for ATRA metabolism.

RAMBAs have demonstrated the ability to enhance the anti-proliferative effects of ATRA in breast and prostate cancer cells in vitro.[21] In addition, RAMBAs have been shown to induce differentiation and apoptosis in those cancer cell lines. The present inventors have observed that breast cancer cell lines were exquisitely more sensitive to RAMBAs.[21,22] By introduction of nucleophilic ligand at C-4 of ATRA or 13-CRA, and modification of the terminal carboxylic acid group, the present inventors invented a series of novel retinamides that are potent RAMBAs, some of which are by far the most potent retinoic acid metabolism inhibitors known. For example, the present inventors have designed, developed, and synthesized novel C-4 azolyl retinamides based on ATRA scaffold (see, for example, U.S. Pat. Nos. 7,265,143 and 9,156,792, the entire content of each of which is hereby incorporated by reference), and novel 13-cis-RAMBA retinamides (see, for example, U.S. Patent Publication No. 2019/0002411, the entire content of which is hereby incorporated by reference).

The present inventors have demonstrated that the RAMBAs, and in particular, the C-4 azolyl retinamides, inhibit the growth of several breast and prostate cancer cell lines and could exquisitely enhance the ATRA-mediated anti-proliferative activity in vitro and in vivo.[23,24,25] The C-4 azolyl retinamides induced apoptosis, potently inhibited the growth, migration and invasion of a variety of human breast and prostate cancer cell lines. The present inventors have shown that an exemplary C-4 azolyl retinamide—VN/14-1—binds and activates the RAR$\alpha,\beta,\gamma$ receptors, even though it is significantly less potent than ATRA. Furthermore, none of the RAMBAs show significant binding to either cellular retinoic binding proteins (CRABP I or II).[25] The present inventors have also demonstrated that some RAMBAs inhibit the growth of established breast and prostate tumor xenografts and that their mechanisms of action may in part be due to induction of differentiation, apoptosis, and cell cycle arrest.23,24,25,26 Some of the present inventors' proprietary RAMBAs appear to be the most potent ATRA metabolism inhibitors known.[21] Some of these proprietary RAMBAs also exhibit retinoidal and cell anti-proliferative activities in a number of human cancer cell lines.

With respect to the breast cancer cell lines, the present inventors have demonstrated that the anti-breast cancer activity of the retinamides was due mainly to degradation of MAPK-interacting kinases 1 and 2 (Mnk1/2) with subsequent suppression of phosphorylated eukaryotic translation initiation factor 4E (peIF4E).[27] However, in the prostate cancer cell lines, the present inventors have demonstrated that the anti-tumor activity of the retinamides was due to simultaneous inhibition of the Mnk/eIF4E and androgen receptor (AR) signaling pathways.[28]

Disruption and/or perturbation of cap-dependent translation is essential for the development of cancers and many fibrotic diseases, the most notable being Alzheimer's disease.[29] Hyper-activation of eIF4E, the mRNA 5' cap-binding protein of cap-dependent translation promotes exquisite transcript-specific translation of key mRNAs that are indispensable in cancer initiation, progression and metastases.[30] The oncogenic potential of eIF4E is dependent on serine 209 phosphorylation by Mnk1/2.

The present inventors have demonstrated that the 13-cis-RAMBA retinamides cause oxidative down-regulation of mitogen activated protein kinase interacting proteins (MNK1/2), block phosphorylation of eIF4E, induce apoptosis, inhibit cell growth and migration and invasion of triple negative and Her-2 overexpressing human breast cancer cells and rumor xenografts. These novel retinamides are agents for the prevention and treatment of all forms of breast and prostate cancers and other diseases which depend on functional Mnk1/2. These retinamides target Mnk1/2 degradation in both breast cancer and prostate cancer cells and also induce AR degradation in PC cells, which in turn led to induction of apoptosis, cell cycle arrest, inhibition of cell growth, colonization, migration, and invasion.

In most recent studies, the present inventors have demonstrated that the retinamide VNLG-152 inhibits f-AR/AR-V7 and Mnk-eIF4E signaling pathways to suppress EMT and castration-resistant prostate cancer xenograft growth. The also demonstrated that VNLG-152 potently inhibits triple negative breast cancer (TNBC) tumor growth and metastasis.

However, these studies do not address the use of the RAMBA retinamides to treat dermatological diseases. Further, even though the use of retinoids in the treatment of dermatological diseases has met with relatively satisfactory outcomes, side effects limit the chronic use of retinoids.[4] The need remains for highly effective therapeutic agents for treating dermatological disorders such as psoriasis, acne, atopic dermatitis (eczema), ichthyosis, skin cancers, and skin aging, with no or limited side effects.

The present inventors have developed a method of treating dermatological conditions using novel retinamides that work by blocking the intracellular metabolism of ATRA in cells.[21,24,25] The inhibition of ATRA metabolism results in increased intracellular ATRA, providing the same therapeutic benefits of retinoid therapy, but potentially with less risk of adverse side effects. One advantage of the novel retinamides according to the present disclosure over retinoids is believed to be the reduction or absence of birth defects.

The second potential advantage of the novel retinamides according to the present disclosure is their ability to also modulate intracellular androgen transactivation via induction of androgen receptor (AR) degradation.[28] Most dermatologist diseases, such as acne, psoriasis and ichthyosis are caused by interaction between hormones, skin oils, and bacteria which cause inflammation of sebaceous glands. Sebaceous glands are stimulated by increased hormone levels, especially, the androgens which are known to cause excessive sebum production and intracellular levels. The novel retinamides according to the present disclosure, by virtue of their ability to degrade AR act on the major cause of dermatological diseases to directly reduce the high levels of AR in the sebaceous glands, with concomitant lowering of sebum secretion.

The third potential advantage of the novel retinamides according to the present disclosure is their ability to induce degradation of MAPK (mitogen activated protein kinase) interacting kinases 1 and 2 (Mnk 1 and 2) with concomitant suppression of phosphorylation of eukaryotic initiation factor 4E (eIF4E).[27,28] These retinamides are agents for the prevention and treatment of all forms of breast and prostate cancers and other diseases that depend on functional Mnk1/2. Phosphorylation of eIF4E is implicated in the pathogenesis of psoriasis and is associated with increased release of pro-inflammatory cytokines from keratinocytes.

The fourth potential advantage of the novel retinamides according to the present disclosure is their ability to inhibit the signaling pathway involved in certain skin cancers. The PI3K/Akt/mTOR (phosphoinositide 3-kinase/protein kinase B/mechanistic target of rapamycin) pathway is an enzymatic cascade leading to cellular growth, proliferation, and survival. The main signal propagates along the path: PI3K→Akt→mTOR. Some skin cancers, including several forms of melanomas, have alterations at some point within this pathway. The PI3-K/Akt/mTOR signaling pathway has also emerged as an important player in the control of epidermal homeostasis.[77] The present inventors discovered that the novel retinamides according to the present disclosure possesses the biological activity of inhibiting mTOR Complex1 (mTORC1) signaling. For example, the present inventors discovered that compound VNLG-152 according to the present disclosure potently inhibits mTORC1/4E-BP1/p70SK6 signaling.[95]

The wide-ranging biological activities of the retinamides of the present disclosure make them ideal candidates for the treatment of dermatological conditions, including acne, eczema, psoriasis, ichthyosis, cold sores, wounds, burns, sunburns (photoaging), and skin cancers.

C-4 Azolyl Retinamide

The present inventors designed and synthesized C-4 azolyl retinamides for treating dermatological conditions. The C-4 azolyl retinamides are as described in U.S. Pat. Nos. 7,265,143 and 9,156,792, the entire content of each of which is hereby incorporated by reference.

In one embodiment of the present disclosure, the RAMBAs are without the phenolic hydroxyl group as shown in some of the RAMBAs of U.S. Pat. No. 7,265,143. Acylation presents a likely avenue for metabolic instability. 4-methoxyphenylretinamide has previously been identified as a major inactive metabolite of the closely related 4-hydroxyphenyl retinamide (4-HPR) in several animal and human studies[1,31].

In one embodiment of the present disclosure, the strategy for the RAMBAs is to replace the phenol moiety with a more metabolically stable functionality, with a goal of modulating the physical properties of these analogs without affecting the enzyme and anti-proliferative potencies already achieved by the RAMBAs of U.S. Pat. No. 7,265,143, for example, VN/66-1.

The RAMBAs for treating dermatological conditions include enantiomers of the novel RAMBAs of the present disclosure (structural formulae 1A, 2A, 2B, 3B, 3C and 4) and enantiomers of certain RAMBAs of U.S. Pat. No. 7,265,143.

Anilineamide RAMBAs

The phenolic hydroxyl moiety may be replaced with its classical isosteres, for example, halogens such as F and Cl, or non-classical bioisosteres, for example, —$CF_3$, —CN, and —$SH^{2,32}$.

General Formula 1A represents new anilineamide RAMBAs according to an embodiment of the present disclosure:

[General Formula 1A]

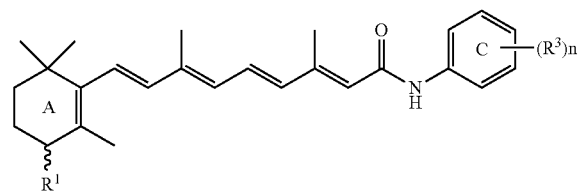

In General Formula 1A, $R^1$ is an azole group, a sulfur containing group, an oxygen containing group, a nitrogen containing group, a pyridyl group, an ethinyl group, a cyclopropyl-amine group, an ester group, a cyano group, a heteroaryl ring or an 1H-midazole group, or $R^1$ forms, together with the C-4 carbon atom, an oxime, an oxirane or aziridine group.

Each $R^3$ is independent from $R^1$, and is selected from a halogen group, a cyano group, a thiol group, or an alkyl group substituted with at least one of a halogen group, a cyano group, and a thiol group.

The n is from 0 to 5.

Non-limiting examples of sulfur containing groups include thiirane, thiol and alkylthiol derivatives. Examples of such alkylthiol derivatives include $C_1$ to $C_{10}$ alkyl thiols.

Non-limiting examples of oxygen containing groups include —$OR_4$, where $R_4$ is hydrogen or an alkyl group (preferably, a 1-10 carbon alkyl, more preferably, methyl or ethyl), cyclopropylether or an oxygen containing group that forms, together with the 4-position carbon, an oxirane group.

Non-limiting examples of nitrogen containing groups include the formula —$NR_5R_6$, where $R_5$ and $R_6$ are independently selected from the group consisting of hydrogen and alkyl groups (preferably, a 1-10 carbon alkyl, more preferably, methyl or ethyl), or $R_5$ and $R_6$ may together form a ring. Preferably, the ring formed by $R_5$ and $R_6$ is an imidazolyl ring or a triazole ring.

Azole substituent groups may be imidazoles and triazoles including attachment through a nitrogen ring atom. The azole substituent groups may be 1H-imidazole-1-yl, 1H-1,2,4-triazol-1-yl and 4H-1,2,4-triazol-1-yl.

$R^1$ may be cyano, amino, azido, cyclopropylamino, or $R^1$ may be a nitrogen containing group that forms, together with the 4-position carbon, an aziridine group or an oxime group.

$R^1$ may also be a pyridyl group or an allylic azole group, preferably methyleneazolyl.

$R^1$ may also be an ester group. The definitions for R1 of an ester include substituent groups that contain an ester moiety, including substituent groups attached via an ester moiety.

Non-limiting examples of the alkyl group include linear and branched alkyl groups, including primary, secondary and tertiary alkyl groups, and substituted and unsubstituted alkyl groups.

The $R^3$ substituent groups may be F, —CN, —SR and —$CF_3$.

Am example of General Formula 1A is General Formula 1A':

[General Formula 1A']

In General Formula 1A', $R^3$ and n are as defined for General Formula 1A.

Exemplary compounds of General Formula 1A are Compounds VNLG-146, VNLG-153, and Compounds 1 to 30, shown below:

[Compound VNLG-146]

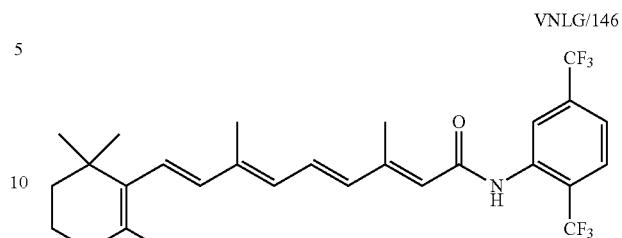

[Compound VNLG-153]

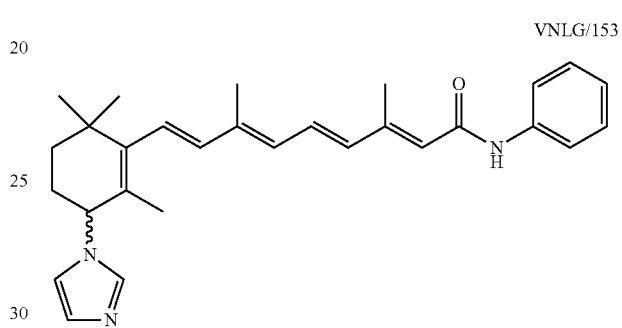

[Compound 1]

[Compound 2]

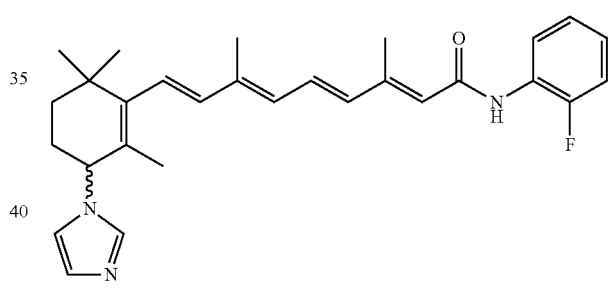

[Compound 3]

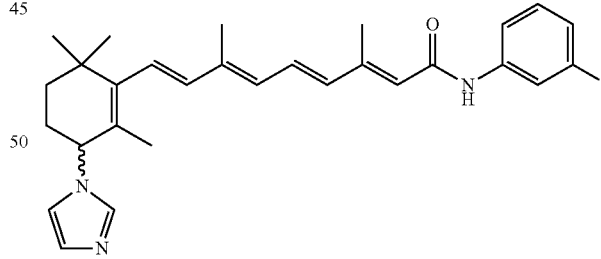

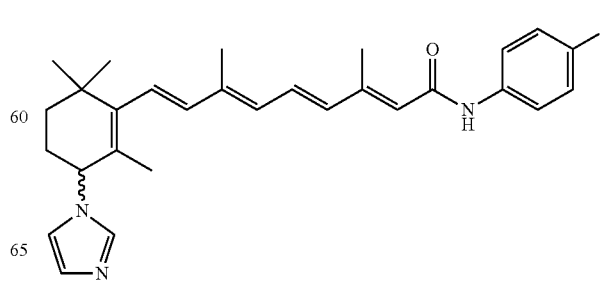

[Compound 4]
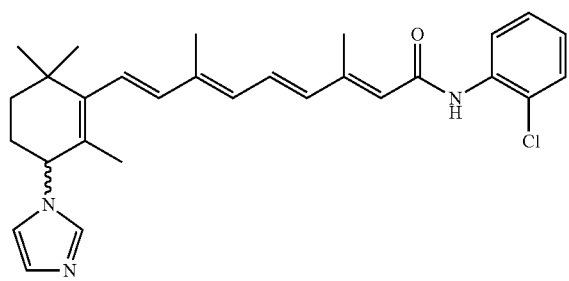
[Compound 5]
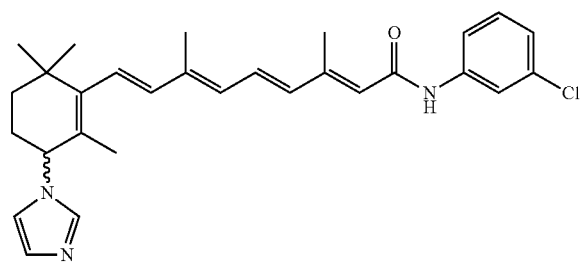
[Compound 6]
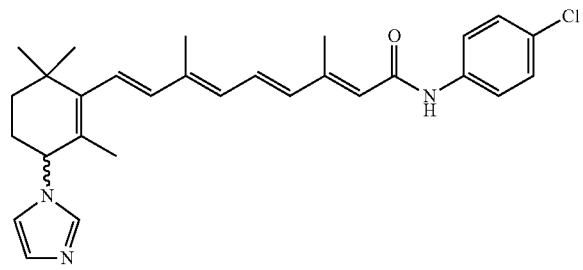
[Compound 7]
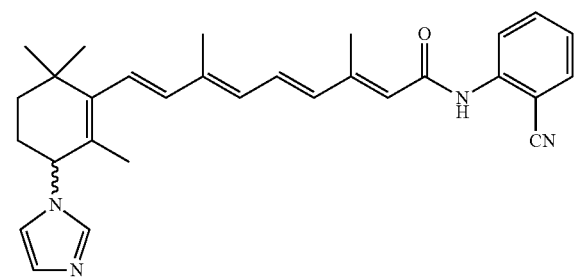
[Compound 8]
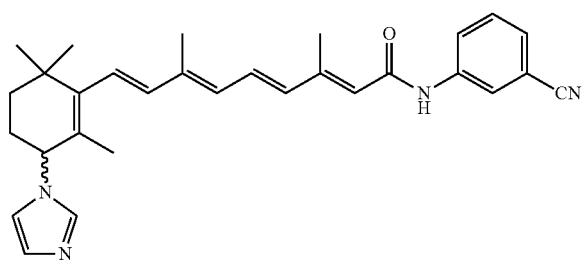
[Compound 9]
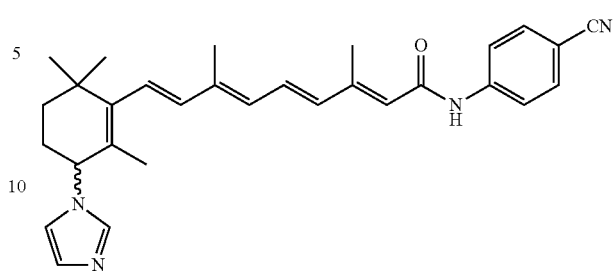
[Compound 10]
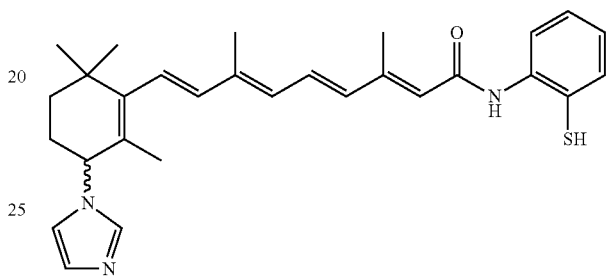
[Compound 11]
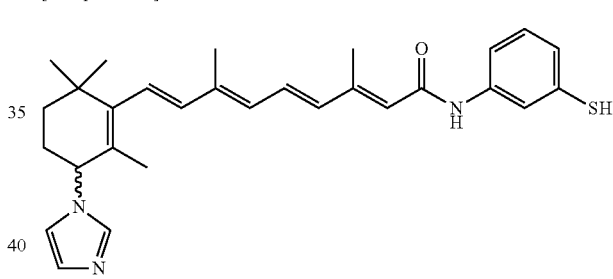
[Compound 12]
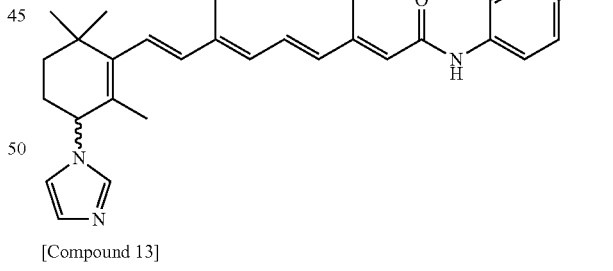
[Compound 13]
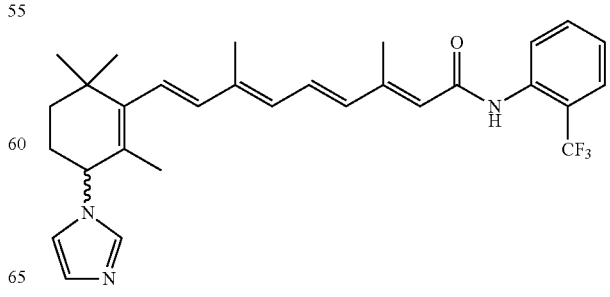

[Compound 14]
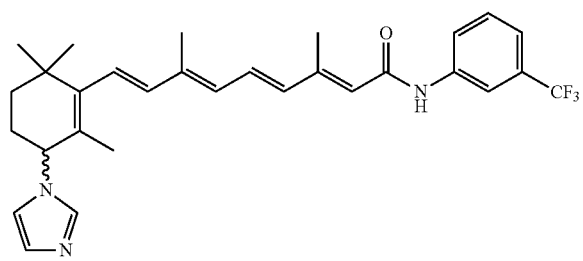
[Compound 15]
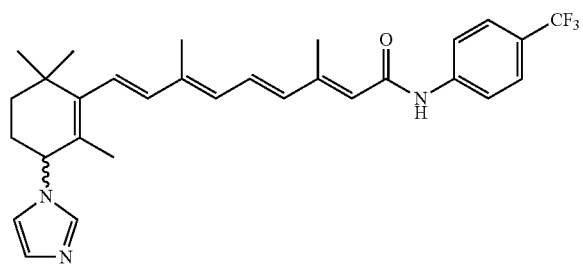
[Compound 16]
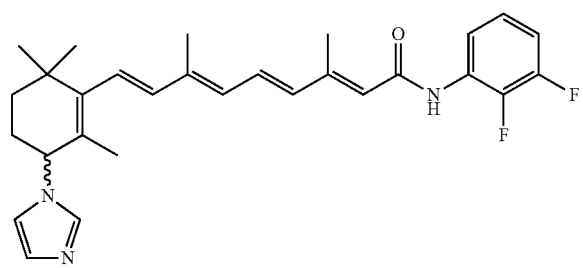
[Compound 17]
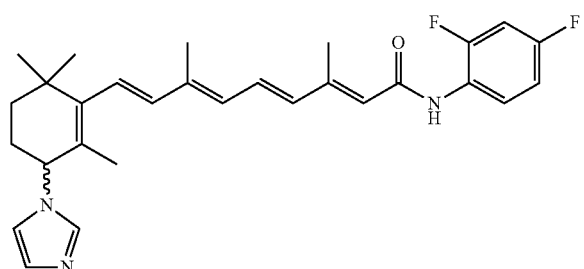
[Compound 18]
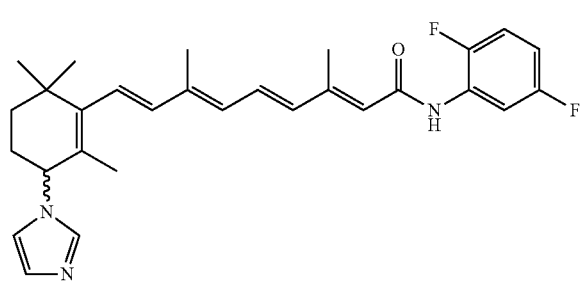
[Compound 19]
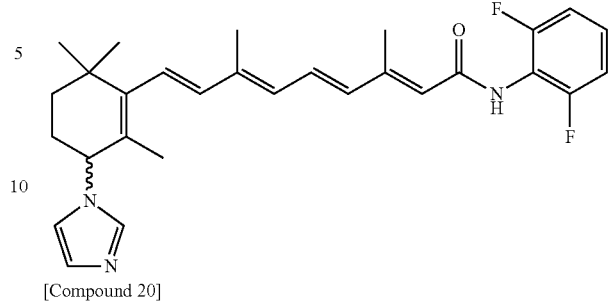
[Compound 20]
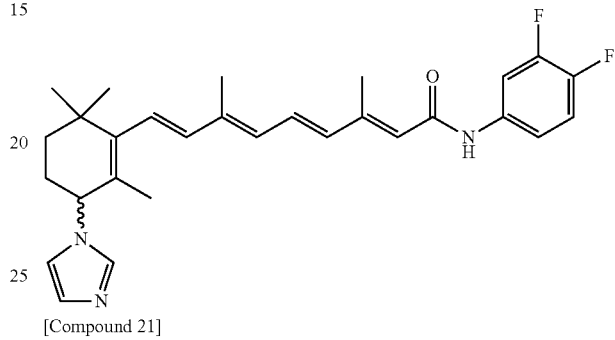
[Compound 21]
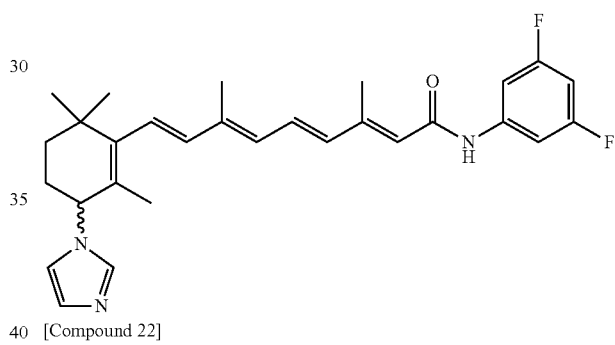
[Compound 22]
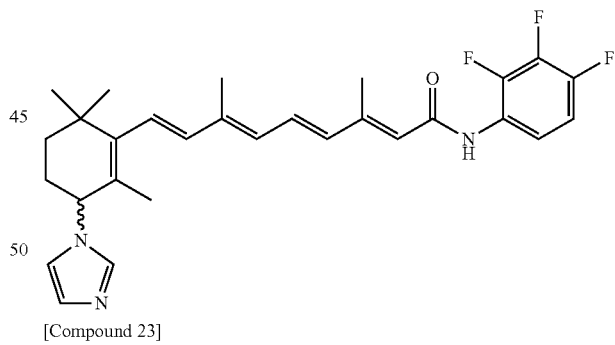
[Compound 23]
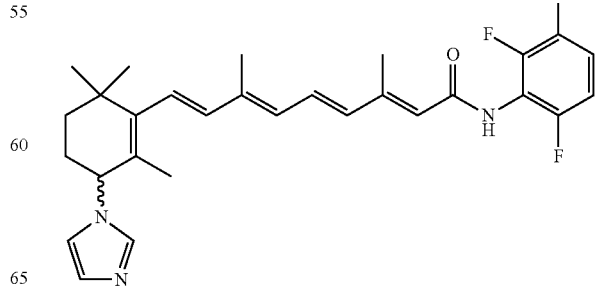

[Compound 24]

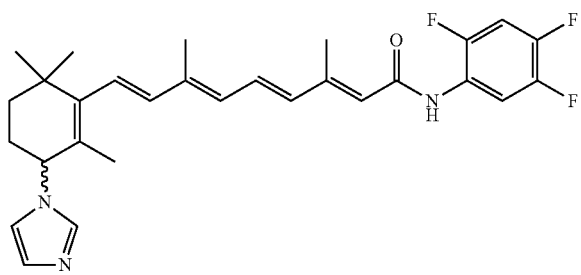

[Compound 25]

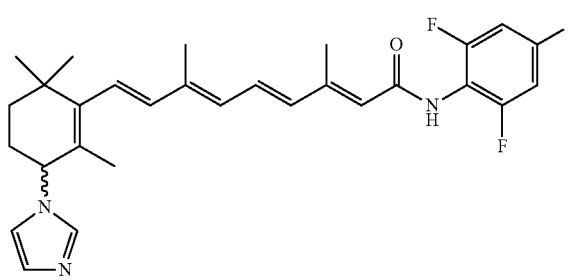

[Compound 26]

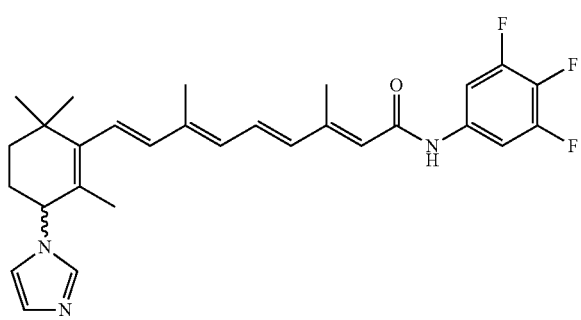

[Compound 27]

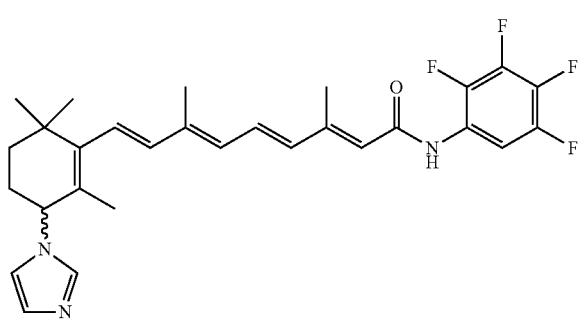

[Compound 28]

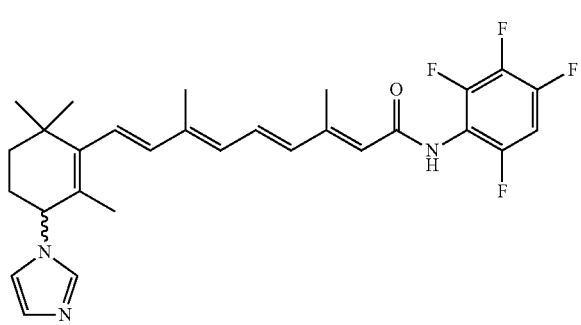

[Compound 29]

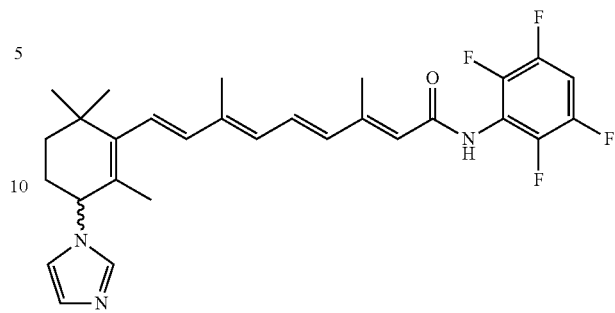

[Compound 30]

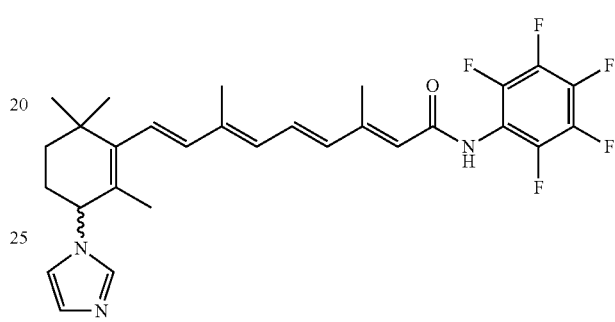

Scheme 1 and Scheme 2 below are examples of the syntheses of the anilineamide RAMBAs. The examples involve the coupling of the imidazolyl carboxylic acid (VN/14-1) with various amines (for example, anilines) using 3-dicyclohexylcarbodiimide (DCC) and 1-hydroxybenzotriazole (HOBT) in dimethylformamide (DMF) to yield the corresponding amides. This synthesis has been used for synthesis of VNLG-145, VNLG-146, VNLG-147, VNLG-148, VNLG-152, and VNLG-153 and VN-66-1.

Scheme 1

VNLG-14-1
+
NHR (various amines)

Scheme 2
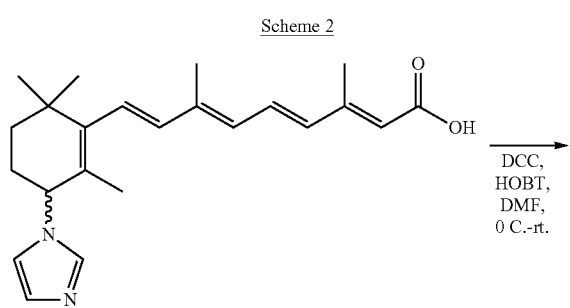
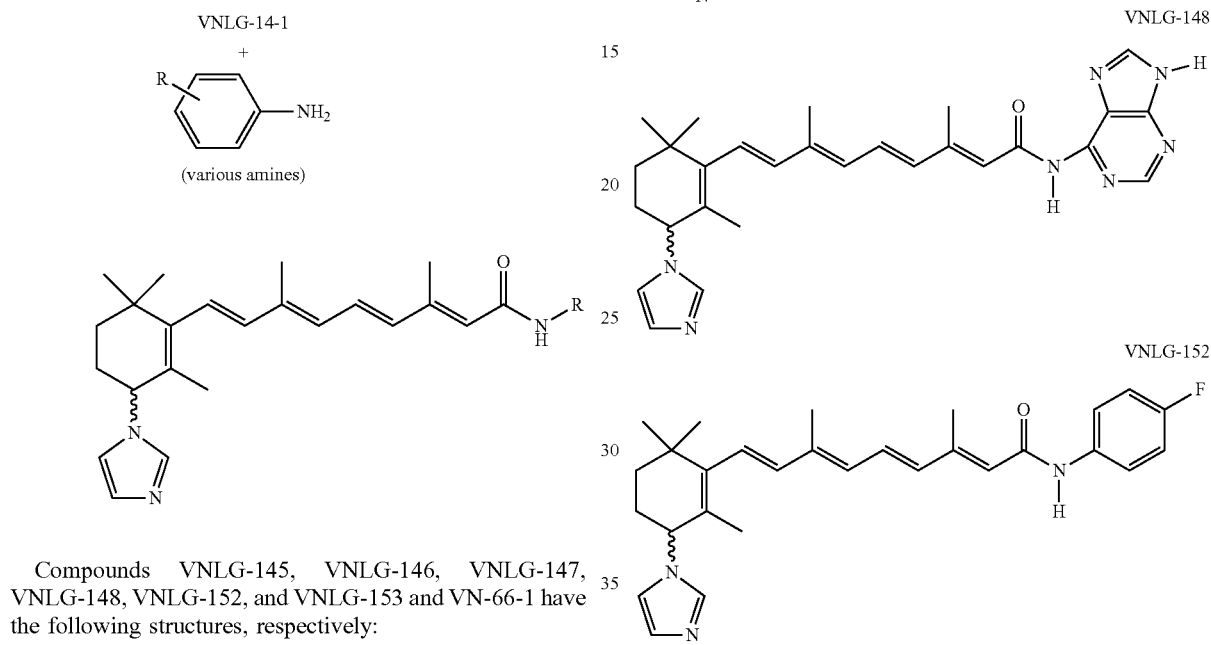
Compounds VNLG-145, VNLG-146, VNLG-147, VNLG-148, VNLG-152, and VNLG-153 and VN-66-1 have the following structures, respectively:
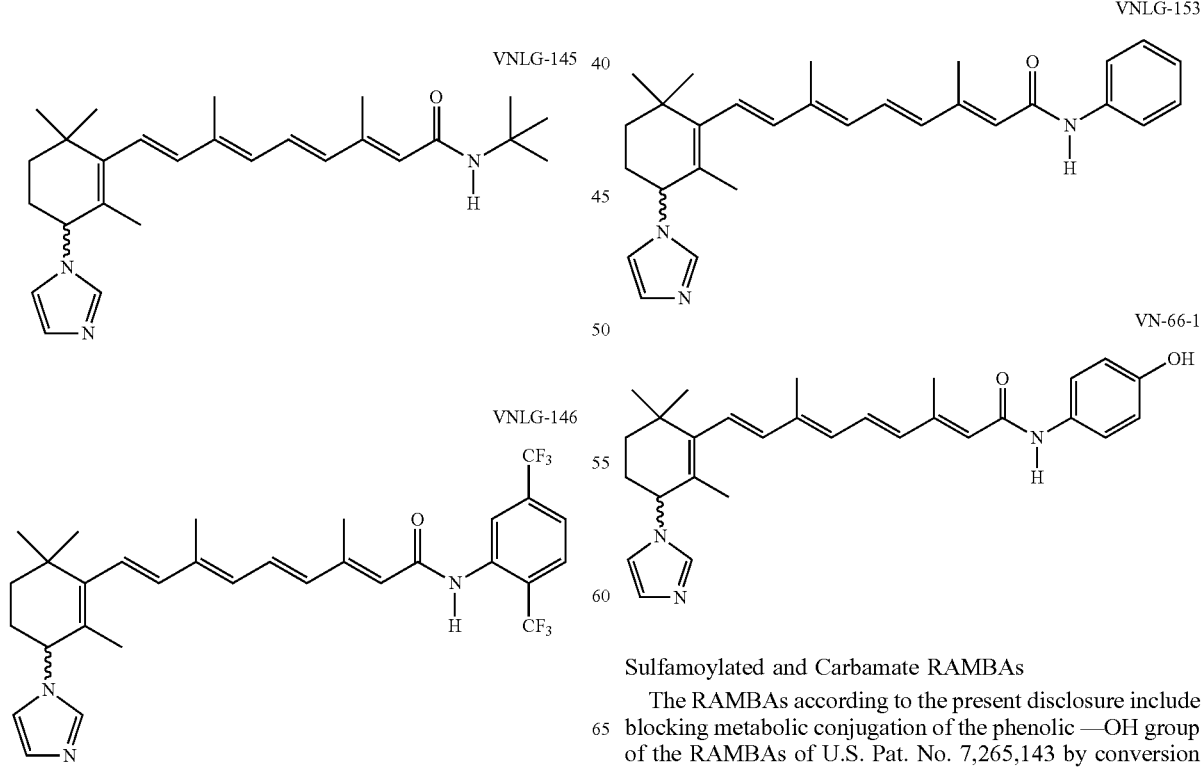
Sulfamoylated and Carbamate RAMBAs
The RAMBAs according to the present disclosure include blocking metabolic conjugation of the phenolic —OH group of the RAMBAs of U.S. Pat. No. 7,265,143 by conversion to a corresponding sulfamate and carbamate. This strategy has been successfully used to improve the antiproliferative activity and metabolic stability of 2-methoxyestradiol,[33,34,35,36] [3-6] as well as several dual aromatase steroid sulfatase inhibitors, some of which have been tested in phase I clinical trials[7,8] [37,38].

The RAMBAs according to the present disclosure include sulfamoylated and carbamate RAMBAS represented by General Formulae 2A and 2B:

[General Formula 2A]

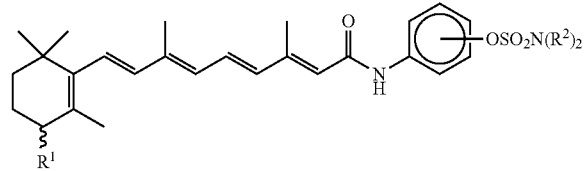

In General Formula 2A, $R^1$ has the same definitions as set forth for General Formula 2A above. Each $R^2$ is independent and is a hydrogen or an alkyl group. Non-limiting examples of the alkyl group include linear and branched alkyl groups, including primary, secondary and tertiary alkyl groups, and substituted and unsubstituted alkyl groups.

[General Formula 2B]

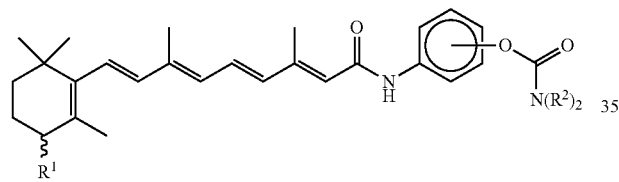

In General Formula 2B, $R^1$ and $R^2$ have the same definitions as set forth for General Formula 2A above.

Non-limiting examples of General Formulae 2A and 2B include General Formulae 2A', 2B', 2A" and 2B" below:

[General Formula 2A']

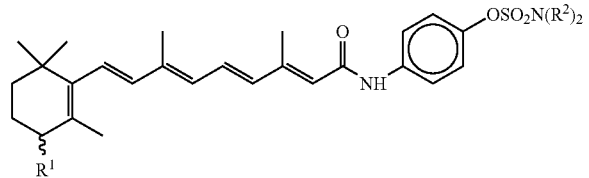

[General Formula 2B']

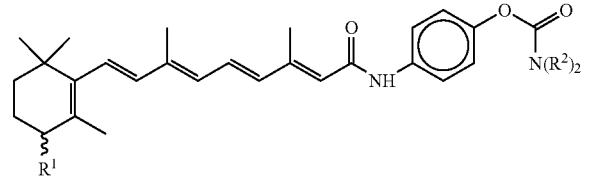

[General Formula 2A"]

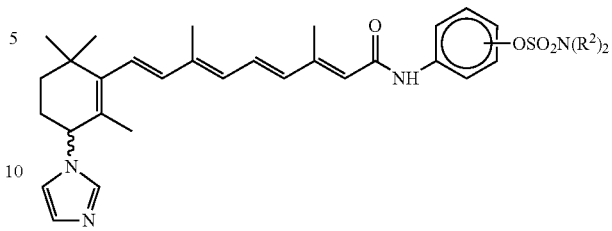

[General Formula 2B"]

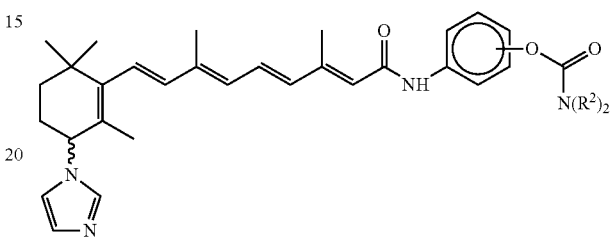

In General Formulae 2A', 2B', 2A" and 2B", $R^1$ and $R^2$ have the same definitions as set forth for General Formula 2A above.

Non-limiting examples of General Formulae 2A and 2B include Compounds 31 and 32 below:

[Compound 31]

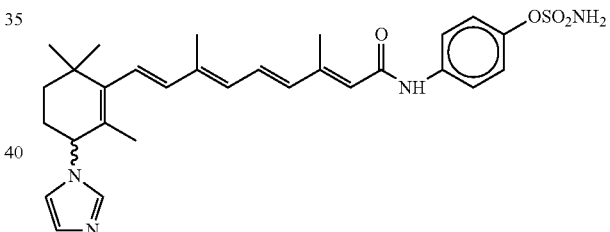

[Compound 32]

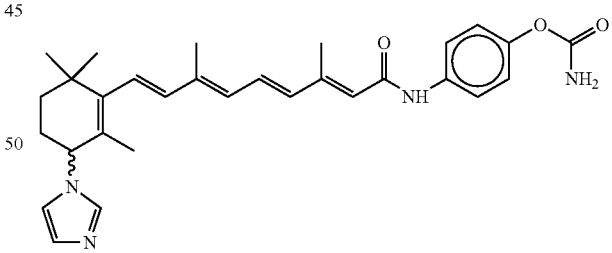

Scheme 3 below shows an example of the synthesis of Compounds 31 and 32. VN-66-1 may be sulfamoylated under standard conditions,[34,35] with sulfomoyl chloride in dimethyl acetamide to give Compound 31. The carbamate (Compound 32) may be synthesized in two steps from VN/66-1, first reacted with trichloroacetyl isocyanate to give the N-trichloroacetyl carbamate, followed by hydrolysis with $K_2CO_3$ MeOH/THF/$H_2O$) to give Compound 32. N,N-dialkyl derivatives of Compounds 31 and 32 may be synthesized by reaction with appropriate alkyl halides under basic conditions.[35]

Scheme 3: Synthesis of Compounds 34 and 35

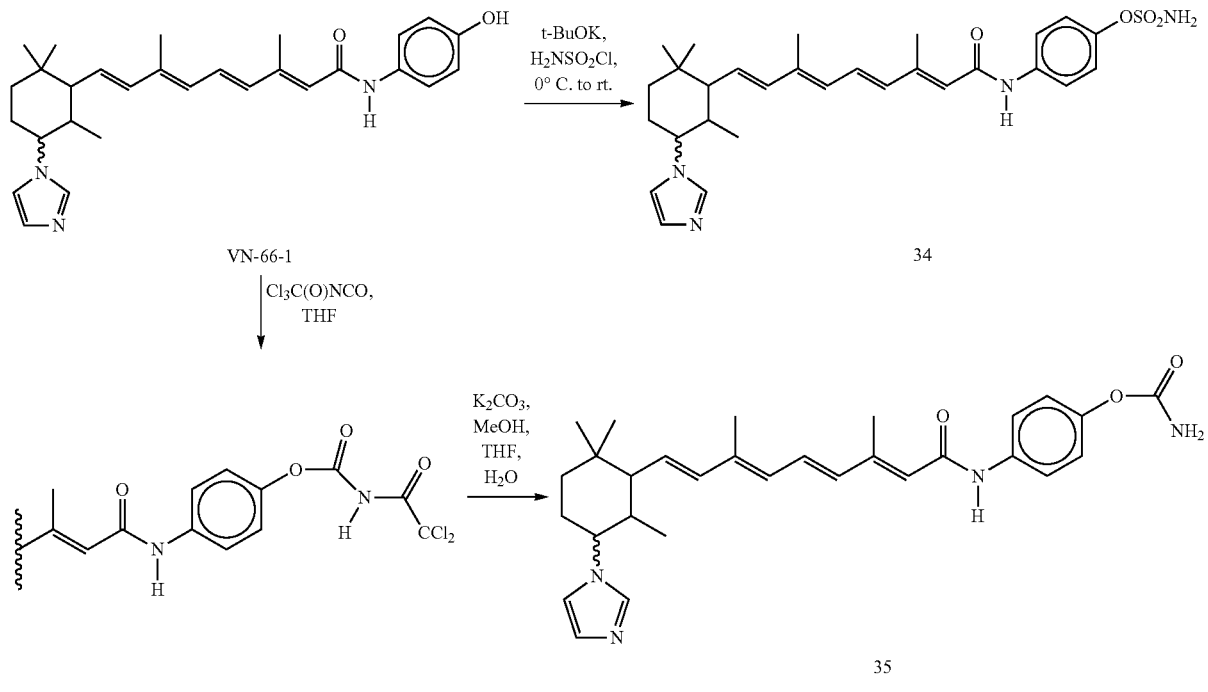

Heterocyclic Amide RAMBAs

The RAMBAs according to the present disclosure include heterocyclic amine-containing RAMBAs represented by General Formulae 3B and 3C:

[General Formula 3B]

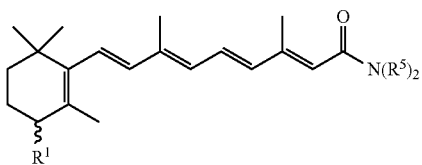

In General Formula 3B, $R^1$ has the same definitions as set forth for General Formula 1A above. Each $R^5$ is independently selected from a hydrogen atom, an alkyl group, and a ring containing a nitrogen atom.

Non-limiting examples of the ring containing a nitrogen atom include monocyclic and multicyclic rings, which consist of carbon atoms and one or more nitrogen atoms. The rings may also include other heterocyclic atoms, such as O, S and Si. The rings may be substituted or unsubstituted. Non-limiting examples of the ring containing a nitrogen atom include an amine group, an azine group, a triazine group, an azirene group, an azete group, an diazetidine group, an azole group, a triazole group, a tetrazole group, an imidazole group, an azocane group, a pyridine group, piperidine group, benzimidazole group, and purine groups. The ring containing a nitrogen atom may be substituted or unsubstituted and may be fused with another ring. The ring containing a nitrogen atom may be attached to the nitrogen atom via a carbon group or via a nitrogen group of the ring.

Non-limiting examples of the ring containing a nitrogen atom include 2,3,4 triazoles, 1,3 imidazoles, and 2,3,4,5 tetrazole.

Non-limiting examples of the alkyl group include linear and branched alkyl groups, including primary, secondary and tertiary alkyl groups, and substituted and unsubstituted alkyl groups. A non-limiting example is a tertiary butyl group.

[General Formula 3C]

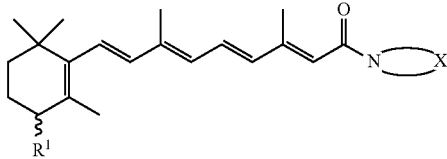

In General Formula 3C, $R^1$ has the same definitions as set forth for General Formula 1A above. X forms, together with the nitrogen atom, a heterocyclic ring. The heterocyclic ring may be substituted or unsubstituted and may be fused with another ring.

Non-limiting examples of the ring formed by X include monocyclic and multicyclic rings, which consist of carbon atoms and one or more nitrogen atoms. The rings may also include other heterocyclic atoms, such as O, S and Si. The rings may be substituted or unsubstituted. Non-limiting examples of the ring formed by X atom include an amine group, an azine group, a triazine group, an azirene group, an azete group, an diazetidine group, an azole group, a triazole group, a tetrazole group, an imidazole group, an azocane group, a pyridine group, piperidine group, benzimidazole group, and purine groups.

The fused ring may contain all ring carbon atoms or be heterocyclic.

Non-limiting examples of a fused heterocyclic rings include a purine group.

Non-limiting examples of General Formulae 3B and 3C include General Formulae 3A, 3B' and 3C' below:

[General Formula 3A]

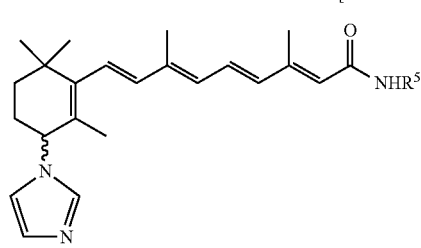

In General Formula 3A, $R^5$ has the same definitions as set forth for $R^5$ in General Formula 3B above.

[General Formula 3B']

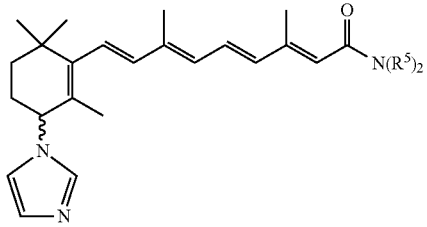

In General Formula 3B, $R^5$ and n have the same definitions as set forth for General Formula 3B above.

[General Formula 3C']

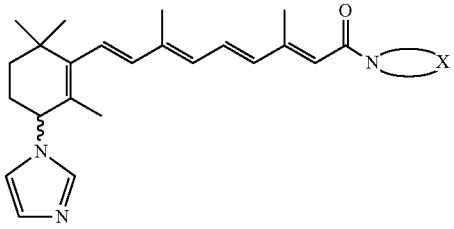

In General Formula 3C', X has the same definitions as set forth for Formula 3C above.

Non-limiting exemplary compounds of General Formulae 3B and 3C include Compounds 33 to 45, VNLG-148, and VNLG-145 shown below:

[Compound 33]

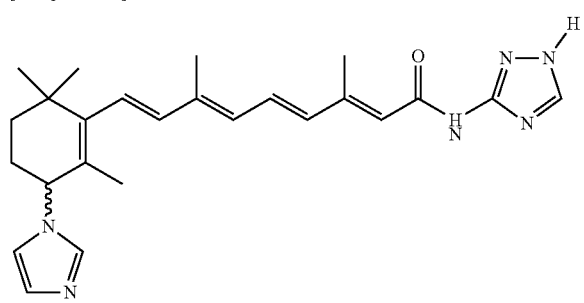

[Compound 34]

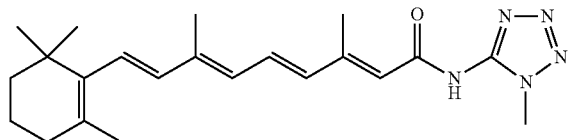

[Compound 35]

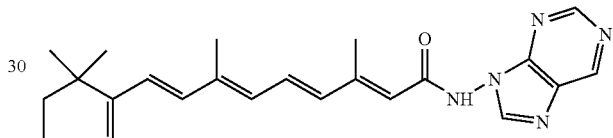

[Compound 36B]

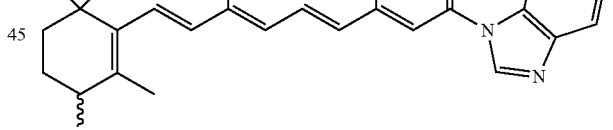

[Compound 36C]

[Compound 37B]

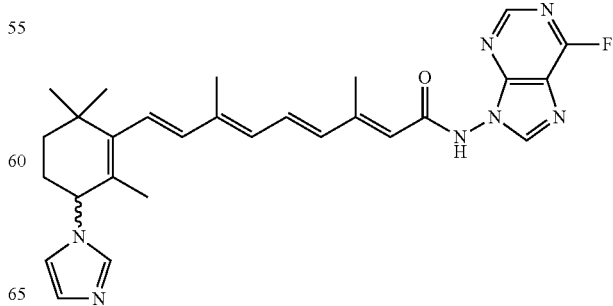

[Compound 37C]
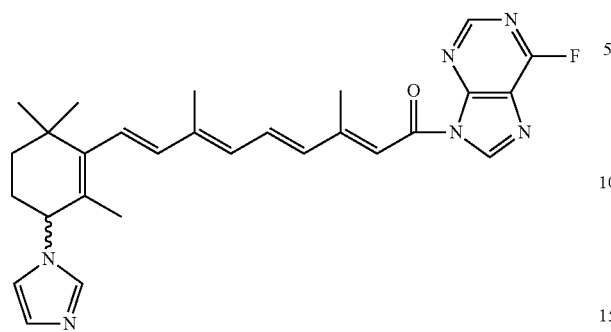
[Compound 38B]
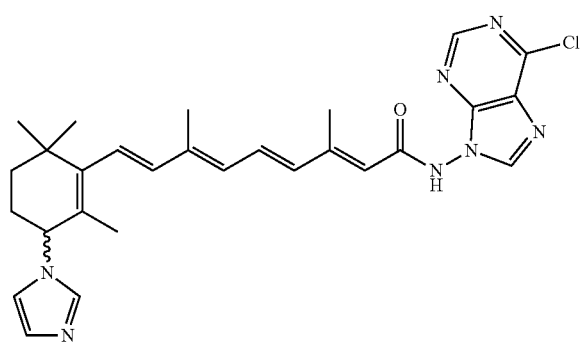
[Compound 38C]
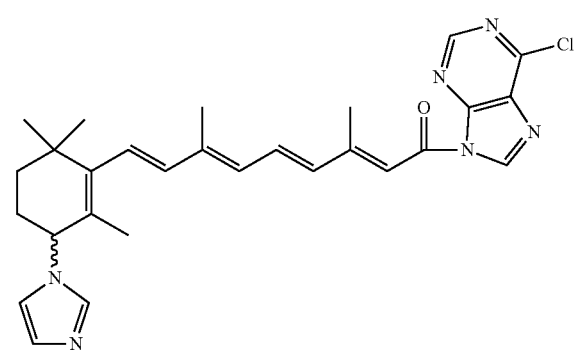
[Compound 39B]
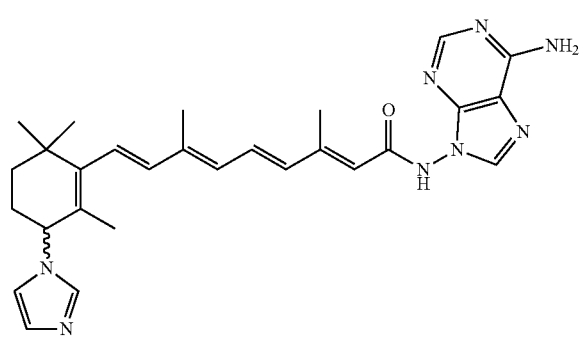
[Compound 39C]
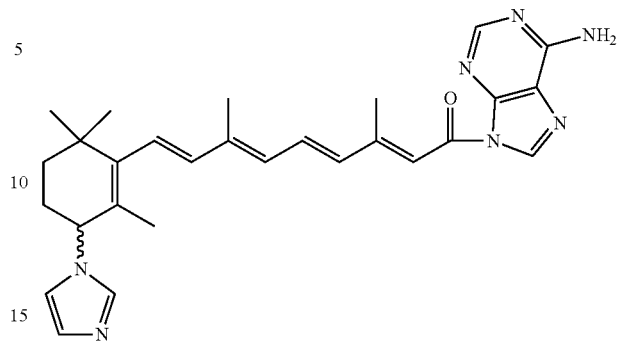
[Compound 40B]
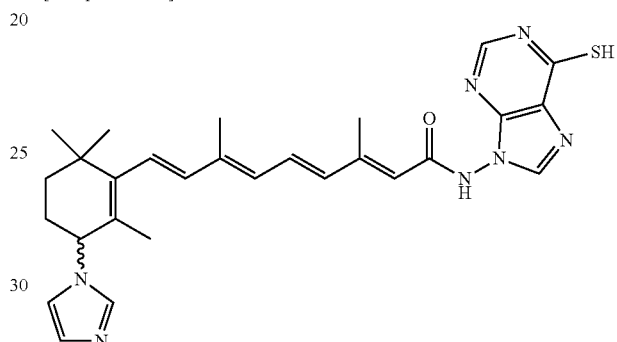
[Compound 40C]
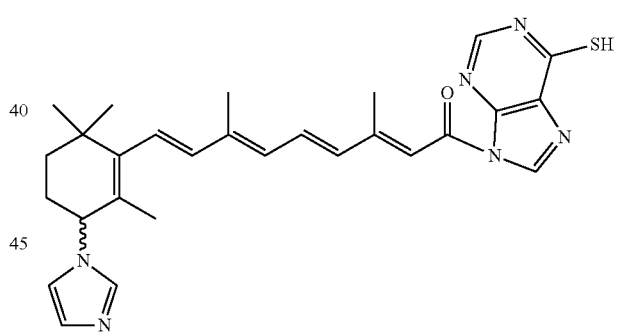
[Compound 41B]
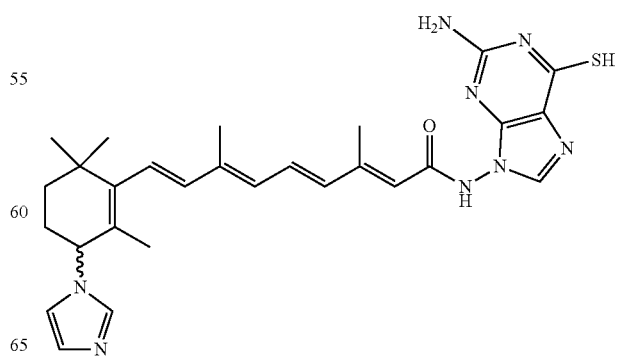

[Compound 41C]
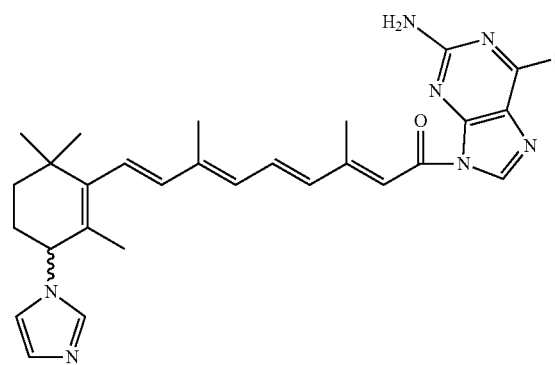
[Compound 43C]
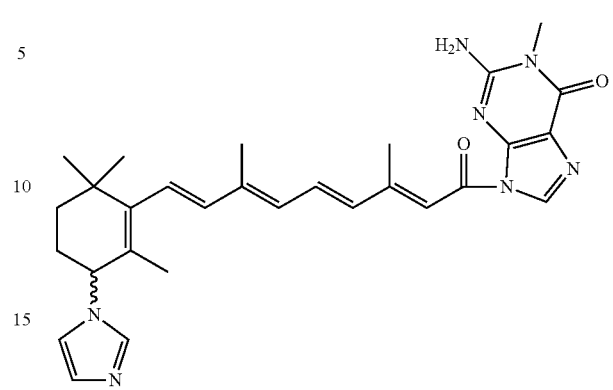
[Compound 42B]
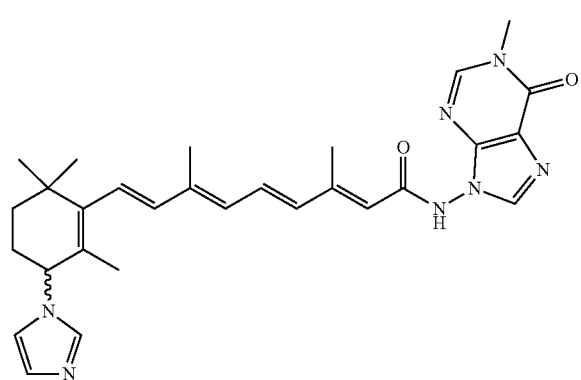
[Compound 43D]
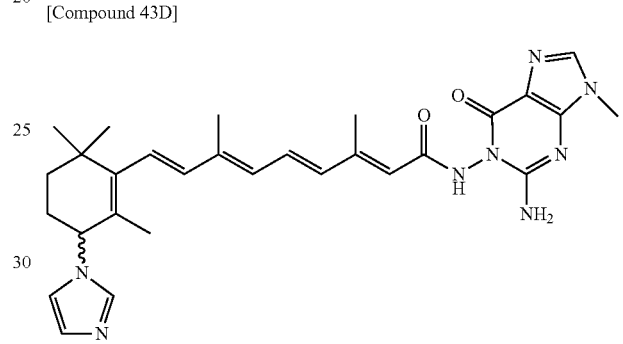
[Compound 43E]
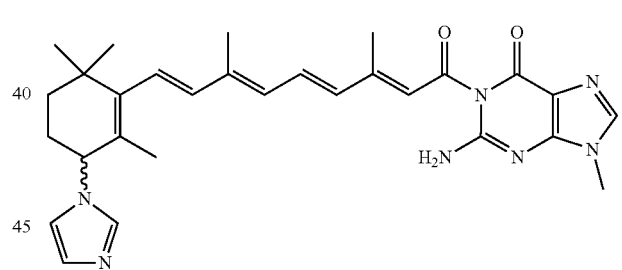
[Compound 42D]
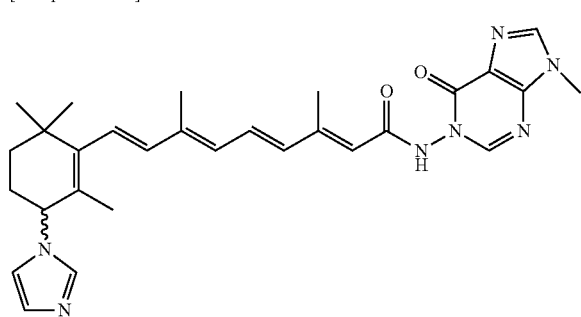
[Compound 43B]
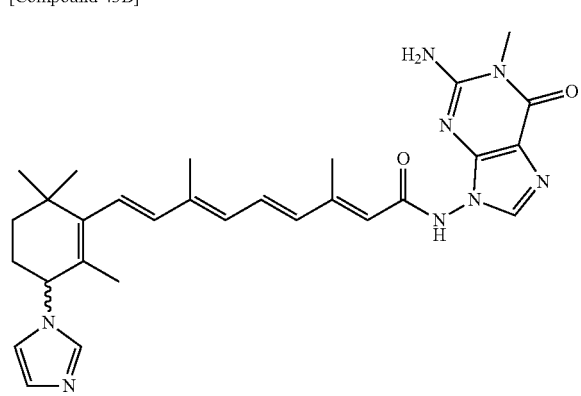
[Compound 44B]
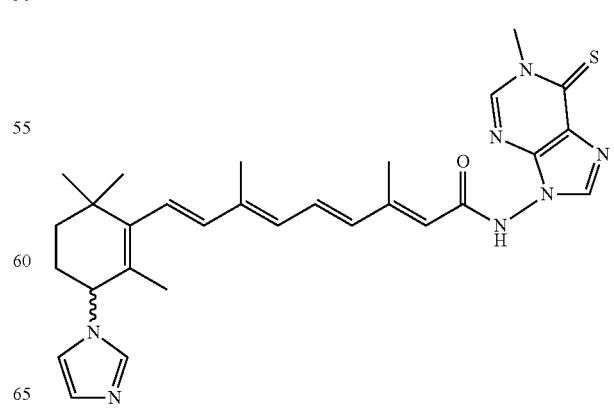

[Compound 44C]

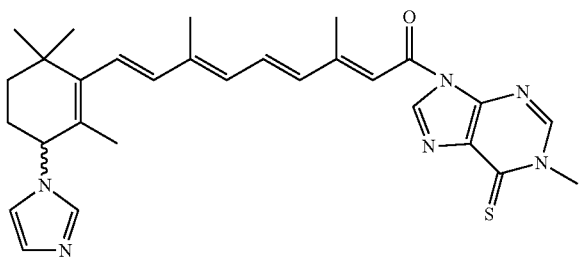

[Compound 44D]

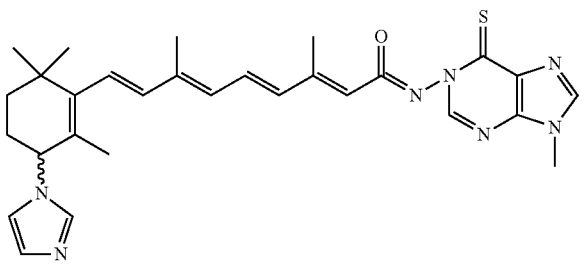

[Compound 44E]

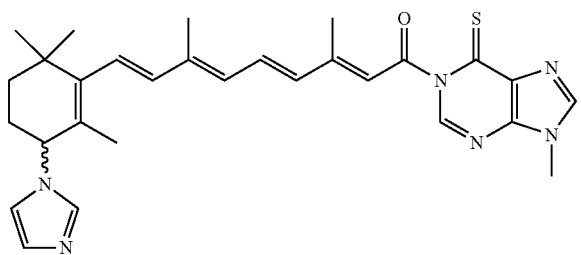

[Compound 45B]

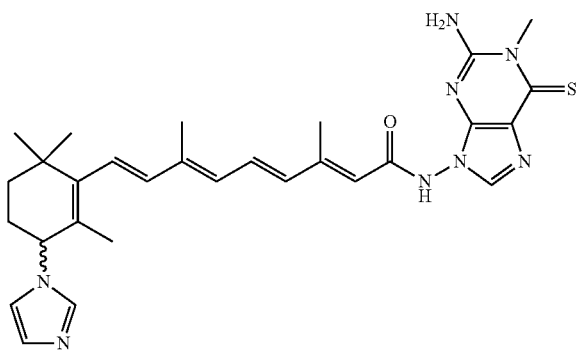

[Compound 45C]

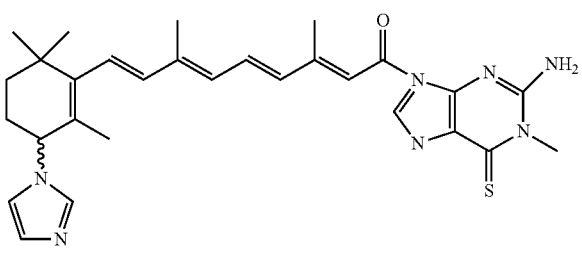

[Compound 45D]

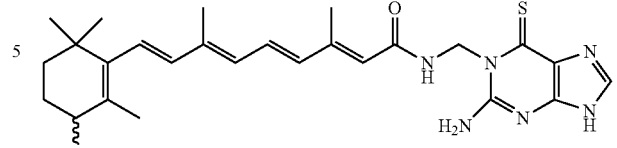

[Compound 45E]

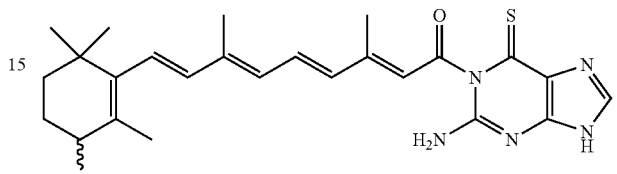

[Compound VNLG-145]

VNLG-145

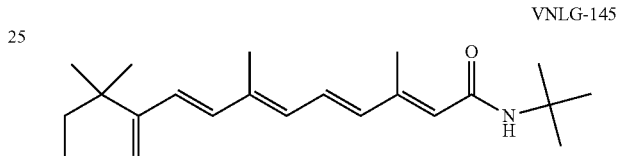

[Compound VNLG-148]

VNLG-148

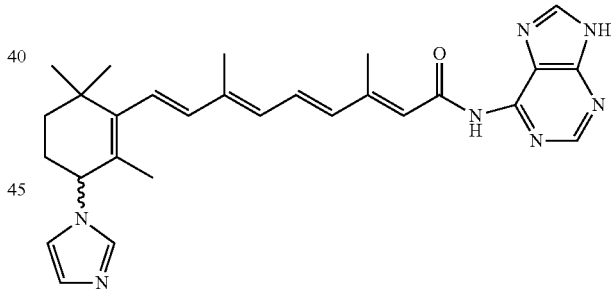

Synthetic purine derivatives possess great potential to interfere with important cellular functions[9,67] and a number of major purine-based drugs exist which find current application for the treatment of cancer[10,11,68,69] and a variety of other diseases.[70] A further interesting pharmacological property of purine derivatives is that they can be transported across biological membranes by nucleobase active and passive transport systems, which have been characterized in a variety of mammalian cells.[71]

The heterocyclic and amide RAMBAs of the present disclosure may be synthesized as outlined in Scheme 4 below. Some reactions will involve the coupling of the imidazolyl carboxylic acid (VN-14-1) with various anilines using 1,3-dicyclohexylcarbodiimide (DCC) and 1-hydroxybenzotriazole (HOBT) in dimethylformamide (DMF) to yield the corresponding amides. While other compounds will involve formation (i.e., reactions with carbonyldiimidazole (CDI)) of imidazolide intermediates followed by coupling with appropriate amino heterocyles.[39] For synthesis of Compounds 42, 44, 46 and 48, the primary amino groups will first be protected with di-tert-butyl dicarbonate (Boc)$_2$O[40] prior to use for coupling reactions. The Boc groups will then be readily deprotected to give the desired compounds. With the recent availability of simple procedures for the synthesis of large numbers of Substituted purines,[41] purine related compounds may be synthesized.

Scheme 4

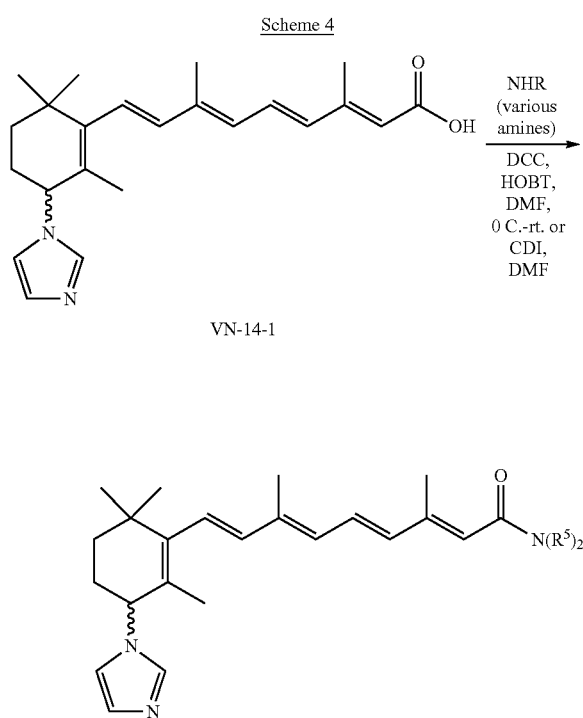

VN-14-1

Non-4-Position-Hydroxyl RAMBAs

The RAMBAs according to the present disclosure include RAMBA compounds where the hydroxyl group of ring C is not in the 4-position, for example, as represented by General Formula 4:

[General Formula 4]

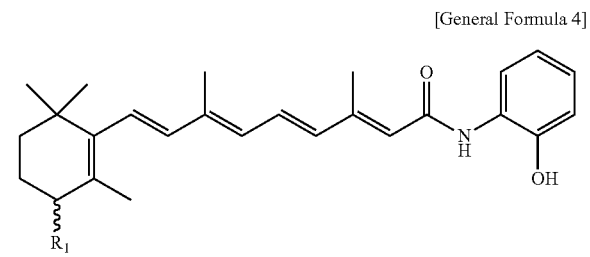

In General Formula 4, $R^1$ has the same definitions as set forth for General Formula 1A above.

A non-limiting example of General Formula 4 is VNLG-147 shown below:

VNLG-147

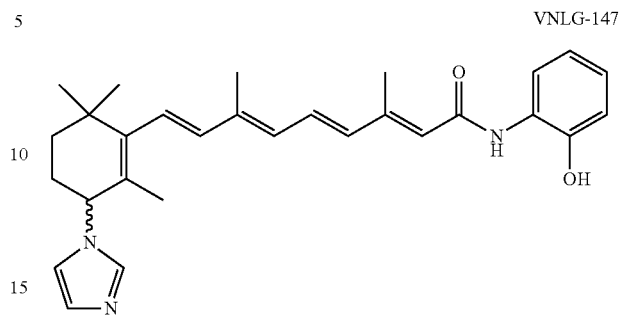

The compounds of General Formula 4 may be made with synthesis methods similar to those for making VN-66-1.

In the above synthesis methods, the starting retinamide may be a racemate or a (+) or (−) enantiomer to obtain an enantiomer of the retinamides of the present disclosure.

The synthesized compounds (intermediates and final products) may be purified by chromatographic procedures (flash column chromatography, TLC or HPLC) and/or crystallization. The compounds may be fully characterized by spectroscopic methods (IR, UV, NMR and MS) and elemental analyses. The melting points of all compounds may be determined with a Fisher-Johns melting point apparatus.

Enantiomers

Embodiments of the present disclosure also include enantiomers of the RAMBAs according to the present disclosure, including (+)- or (−)-analogs of the RAMBAs. Embodiments of the present disclosure also include certain RAMBAs of U.S. Pat. No. 7,265,143, including (+)- or (−)- and (±)-VN-66-1.

VN-66-1 exists as a racemate of two enantiomers as a result of chiral C-4 and studies have been conducted with racemic (±)-VN-66-1. Racemic (±)-VN-12-1 (a potent RAMBA and also the methyl ester of (±)-VN-14-1) is considerably (up to 28-fold) more potent than either of the pure (4S)-(+)- or (4R)-(−)-VN-12-1 enantiomers.[24] However, the present inventors consider that the enantiomers may exhibit differential anti-neoplastic activities on PCa cell lines. It has been demonstrated from previous studies that the anti-neoplastic activities of the atypical RAMBAs, including (±)-VN-66-1 are independent of their RAMBA activity.[23,24,25,26,42,43,44]

To synthesize VN-66-1 enantiomers, one synthesis of enantiopure (4S)-(+)-VN-66-1 and (4R)-(−)-VN-66-1 is outlined in Scheme 5 below, starting from racemic (4S,R)-(±)-4-hydroxymethylretinoate which will be readily synthesized from commercially available ATRA as previously described.[24,45] Next, the racemic allylic alcohol (1) is resolved to give the enantiopure alcohols 2 and 3.[46] The procedure involves the use of diacetyl-L-tartaric acid anhydride to precipitate the diastereoisomeric precursor (1a) of (4S)-(+)-1 and diacetyl-D-tartaric acid anhydride to precipitate the diastereoisomeric precursor (1b) of (R)-(−)-1 followed by mild hydrolysis to give enantiopure alcohols (Scheme 5). Based on previous studies, it is expected that the terminal methyl ester group will be stable under the mild hydrolysis of the diastereoisomers.[24,45] These two alcohols are expected to have optical purity in the range 92 to 99%, which will be purified to 100% ee either by several recrystallizations or by HPLC using a Chiralcel OJ semipreparative column.[47] The enantiopure alcohols 2 and 3 will each be used to synthesize enantiopure (4S)-(+)-VN-66-1 and (4R)-(−)-VN/66-1 as previously described,[24,45] and will be characterized by HPLC, $^1$H-NMR and optical rotation. It has been previously reported that conversion of the allylic alcohol to the corresponding imidazole via reaction with carbonyl diimidazole proceeds via SN$_i$ mechanism with retention of configuration[48] corroborated by earlier studies.[49]
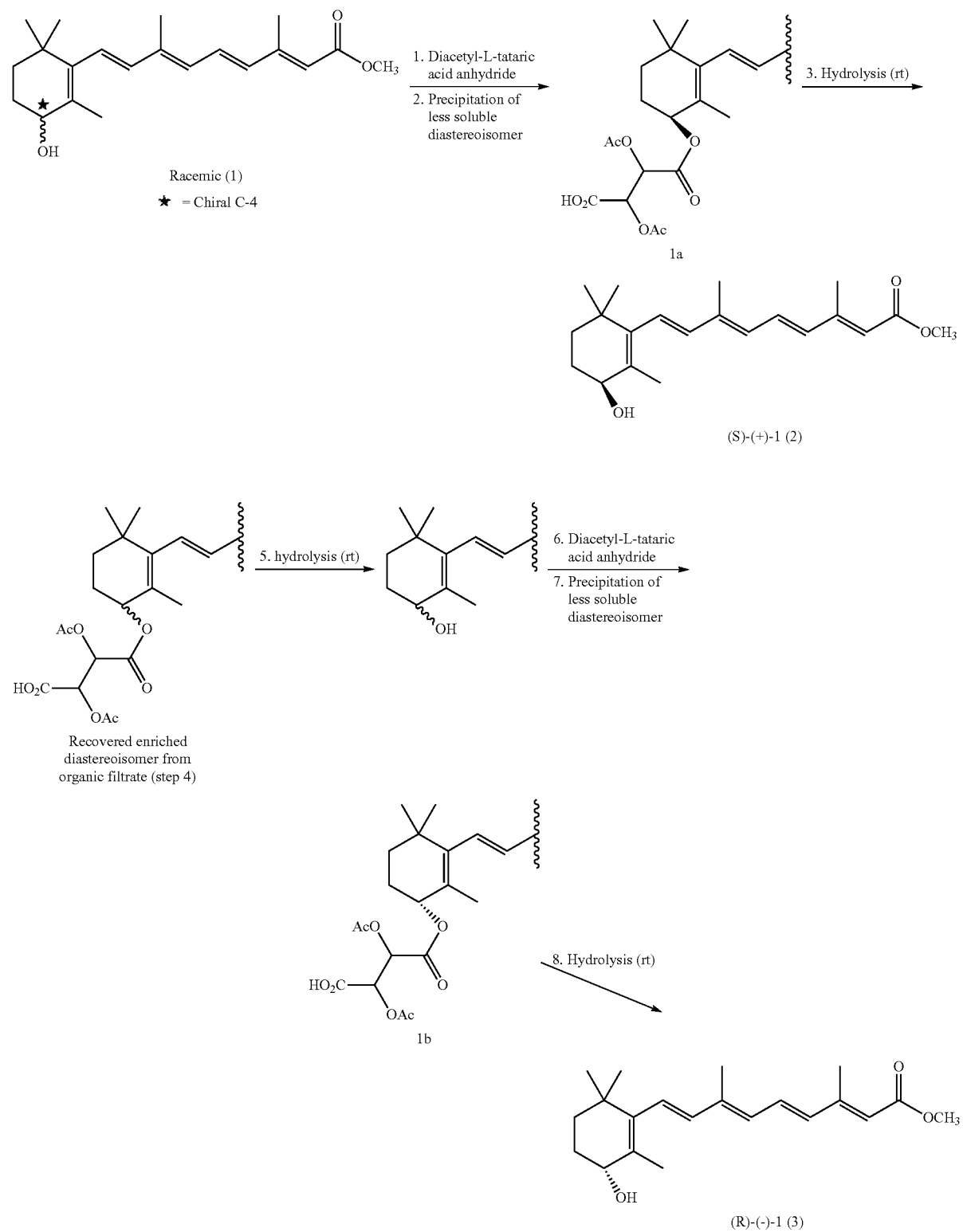
Scheme 5
Scheme 5: Synthesis of Enantiopure C-4 Alcohols and (4S)-(+)-VN66-1 and (4R)-(-)-VN/66-1

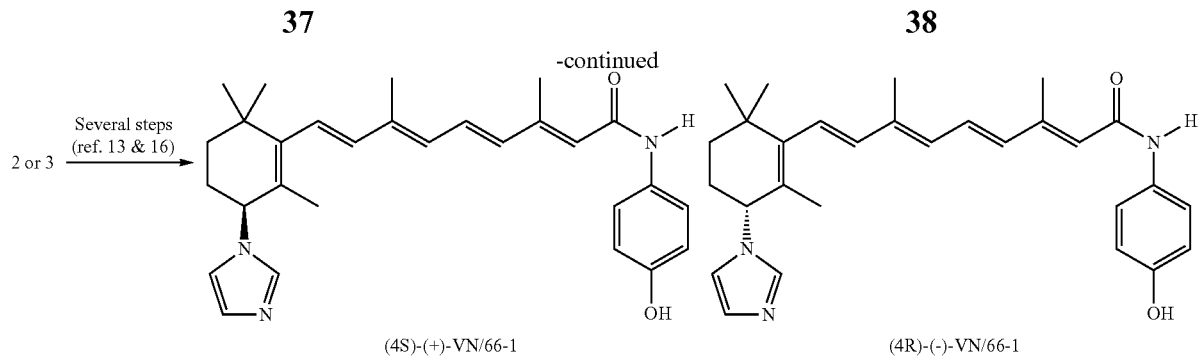

(4S)-(+)-VN/66-1    (4R)-(-)-VN/66-1

Several alternative procedures to enantiopure VN-66-1 and analogs are described below.

There are several other methods to prepare chiral allylic alcohols such as asymmetric reductions[50,51,52] and enzymatic[53], as well as non-enzymatic[54] kinetic resolutions. Compounds (s)-2 and (R)-3 may be synthesized via enantioselective reduction of precursor 4-ketone using (R)- or (S)-2-methyl-CBS-oxazaborolidine and $BH_3 \cdot SMe_2$ as recently reported for closely related retinoids[50] (Scheme 6A). Another alternative method will be formation of amine salts[55] of (±)-VN/12-1 to form two diastereoisomers and subsequent separation by crystallization.

Another alternative method will be formation of amine salts[55] of (±)-VN-66-1 to form two diastereoisomers and subsequent separation by crystallization.

The coupling of some amines may be difficult. The present inventors have developed alternative strategies of amide syntheses as outlined in Scheme 6B below. These procedures involve either key pyridyithioester intermediate[56] or solid phase synthesis that involves reaction of the carboxylic acid with an activating chlorinating reagent.[57]

Schemes 6A and 6B
Schemes 6A & B: Alternative Synthesis of Enantiopure Alcohols and Retinamides

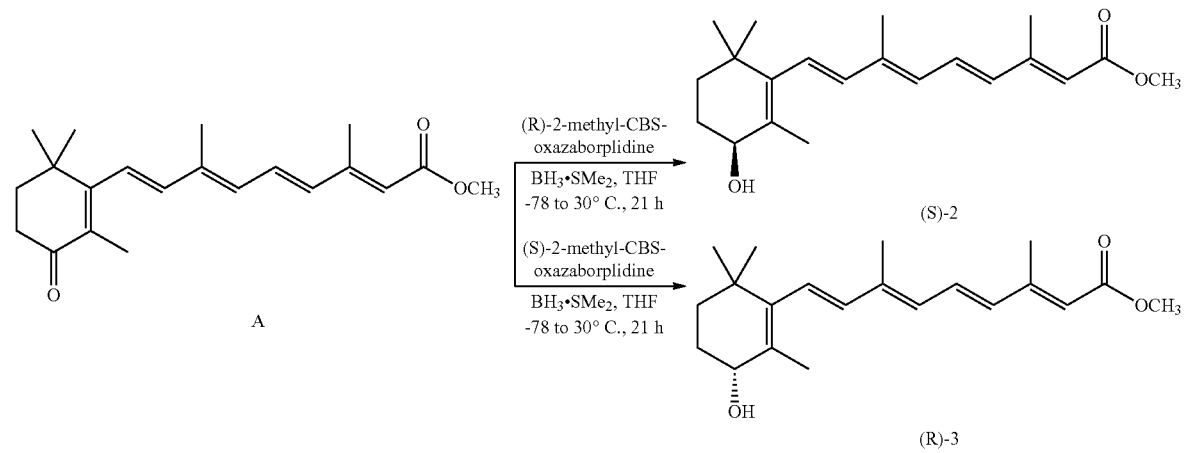

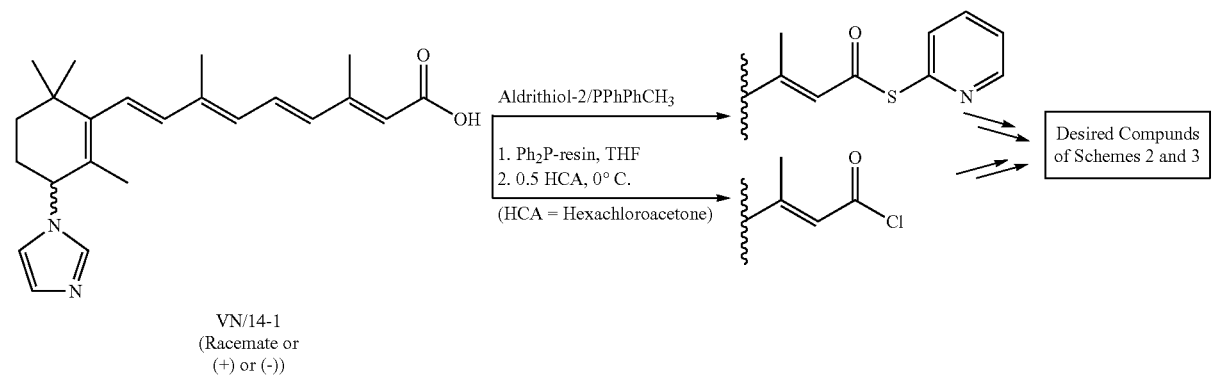

13-cis-RAMBA Retinamides

The present inventors designed and synthesized 13-cis-RAMBA retinamides for treating dermatological conditions. The 13-cis-RAMBA retinamides are as described in U.S. Patent Publication No. 2019/0002411, the entire content of which is hereby incorporated by reference.

Amide Derivatives (Series A)

The 13-cis-RAMBA retinamides according to the present disclosure include amide derivatives having the following General Formula 5:

[General Formula 5]

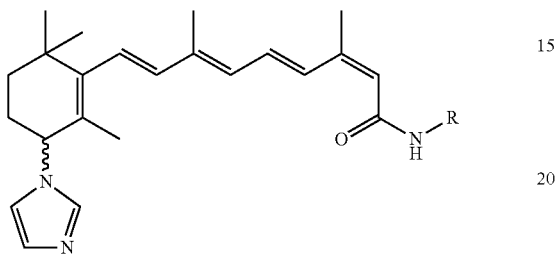

In General Formula 5, the R group can be, for example, a benzyl group or a heterocyclic group that is mono-, di-, or tri-substituted at either at the para, meta, or ortho position with OH, OMe, CN, $CO_2H$, $CO_2Me$, $SO_2NH_2$; imidazole, 1H-tetrazole, pyridine and their derivatives. Non-limiting examples of amide derivatives are presented in TABLE 1:

TABLE 1

| Amide derivatives (Series A) | |
| --- | --- |
| Compound number<br>Compound name | Structure |
| VNHM-1-66 (A1)<br>(2Z,4E,6E,8E)-9-(3-(1H-imidazol-1-yl)-2,6,6-trimethylcyclohex-1-en-1-yl)-3,7-dimethyl-N-phenylnona-2,4,6,8-tetraenamide | |
| VNHM-1-69 (A2)<br>(2Z,4E,6E,8E)-9-(3-(1H-imidazol-1-yl)-2,6,6-trimethylcyclohex-1-en-1-yl)-N-(4-hydroxyphenyl)-3,7-dimethylnona-2,4,6,8-tetraenamide | |
| VNHM-1-74 (A3)<br>(2Z,4E,6E,8E)-9-(3-(1H-imidazol-1-yl)-2,6,6-trimethylcyclohex-1-en-1-yl)-N-(2-hydroxyphenyl)-3,7-dimethylnona-2,4,6,8-tetraenamide | |

TABLE 1-continued

Amide derivatives (Series A)

Compound number
Compound name                     Structure

VNHM-1-75 (A4)
(2Z,4E,6E,8E)-9-(3-(1H-
imidazol-1-yl)-2,6,6-
trimethylcyclohex-1-en-1-
yl)-N-(4-fluorophenyl)-
3,7-dimethylnona-2,4,6,8-
tetraenamide VNHM-1-81 (A5)
(2Z,4E,6E,8E)-9-(3-(1H-
imidazol-1-yl)-2,6,6-
trimethylcyclohex-1-en-1-
yl)-N-(3-fluorophenyl)-
3,7-dimethylnona-2,4,6,8-
tetraenamide A6
(2Z,4E,6E,8E)-9-(3-(1H-
imidazol-1-yl)-2,6,6-
trimethylcyclohex-1-en-1-
yl)-N-(4-cyanophenyl)-
3,7-dimethylnona-2,4,6,8-
tetraenamide A7
methyl 4-((2Z,4E,6E,8E)-
9-(3-(1H-imidazol-1-yl)-
2,6,6-trimethylcyclohex-
1-en-1-yl)-3,7-
dimethylnona-2,4,6,8-
tetraenamido)benzoate A8
4-((2Z,4E,6E,8E)-9-(3-
(1H-imidazol-1-yl)-2,6,6-
trimethylcyclohex-1-en-1-
yl)-3,7-dimethylnona-
2,4,6,8-tetraenamido)
benzoic acid TABLE 1-continued Amide derivatives (Series A)

Compound number
Compound name                                                                Structure A9
(2Z,4E,6E,8E)-9-(3-(1H-
imidazol-1-yl)-2,6,6-
trimethylcyclohex-1-en-1-
yl)-3,7-dimethyl-N-(4-
sulfamoylphenyl)nona-
2,4,6,8-tetraenamide A10
(2Z,4E,6E,8E)-9-(3-(1H-
imidazol-1-yl)-2,6,6-
trimethylcyclohex-1-en-1-
yl)-1-(1H-imidazol-1-yl)-
3,7-dimethylnona-2,4,6,8-
tetraen-1-one A11
(2Z,4E,6E,8E)-9-(3-(1H-
imidazol-1-yl)-2,6,6-
trimethylcyclohex-1-en-1-
yl)-N-(tert-butyl)-3,7-
dimethylnona-2,4,6,8-
tetraenamide A12
(2Z,4E,6E,8E)-9-(3-(1H-
imidazol-1-yl)-2,6,6-
trimethylcyclohex-1-en-1-
yl)-N-(4-methoxyphenyl)-
3,7-dimethylnona-2,4,6,8-
tetraenamide A13
(2Z,4E,6E,8E)-9-(3-(1H-
imidazol-1-yl)-2,6,6-
trimethylcyclohex-1-en-1-
yl)-3,7-dimethyl-1-(4H-
1,2,4-triazol-4-yl)nona-
2,4,6,8-tetraen-1-one TABLE 1-continued Amide derivatives (Series A)

Compound number
Compound name | Structure

A14
(2Z,4E,6E,8E)-9-(3-(1H-imidazol-1-yl)-2,6,6-trimethylcyclohex-1-en-1-yl)-3,7-dimethyl-N-(pyridin-2-yl)nona-2,4,6,8-tetraenamide A15
(2Z,4E,6E,8E)-9-(3-(1H-imidazol-1-yl)-2,6,6-trimethylcyclohex-1-en-1-yl)-3,7-dimethyl-N-(4-(trifluoromethyl)phenyl)nona-2,4,6,8-tetraenamide Series B Derivatives The 13-cis-retinamides according to the present disclosure include derivatives having the following General Formula 6:

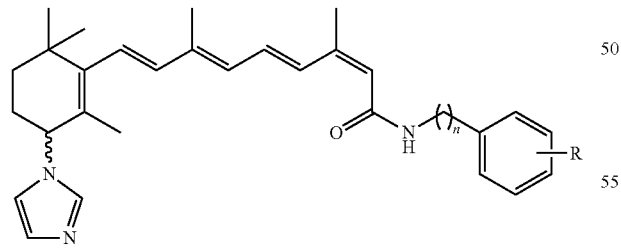

[General Formula 6]

In General Formula 6, n can be, for example, any integer between 1 to 6. The R group can be, for example, a benzyl group or a heterocyclic group that is mono-, di-, or tri-substituted at either at the para, meta, or ortho position with OH, OMe, CN, $CO_2H$, $CO_2Me$, $SO_2NRH$; imidazole; or 1H-tetrazole. Non-limiting examples of Series B derivatives are presented in TABLE 2:

TABLE 2

Series B derivatives

| Compound number<br>Compound name | Structure |
|---|---|
| VNHM-1-73 (B1)<br>(2Z,4E,6E,8E)-9-(3-(1H-imidazol-1-yl)-2,6,6-trimethylcyclohex-1-en-1-yl)-N-(4-hydroxybenzyl)-3,7-dimethylnona-2,4,6,8-tetraenamide | 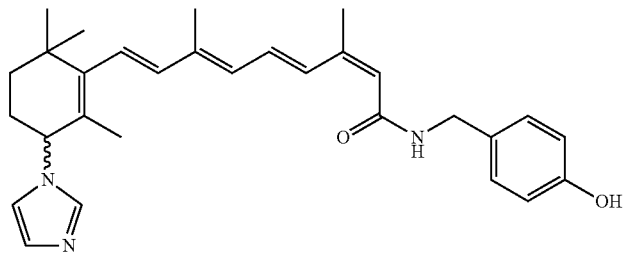 [SMILES: CC1=C(/C=C/C(C)=C/C=C/C(C)=C\C(=O)NCc2ccc(O)cc2)C(C)(C)CCC1n1ccnc1] |
| VNHM-1-84 (B2)<br>(2Z,4E,6E,8E)-9-(3-(1H-imidazol-1-yl)-2,6,6-trimethylcyclohex-1-en-1-yl)-N-benzyl-3,7-dimethylnona-2,4,6,8-tetraenamide | 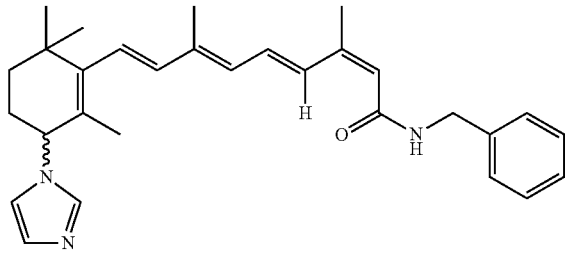 [SMILES: CC1=C(/C=C/C(C)=C/C=C/C(C)=C\C(=O)NCc2ccccc2)C(C)(C)CCC1n1ccnc1] |
| B3<br>4-(((2Z,4E,6E,8E)-9-(3-(1H-imidazol-1-yl)-2,6,6-trimethylcyclohex-1-en-1-yl)-3,7-dimethylnona-2,4,6,8-tetraenamido)methyl) benzoic acid | 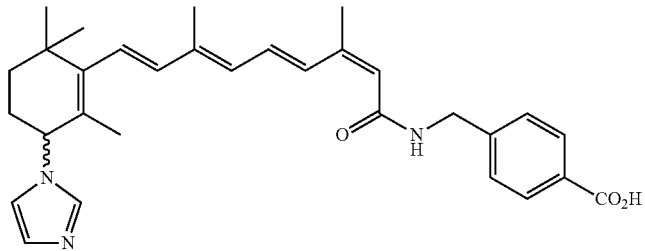 [SMILES: CC1=C(/C=C/C(C)=C/C=C/C(C)=C\C(=O)NCc2ccc(C(=O)O)cc2)C(C)(C)CCC1n1ccnc1] |
| B4<br>(2Z,4E,6E,8E)-9-(3-(1H-imidazol-1-yl)-2,6,6-trimethylcyclohex-1-en-1-yl)-N-(3-cyanobenzyl)-3,7-dimethylnona-2,4,6,8-tetraenamide | 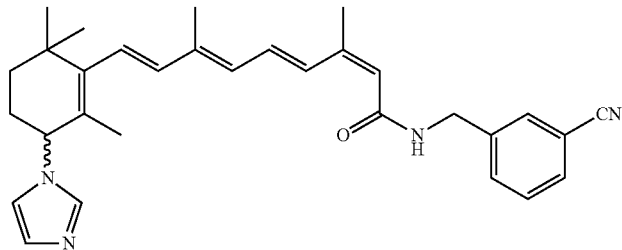 [SMILES: CC1=C(/C=C/C(C)=C/C=C/C(C)=C\C(=O)NCc2cccc(C#N)c2)C(C)(C)CCC1n1ccnc1] |
| VNHM-1-111 (B5)<br>(2Z,4E,6E,8E)-9-(3-(1H-imidazol-1-yl)-2,6,6-trimethylcyclohex-1-en-1-yl)-N-(3-fluorobenzyl)-3,7-dimethylnona-2,4,6,8-tetraenamide | 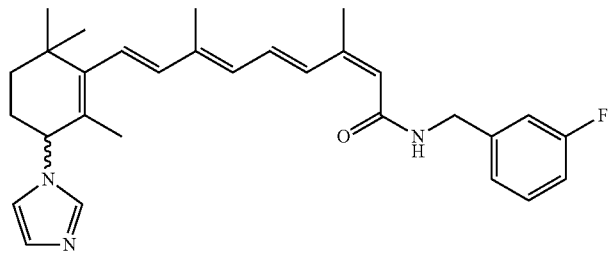 [SMILES: CC1=C(/C=C/C(C)=C/C=C/C(C)=C\C(=O)NCc2cccc(F)c2)C(C)(C)CCC1n1ccnc1] |

TABLE 2-continued

Series B derivatives

| Compound number<br>Compound name | Structure |
|---|---|
| B6<br>(2Z,4E,6E,8E)-9-(3-(1H-imidazol-1-yl)-2,6,6-trimethylcyclohex-1-en-1-yl)-3,7-dimethyl-N-(4-(trifluoromethyl)benzyl)nona-2,4,6,8-tetraenamide | |
| B7<br>(2Z,4E,6E,8E)-9-(3-(1H-imidazol-1-yl)-2,6,6-trimethylcyclohex-1-en-1-yl)-3,7-dimethyl-N-(3-sulfamoylbenzyl)nona-2,4,6,8-tetraenamide | |
| B8<br>(2Z,4E,6E,8E)-9-(3-(1H-imidazol-1-yl)-2,6,6-trimethylcyclohex-1-en-1-yl)-3,7-dimethyl-N-phenethylnona-2,4,6,8-tetraenamide | |
| B9<br>(2Z,4E,6E,8E)-9-(3-(1H-imidazol-1-yl)-2,6,6-trimethylcyclohex-1-en-1-yl)-N-(3-hydroxyphenethyl)-3,7-dimethylnona-2,4,6,8-tetraenamide | |
| B10<br>(2Z,4E,6E,8E)-9-(3-(1H-imidazol-1-yl)-2,6,6-trimethylcyclohex-1-en-1-yl)-3,7-dimethyl-N-(3-phenylpropyl)nona-2,4,6,8-tetraenamide | |

TABLE 2-continued

Series B derivatives

| Compound number<br>Compound name | Structure |
|---|---|
| B11<br>(2Z,4E,6E,8E)-9-(3-(1H-imidazol-1-yl)-2,6,6-trimethylcyclohex-1-en-1-yl)-N-(3-(4-hydroxyphenyl)propyl)-3,7-dimethylnona-2,4,6,8-tetraenamide | |
| B12<br>(2Z,4E,6E,8E)-9-(3-(1H-imidazol-1-yl)-2,6,6-trimethylcyclohex-1-en-1-yl)-N-(3-(3-fluorophenyl)propyl)-3,7-dimethylnona-2,4,6,8-tetraenamide | |
| B13<br>(2Z,4E,6E,8E)-9-(3-(1H-imidazol-1-yl)-2,6,6-trimethylcyclohex-1-en-1-yl)-3,7-dimethyl-N-(3-(3-(trifluoromethyl)phenyl)propyl)nona-2,4,6,8-tetraenamide | |

$C_4$ (R) Derivatives

The 13-cis-retinamides according to the present disclosure include derivatives having the following General Formula 7:

[General Formula 7]

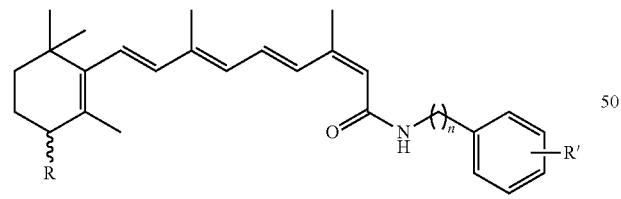

In General Formula 7, n can be, for example, 0 to 5. R can be, for example, an 1H-imidazole group, an azo group, an oxime, a benzimidazole, an azole group, a sulfur containing group, an oxygen containing group, a nitrogen containing group, a pyridyl containing group, an ethylene group, a cyclopropyl-amine group, an ester, a cyano group, an oxirane, or an aziridine group finked with an amide group, an ester group, or an ether group. R' can be, for example, an alkyl, an ester, an ether, a benzyl, a thio, a Weinreb amide, a heterocyclic, a halide, or a hydroxyl. Non-limiting examples of $C_4$ (R) derivatives are presented in TABLE 3:

TABLE 3

C₄ (R) derivatives

| Compound number Compound name | Structure |
|---|---|
| VNHM-1-4 (C1)<br>(2Z,4E,6E,8E)-methyl 9-(3-(1H-imidazol-1-yl)-2,6,6-trimethylcyclohex-1-en-1-yl)-3,7-dimethylnona-2,4,6,8-tetraenoate | |
| VNHM-1-71 (C2)<br>(2Z,4E,6E,8E)-methyl 9-((E)-3-(hydroxyimino)-2,6,6-trimethylcyclohex-1-en-1-yl)-3,7-dimethylnona-2,4,6,8-tetraenoate | |
| C3<br>(2Z,4E,6E,8E)-methyl 9-(3-(1H-benzo[d]imidazol-1-yl)-2,6,6-trimethylcyclohex-1-en-1-yl)-3,7-dimethylnona-2,4,6,8-tetraenoate | |
| C4<br>tert-butyl 4-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)-1H-imidazole-1-carboxylate | |
| C5<br>(2Z,4E,6E,8E)-9-(3-(1H-imidazol-4-yl)-2,6,6-trimethylcyclohex-1-en-1-yl)-3,7-dimethyl-N-phenylnona-2,4,6,8-tetraenamide | |

TABLE 3-continued

C₄ (R) derivatives

| Compound number Compound name | Structure |
|---|---|
| C6 (2Z,4E,6E,8E)-3,7-dimethyl-N-phenyl-9-(2,6,6-trimethyl-3-(pyridin-2-yl)cyclohex-1-en-1-yl)nona-2,4,6,8-tetraenamide | |
| C7 (2Z,4E,6E,8E)-9-(3-(3-fluoropyridin-2-yl)-2,6,6-trimethylcyclohex-1-en-1-yl)-3,7-dimethyl-N-phenylnona-2,4,6,8-tetraenamide | |
| C8 (2Z,4E,6E,8E)-3,7-dimethyl-N-phenyl-9-(2,6,6-trimethyl-3-(5-methylpyridin-2-yl)cyclohex-1-en-1-yl)nona-2,4,6,8-tetraenamide | |
| C9 (2Z,4E,6E,8E)-9-(3-(5-(tert-butyl)pyridin-2-yl)-2,6,6-trimethylcyclohex-1-en-1-yl)-3,7-dimethyl-N-phenylnona-2,4,6,8-tetraenamide | |

TABLE 3-continued

C$_4$ (R) derivatives

| Compound number<br>Compound name | Structure |
| --- | --- |
| C10<br>(2Z,4E,6E,8E)-3,7-dimethyl-N-phenyl-9-(2,6,6-trimethyl-3-(5-(pyrrolidin-1-yl)pyridin-2-yl)cyclohex-1-en-1-yl)nona-2,4,6,8-tetraenamide | |
| C11<br>(2Z,4E,6E,8E)-3,7-dimethyl-N-phenyl-9-(2,6,6-trimethyl-3-(5-(3-methylpiperidin-1-yl)pyridin-2-yl)cyclohex-1-en-1-yl)nona-2,4,6,8-tetraenamide | |
| C12<br>(2Z,4E,6E,8E)-9-(3-(5-cyclopropylpyridin-2-yl)-2,6,6-trimethylcyclohex-1-en-1-yl)-3,7-dimethyl-N-phenylnona-2,4,6,8-tetraenamide | |
| C13<br>ethyl 2-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)isonicotinate | |

TABLE 3-continued

C₄ (R) derivatives

| Compound number Compound name | Structure |
|---|---|
| C14 2-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)isonicotinic acid | |
| C15 (2Z,4E,6E,8E)-9-(3-(4-(((Z)-benzylideneamino)methyl)pyridin-2-yl)-2,6,6-trimethylcyclohex-1-en-1-yl)-3,7-dimethyl-N-phenylnona-2,4,6,8-tetraenamide | |
| C16 methyl 5-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)pyrazine-2-carboxylate | |
| C17 5-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)pyrazine-2-carboxylic acid | |

TABLE 3-continued $C_4$ (R) derivatives

| Compound number<br>Compound name | Structure |
|---|---|
| C18<br>(2Z,4E,6E,8E)-9-(3-(5-fluoropyrazin-2-yl)-2,6,6-trimethylcyclohex-1-en-1-yl)-3,7-dimethyl-N-phenylona-2,4,6,8-tetraenamide | |
| C19<br>(2Z,4E,6E,8E)-3,7-dimethyl-N-phenyl-9-(2,6,6-trimethyl-3-(thiazol-4-yl)cyclohex-1-en-1 yl)nona-2,4,6,8-tetraenamide | |
| C20<br>(2Z,4E,6E,8E)-9-(3-(2-cyanothiazol-4-yl)-2,6,6-trimethylcyclohex-1-en-1-yl)-3,7-dimethyl-N-phenylnona-2,4,6,8-tetraenamide | |
| C21<br>methyl 4-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)thiazole-2-carboxylate | |
| C22<br>4-(3-((1E,3E,5E,7Z)-3,7-dimethyl-9-oxo-9-(phenylamino)nona-1,3,5,7-tetraen-1-yl)-2,4,4-trimethylcyclohex-2-en-1-yl)thiazole-2-carboxylic acid | |

TABLE 3-continued

C₄ (R) derivatives

| Compound number<br>Compound name | Structure |
|---|---|
| C23<br>(2Z,4E,6E,8E)-3,7-dimethyl-N-phenyl-9-(2,6,6-trimethyl-3-(thiazol-5-yl)cyclohex-1-en-1-yl)nona-2,4,6,8-tetraenamide | |
| C24<br>(2Z,4E,6E,8E)-3,7-dimethyl-N-phenyl-9-(2,6,6-trimethyl-3-methylenecyclohex-1-en-1-yl)nona-2,4,6,8-tetraenamide | |
| C25<br>(2Z,4E,6E,8E)-3,7-dimethyl-N-phenyl-9-(4,6,6-trimethylspiro[2.5]oct-4-en-5-yl)nona-2,4,6,8-tetraenamide | |
| C26<br>(E)-ethyl 2-(3-((1E,3E,5E,7Z)-3,7-dimethyl-9-oxo-9-(phenylamino)nona-1,3,5,7-tetraen-1-yl)-2,4,4-trimethylcyclohex-2-en-1-ylidene)acetate | |
| C27<br>(E)-2-(3-((1E,3E,5E,7Z)-3,7-dimethyl-9-oxo-9-(phenylamino)nona-1,3,5,7-tetraen-1-yl)-2,4,4-trimethylcyclohex-2-en-1-ylidene)acetic acid | |
| C28<br>(2Z,4E,6E,8E)-9-((E)-3-benzylidene-2,6,6-trimethylcyclohex-1-en-1-yl)-3,7-dimethyl-N-phenylnona-2,4,6,8-tetraenamide | |

TABLE 3-continued

| C₄ (R) derivatives | |
|---|---|
| Compound number<br>Compound name | Structure |

C29
4-((E)-(3-((1E,3E,5E,7Z)-3,7-dimethyl-9-oxo-9-(phenylamino)nona-1,3,5,7-tetraen-1-yl)-2,4,4-trimethylcyclohex-2-en-1-ylidene)methyl)benzoic acid C30
(2Z,4E,6E,8E)-9-(3-(1H-benzo[d]imidazol-1-yl)-2,6,6-trimethylcyclohex-1-en-1-yl)-N-methoxy-N,3,7-trimethylnona-2,4,6,8-tetraenamide C31
(2Z,4E,6E,8E)-N-methoxy-N,3,7-trimethyl-9-(2,6,6-trimethyl-3-(1H-1,2,4-triazol-1-yl)cyclohex-1-en-1-yl)nona-2,4,6,8-tetraenamide C32
(2Z,4E,6E,8E)-methyl 9-(3-(1H-imidazol-1-yl)-2,6,6-trimethylcyclohexa-1,3-dien-1-yl)-3,7-dimethylnona-2,4,6,8-tetraenoate VNHM-1-106 (C33)
(2Z,4E,6E,8E)-3,7-dimethyl-N-phenyl-9-(2,6,6-trimethyl-3-(pyridin-3-yl)cyclohexa-1,3-dien-1-yl)nona-2,4,6,8-tetraenamide TABLE 3-continued

| C$_4$ (R) derivatives | |
|---|---|
| Compound number<br>Compound name | Structure |
| VNHM-1-104 (C34)<br>(2Z,4E,6E,8E)-7-methyl-N-phenyl-9-(2,6,6-trimethyl-3-(pyrimidin-5-yl)cyclohexa-1,3-dien-1-yl)nona-2,4,6,8-tetraenamide | |
| VNHM-1-94 (C35)<br>(2Z,4E,6E,8E)-N-(4-hydroxybenzyl)-9-(3'-methoxy-2,4,4-trimethyl-4,5-dihydro-[1,1'-biphenyl]-3-yl)-7-methylnona-2,4,6,8-tetraenamide | |
| VNHM-1-108 (C36)<br>(2Z,4E,6E,8E)-methyl 9-(3-hydrazono-2,6,6-trimethylcyclohex-1-en-1-yl)-3,7-dimethylnona-2,4,6,8-tetraenoate | |
| C37<br>(2Z,4E,6E,8E)-methyl 3,7-dimethyl-9-(2,6,6-trimethyl-3-(phenylamino)cyclohex-1-en-1-yl)nona-2,4,6,8-tetraenoate | |

Thioamide Derivatives, Ester, and Ether (Series D)

The 13-cis-retinamides according to the present disclosure include amide derivatives having the following General Formula 8:

[General Formula 8]

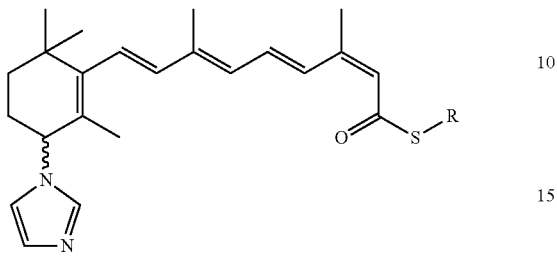

In General Formula 8, the R group can be, for example, a benzyl group or a heterocyclic group that is mono-, di-, or tri-substituted at either at the para, meta, or ortho position with OH, OMe, CN, $CO_2H$, $CO_2Me$, $SO_2NH_2$; imidazole, 1H-tetrazole, alpha methyl benzyl, pyridine, and their derivatives; Weinreb amide, cyclic amides, and their derivatives. Non-limiting examples of thioamide derivatives, ester, and ether are presented in TABLE 4:

TABLE 4

Thioamide derivatives, ester, and ether (Series D)

| Compound number / Compound name | Structure |
|---|---|
| D1<br>(2Z,4E,6E,8E)-S-phenyl 9-(3-(1H-imidazol-1-yl)-2,6,6-trimethylcyclohex-1-en-1-yl)-3,7-dimethylnona-2,4,6,8-tetraenethioate | |
| D2<br>(2Z,4E,6E,8E)-S-(4-hydroxyphenyl) 9-(3-(1H-imidazol-1-yl)-2,6,6-trimethylcyclohex-1-en-1-yl)-3,7-dimethylnona-2,4,6,8-tetraenethioate | |
| D3<br>(2Z,4E,6E,8E)-S-(2-fluorophenyl) 9-(3-(1H-imidazol-1-yl)-2,6,6-trimethylcyclohex-1-en-1-yl)-3,7-dimethylnona-2,4,6,8-tetraenethioate | |

TABLE 4-continued

Thioamide derivatives, ester, and ether (Series D)

| Compound number<br>Compound name | Structure |
|---|---|
| D4<br>(2Z,4E,6E,8E)-S-p-tolyl 9-(3-(1H-benzo[d]imidazol-1-yl)-2,6,6-trimethylcyclohex-1-en-1-yl)-3,7-dimethylnona-2,4,6,8-tetraenethioate | |
| D5<br>(2Z,4E,6E,8E)-S-m-tolyl 3,7-dimethyl-9-(2,6,6-trimethyl-3-(pyridin-2-yl)cyclohex-1-en-1-yl)nona-2,4,6,8-tetraenethioate | |
| D6<br>(2Z,4E,6E,8E)-S-(4-hydroxyphenyl) 3,7-dimethyl-9-(2,6,6-trimethyl-3-(thiazol-4-yl)cyclohex-1-en-1-yl)nona-2,4,6,8-tetraenethioate | |
| D7<br>(2Z,4E,6E,8E)-S-(3-cyanophenyl) 9-(3-(1H-imidazol-4-yl)-2,6,6-trimethylcyclohex-1-en-1-yl)-3,7-dimethylnona-2,4,6,8-tetraenethioate | |
| D8<br>(2Z,4E,6E,8E)-phenyl 9-(3-(1H-imidazol-1-yl)-2,6,6-trimethylcyclohex-1-en-1-yl)-3,7-dimethylnona-2,4,6,8-tetraenoate | |

TABLE 4-continued

Thioamide derivatives, ester, and ether (Series D)

| Compound number<br>Compound name | Structure |
|---|---|
| D9<br>1-(3-((1E,3E,5E,7Z)-3,7-dimethyl-9-phenoxynona-1,3,5,7-tetraen-1-yl)-2,4,4-trimethylcyclohex-2-en-1-yl)-1H-imidazole | |
| D10<br>N-((2Z,4E,6E,8E)-9-(3-(1H-imidazol-1-yl)-2,6,6-trimethylcyclohex-1-en-1-yl)-3,7-dimethylnona-2,4,6,8-tetraen-1-yl)-N-methylaniline | |
| D11<br>(Z)-N-((2Z,4E,6E,8E)-9-(3-(1H-imidazol-1-yl)-2,6,6-trimethylcyclohex-1-en-1-yl)-3,7-dimethylnona-2,4,6,8-tetraen-1-ylidene)aniline | |

Rationale structural modifications of small molecules allow for their interactions with molecular target(s) in ways that could lead to improved drug-like compounds, and possibly enhanced in vivo pharmacokinetic profiles.[12,13] The present inventors have exploited 13-CRA's scaffold as a strategy to design novel potent and efficacious retinamides with improved drug-like properties. 13-CRA has long elimination half-life in humans[14-16] and most animal species.[17] In addition, the inventors have explored rational modification of the terminal amide moiety, C-4 heterocycles and the cyclohexene ring:

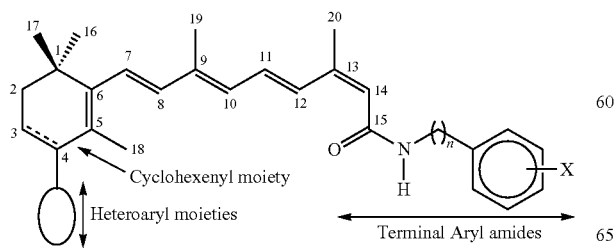

Based on the continued success of the C-imidazole retinamides with the ATRA scaffolds as promising anti-cancer agents,[58] the inventors have designed and synthesized Compounds 16-25 as outlined in Scheme 7 below, involving C-4 azoyl/terminal amide modifications.

On the basis of previous findings that structural rigidification that introduces conformational constrains around rotatable bonds contributed to higher specificity and potency, greater metabolic stability, and improved bioavailability,[59] the inventors designed and synthesized several cyclohexadiene C-4 aryl substituted retinamides, Compounds 33-40 as outlined in Scheme 8 below. A potential advantage of this strategy is that the achiral nature of these compounds would not require the tedious characterization of the racemates and pure enantiomers as would be required in advanced preclinical development for the chiral compounds of Scheme 7.[60]

Scheme 7: Synthesis of C-4 Azoyl/terminal Amide Compounds 17-22[a]

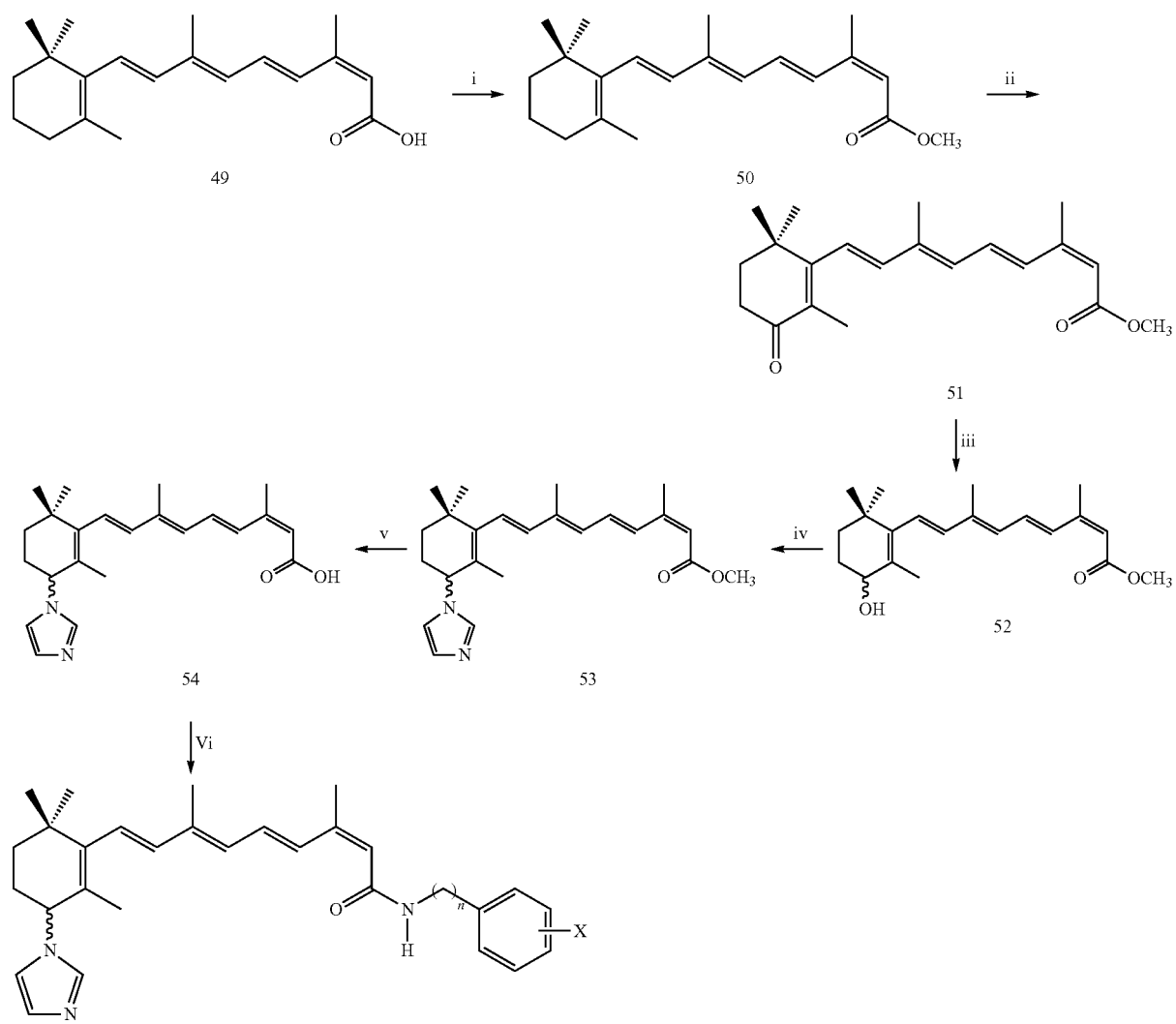

| Comp. | n | X | Comp. | n | X |
|-------|---|------|-------|---|------|
| 55 | 0 | H | 60 | 1 | H |
| 56 | 0 | p-OH | 61 | 1 | p-OH |
| 57 | 0 | o-OH | 62 | 1 | p-F |
| 58 | 0 | p-F | 63 | 1 | m-F |
| 59 | 0 | m-F | 64 | 2 | p-OH |

([a]Reagents and conditions: (i) (CH$_3$)$_3$SiCHN$_2$, MeOH/benzene; (ii) MnO$_2$, CH$_2$Cl$_2$, (iii) NaBH$_4$, MeOH; (iv) CDI, CH$_3$CN; (v) 2M KOH, MeOH, reflux; (vi) EDC, HOBT, DIEA, appropriate anilines, DMF).

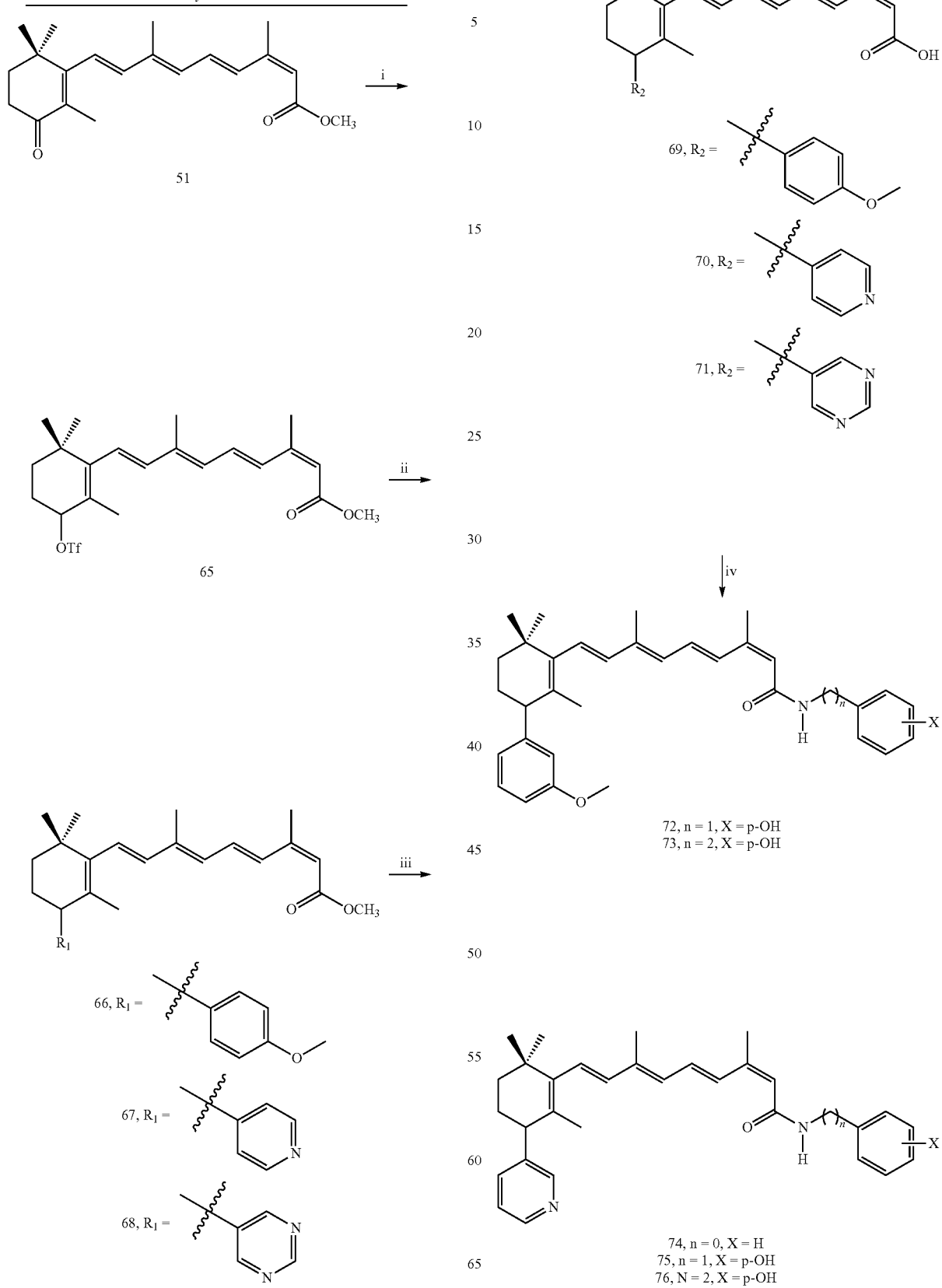

-continued

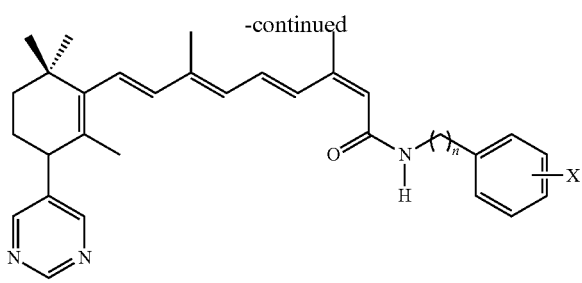

77, n = 0, X = H
78, n = 1, X = p-OH
79, N = 2, X = p-OH (*aReagents and condtions: (i) 5-Chloro-2-pyridyl triflimide, NaN(SiMe₃)₂, THF; (ii) 3-methoxybenzylboronic acid, Pd(PPh₃)₄, CeCO₃, dioxane, reflux; (iii) 2M KOH, MeOH, reflux (iv) EDC, HOBT, DIEA, appropriate benzylamine, DMF).

The synthesis of (2Z,4E,6E,8E)-9-(3-(1H-imidazol-1-yl)-2,6,6-trimethylcyclohex-1-en-1-yl)-3,7-dimethylnona-2,4,6,8-tetraenoic acid (Compound 54) was carried out in five steps from the commercially available 13-CRA (Compound 49) and the procedure was adopted from our reported procedures of ATRA based retinamides.[24]

Protection of the carboxylic acid as the methyl ester (Compound 50) was done using trimethylsilyldiazomethane in hexanes followed by allylic oxidation using $NnO_2$ to give 4-oxo intermediate (Compound 51). Reduction of Compound 51 using $NaBH_4$ gave the (±)-4-hydroxymethylterionate (Compound 52) which was further treated with carbonyldiimidazole (CDI) at ambient temperature to yield (±)-(1H-imidazol-1-methylterionate (Compound 53). Alkaline hydrolysis of Compound 53 in refluxing methanol gave the desired free acid Compound 54. Coupling of the respective amines with Compound 54 was successfully achieved using ethyl(dimethylaminopropyl) carbodiimide (EDC), hydroxybenzotriazole (HOBt), and diisopropylethylamine (DIEA) to give Compounds 55-64 (Scheme 7), respectively.

The synthesis of achiral C-4 aryl retinamides Compounds 72-79 (Scheme 8) commenced from the 4-oxo intermediate (Compound 51). Generation of enolate using sodium bis(trimethylsilyl)amide in THF solution and trapping of the enolate with N-(5-chloro-2-pyridyl)bistrifluoromethanesulfonimide furnished the vinyl triflate Compound 65 according to the reported procedure.[18] However, it should be noted that this reaction was carried out at −78° C. throughout the reaction time, because, at higher temperatures, decomposition occurred and ≤20% of the products were obtained. Regiospecific palladium-catalyzed cross-coupling reaction with boronic acids[19] provided Compounds 66-68. Ester hydrolysis using 2M KOH gave the corresponding free acids Compounds 69-71. Coupling of these respective acids with appropriate amines was successfully achieved using EDC, HOBt, and DIEA to give Compounds 72-79 (Scheme 8), respectively.

Pharmaceutical Formulation and Treatment Method

The retinamides of the present disclosure can be used to prepare formulations for treating dermatological conditions, including, but not limited to, acne, eczema, psoriasis, ichthyosis, cold sores, wounds, burns, sunburns (photoaging), and skin cancer. In some embodiments, the dermatological condition is acne. In some embodiments, the skin cancer is one selected from the group consisting of squamous cell carcinoma, basal cell carcinoma, and melanoma.

A method for treating any of the dermatological conditions described herein in a human subject in need thereof includes administering a therapeutically effective amount of at least one retinamide of the present disclosure (or a pharmaceutically acceptable salts, pharmaceutically acceptable N-oxides, pharmaceutically active metabolites, pharmaceutically acceptable prodrugs, and pharmaceutically acceptable solvates thereof). In at least some embodiments, the method includes administering a pharmaceutical composition comprising a therapeutically effective amount of the at least one retinamide.

In some embodiments, the at least one retinamide includes a C-4 azolyl retinamide. In some embodiments, the C-4 azolyl retinamide is an anilineamide RAMBA. In some embodiments, the anilineamide RAMBA is Compound VNLG-152.

In some embodiments, the at least one retinamide includes a 13-cis-RAMBA retinamide. In some embodiments, the 13-cis-RAMBA retinamide is a Series B derivative. In some embodiments, the Series B derivative is Compound B1 (VNHM-1-73, (2Z,4E,6E,8E)-9-(3-(1H-imidazol-1-yl)-2,6,6-trimethylcyclohex-1-en-1-yl)-N-(4-hydroxybenzyl)-3,7-dimethylnona-2,4,6,8-tetraenamide).

The retinamides of the present disclosure can be converted into a pharmaceutically acceptable salt or pharmaceutically acceptable solvate or other physical forms (e.g., polymorphs by way of example only and not limitation) via any appropriate method known to those skilled in the art. The retinamides of the present disclosure can also be administered as a prodrug or as a separate compound.

A "therapeutically effective amount" of a retinamide is the amount that effectively achieves the desired therapeutic result in the subject. Such amounts may be initially determined by knowledge in the art, by conducting in vitro tests, and/or by conducting metabolic studies in healthy experimental animals. Naturally, the dosages of the various retinamides of the present disclosure will vary somewhat depending upon the host treated, the particular mode of administration, among other factors. Those skilled in the art can determine the optimal dosing of the retinamide of the present disclosure selected based on clinical experience and the treatment indication.

In addition to the at least one retinamide of the present disclosure, the pharmaceutical composition may comprise a pharmaceutically acceptable carrier. A "pharmaceutically acceptable carrier" refers to those components in the particular dosage form employed, which are considered inert and are typically employed in the pharmaceutical arts to formulate a dosage form containing a particular active compound. The pharmaceutically acceptable inactive ingredient may be at least one selected from the group consisting of carriers, disintegrating agent, flavoring agent, stabilizers, diluents, dispersing agents, suspending agents, thickening agents, lubricant, dispersant, excipients, and the like.

The composition according to the present disclosure is configured to facilitate administration of a retinamide to a subject. A retinamide of the present disclosure, or a pharmaceutical composition containing, the retinamide, can be administered according to any available method and route suitable for drug delivery, including, but not limited to, intranasal, intramuscular, intratracheal, subcutaneous, intradermal, transdermal, sublingual, topical application, intravenous, ocular (e.g., topically to the eye, intravitreal, etc.), rectal, nasal, oral, topical administration, and other enteral and parenteral routes of administration. Methods of administering a retinamide of the present disclosure through the skin or mucosa include, but not limited to, topical application of a suitable pharmaceutical preparation, transdermal transmission, injection and epidermal administration.

In at least some embodiments, a retinamide of the present disclosure is preferably administered topically or orally.

A "topical" administration or application refers to epicutaneous application administration or application, or administration onto skin. A topical composition according to the present disclosure is formulated to be suitable for topical administration. Such a topical composition comprises at least one retinamide of the present disclosure, and a dermatologically acceptable excipient and/or carrier. A component is "dermatologically acceptable" if it is suitable for use in contact with human skin without undue toxicity, incompatibility, instability, allergic response, and the like. Suitable carriers and excipients include, but are not limited to, disintegrating agent, flavoring agent, stabilizers, diluents, dispersing agents, suspending agents, thickening agents, lubricant, dispersant, emollients, humectants, guanidine, glycolic acid and glycolate salts (e.g. ammonium and quaternary alkyl ammonium), lactic acid and lactate salts (e.g., ammonium and quaternary alkyl ammonium), aloe vera in any of its variety of forms (e.g., gel), sugar and starch derivatives (e.g., alkoxylated glucose), hyaluronic acid, lactamide monoethanolamine, acetamide monoethanolamine, and the like.

The topical composition may be provided in the form of gel, lotion, cream, ointment, foam, emulsion, paste, balm, spray, suspension, salve, film, facial/skin peel, and the like. These may be formulated for applying the appropriate dosage topically to the affected area as many times a day as appropriate.

Aerosol formulations for use in this disclosure may include propellants, such as a fluorinated alkane, surfactants and co-solvents and may be filled into aluminum or other conventional aerosol containers which are then closed by a suitable metering valve and pressurized with propellant, producing a metered dose inhaler. Aerosol formulations are typically suitable for nasal or oral inhalation, and may be in powder or solution form, in combination with a compressed gas, typically compressed air. Aerosol formulations may also be useful topically.

Depending upon the particular compositions selected, transdermal delivery may be an option, providing a relatively steady state delivery of the medication which is preferred in some circumstances. Transdermal delivery typically involves the use of a compound in solution, with an alcoholic vehicle, optionally a penetration enhancer, such as a surfactant and other optional ingredients. Matrix and reservoir type transdermal delivery systems are examples of suitable transdermal systems. Transdermal delivery differs from conventional topical treatment in that the dosage form delivers a systemic dose of medication to the patient.

For oral administration, a retinamide of the present disclosure can be formulated, for example, by combining the active compounds with pharmaceutically acceptable carriers or excipients known in the art. Such carriers enable a retinamide of the present disclosure to be formulated as tablets, powders, pills, dragees, capsules, liquids, gels, syrups, elixirs, slurries, suspensions and the like, for oral ingestion by a patient to be treated.

Delivery of a retinamide may be enhanced by promoting a more pharmacologically effective amount of the compound reaching a site of action. The delivery may also be enhanced by promoting a more effective delivery of the compound across a cell membrane or within the cell and across the intra-cellular space.

Non-limiting examples of suitable carriers of excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include lubricating agents such as talc, magnesium stearate, and mineral oil; wetting agents; emulsifying and suspending agents; preserving agents such as methyl- and propyl-hydroxybenzoates, sweetening agents; and flavoring agents.

A retinamide of the present disclosure may be applied to exert a local or a systemic effect, or both. For example, where systemic delivery is desired, administration may involve invasive or systemically absorbed topical or mucosal administration of pharmaceutical preparation. A pharmaceutical composition containing a retinamide of the present disclosure may be administered in a targeted drug delivery system, for example, in a liposome coated with organ-specific antibody. The liposomes will be targeted to and taken up selectively by the organ. In addition, a pharmaceutical composition containing a retinamide of the present disclosure may be formulated according to suitable procedures known in the art to be a rapid release formulation, an extended release formulation, or an intermediate release formulation.

A retinamide of the present disclosure can be used as a monotherapy or in combination with other therapeutic agents. By way of example only, the therapeutic effectiveness of one of the compounds described herein may be enhanced by administration of an adjuvant (i.e., by itself the adjuvant may only have minimal therapeutic benefit, but in combination with another therapeutic agent, the overall therapeutic benefit to the patient is enhanced). Or, by way of example only, the benefit experienced by a patient may be increased by administering one of the compounds of the present disclosure with another therapeutic agent (which also includes a therapeutic regimen) that also has therapeutic benefit. In any case, regardless of the disease or condition being treated, the overall benefit experienced by the patient may simply be additive of the two therapeutic agents or the patient may experience a synergistic benefit. Where the compounds of the present disclosure are administered in conjunction with other therapies, dosages of the co-administered compounds will of course vary depending on the type of co-drug employed, on the specific drug employed, on the disease or condition being treated and so forth. In addition, when co-administered with one or more biologically active agents, the compound provided herein may be administered either simultaneously with the biologically active agent(s), or sequentially. If administered sequentially, the attending physician will decide on the appropriate sequence of administering protein in combination with the biologically active agent(s).

In at least some embodiments, a retinamide of the present disclosure is used in combination therapy with a retinoid. More particularly, a retinamide of the present disclosure may be used in combination therapy with ATRA, 13-CRA, and/or 9-CRA. In at least some embodiments, a retinamide of the present disclosure is used combination therapy with one or more of the other retinamides described in the present disclosure.

The multiple therapeutic agents (at least one of which is a retinamide of the present disclosure) may be administered in any order or even simultaneously. If simultaneously, the multiple therapeutic agents may be provided in a single, unified form, or in multiple forms (by way of example only, either as a single pill or as two separate pills). One of the therapeutic agents may be given in multiple doses, or both may be given as multiple doses. If not simultaneous, the timing between the multiple doses may vary from more than zero weeks to less than four weeks. In addition, the combination methods, compositions and formulations are not to be limited to the use of only two agents. Multiple therapeutic combinations are envisioned.

A retinamide of the present disclosure may also be used in combination with procedures that may provide additional or synergistic benefit to the patient. By way of example only, patients are expected to find therapeutic and/or prophylactic benefit in the methods described herein, wherein pharmaceutical composition of the present disclosure and for combinations with other therapeutics are combined with genetic testing to determine whether that individual is a carrier of a mutant gene that is known to be correlated with certain diseases or conditions.

A retinamide of the present disclosure, whether as monotherapy or in combination therapy, may be administered before, during or after the occurrence of the dermatological disease or condition, and the timing of administering the composition containing a compound can vary. Thus, for example, a retinamide can be used as a prophylactic and can be administered continuously to subjects with a propensity to conditions in order to prevent the occurrence of the disease or condition. A retinamide may be administered to a subject during or as soon as possible after the onset of the symptoms. A retinamide is preferably administered as soon as is practicable after the onset of the dermatological disease or condition is detected or suspected, and for a length of time necessary for the treatment of the disease. The length of treatment can vary for each subject, and the length can be determined using known criteria. Administration can be acute (for example, of short duration (e.g., single administration, administration for one day to one week)), or chronic (for example, of long duration, (e.g., administration for longer than one week, from about 2 weeks to about one month, from about one month to about 3 months, from about 3 months to about 6 months, from about 6 months to about 1 year, or longer than one year)).

The pharmaceutical composition according to the present disclosure may be in unit dosage forms suitable for single administration of precise dosages. In unit dosage form, the formulation is divided into unit doses containing appropriate quantities of one or more of the retinamides of the present disclosure. The unit dosage may be in the form of a package containing discrete quantities of the formulation. Non-limiting examples are packaged tablets or capsules, and powders in vials or ampoules. Aqueous suspension compositions can be packaged in single-dose non-reclosable containers. In some embodiments, multiple-dose reclosable containers can be used, in which case it is typical to include a preservative in the composition. By way of example only, formulations for parenteral injection may be presented in unit dosage form, which include, but are not limited to ampoules, or in multi-dose containers, with an added preservative.

As used herein, "treat" and all its forms and tenses (including, for example, treat, treating, treated, and treatment) refer to therapeutic treatment and/or prophylactic or preventative treatment. Those in need of treatment include those already with a pathological condition described in the present disclosure (including, for example, dermatological diseases and cancer) as well as those in which the pathological condition is to be prevented. For example, "treat" means alter, apply, effect, improve, care for or deal with medically or surgically, ameliorate, cure, stop and/or prevent an undesired biological (pathogenic) process. Those of ordinary skill in the art are aware that a treatment may or may not cure.

EXAMPLES

Example 1

Effects of structural analogs of ATRA in comparison with other clinically relevant retinoids, including ATRA, 13-CRA, and 9-CRA, on the growth and proliferation of human adult keratinocytes and sebocytes are studied.

Cell Culture and Treatment

Human adult keratinocytes (pooled) (ZenBio Inc., Research Triangle Park, NC) were cultured in human adult keratinocyte growth medium (KM-2). The SEB-1 human primary sebocytes (ZenBio Inc., Research Triangle Park, NC) were cultured and maintained in sebocyte growth medium. Cells were plated 1 day prior to treatment. Retinamides (VNLG-152 and VNHM-1-73) and other clinically relevant retinoids (13-CRA, 9-CRA, and ATRA) were treated at indicated concentration and time periods and incubated at 37° C. in 5% $CO_2$.

Growth Inhibition Assays

Assays for normal human adult keratinocytes (NHAKs) and human SEB-1 sebocytes growth inhibition were performed as described previously[20]. Adult human keratinocytes or sebocytes were treated with VNLG-152, VNHM-1-73 and other retinoids for 7 days. MTT assay was performed at the end of the experiment. Results represent the mean±standard deviation of three independent experiments.

Cell Apoptosis Assay (Acridine Orange/Ethidium Bromide (AO/EB) Dual Staining and in Situ Cell Death Detection Assay For acridine orange/ethidium bromide (AO/EB) dual staining assay, keratinocytes were treated with indicated concentrations of the compounds for 24.48 and 72 h. At the end of incubation period, 100 μl of 1:1 ratio of acridine orange (0.1%) and ethidium bromide (0.2%) in PBS were added to the cells and incubated at 37° C. and 5% $CO_2$ for 30 min. Cells were then immediately analyzed using Nikon TE2000 fluorescence microscope. Assessment of the apoptotic potential by in situ Cell Death Detection assay was done as per protocol of the manufacturer (Roche Diagnostics).

Reconstructed Human Epidermis (RHE) Model

For histological and immunostaining studies, reconstructed human Epidermis (RHE) grown for 12 days at the air medium interface, were purchased from CellSystems® GmbH (epiCS). RHE models are three dimensional human epidermis equivalents they are derived from normal human keratinocytes and form a multilayered, highly differentiated model of the human epidermis that mimics biochemical and physiological properties of the epidermis. During cultivation the tissue cultures are lifted to the air-liquid interphase to induce differentiation, epithelial stratification and cornification. The cellular structure of RHE closely resembles the human epidermis including a basement membrane, proliferating keratinocytes and a stratum corneum with intact barrier function.[61]

As recommended RHE were grown for 1 day in epiCS growth medium before stimulation in the absence and presence of 0.02% VNLG-152, ATRA and 13-CRA for 3 days. The compounds were applied topically to the triplicate RHE tissues and incubated at 37° C. RHE were then fixed in a 10% formalin and embedded in paraffin. 4 μM vertical sections were stained with H and E or stained with K10, K19 and filaggrin anti-bodies (Santa Cruz Biotechnology) and counterstained with haematoxylin as described earlier.[62]

Results

The retinamides according to the present disclosure inhibit proliferation of adult normal human adult keratinocytes (NHAKs) and human SEB-1 sebocytes. Analysis of the effect of retinamides of the present disclosure [VNLG-152 and VNHM-1-73], 13-CRA, 9-CRA, and ATRA on the growth and proliferation of adult keratinocytes (pooled) by MTT assay revealed that the NRs effectively inhibited the proliferation of adult normal keratinocytes (NHAKs) with $GI_{50}$ values of 0.239 and 1.28 µM, respectively.

Figure 1B:
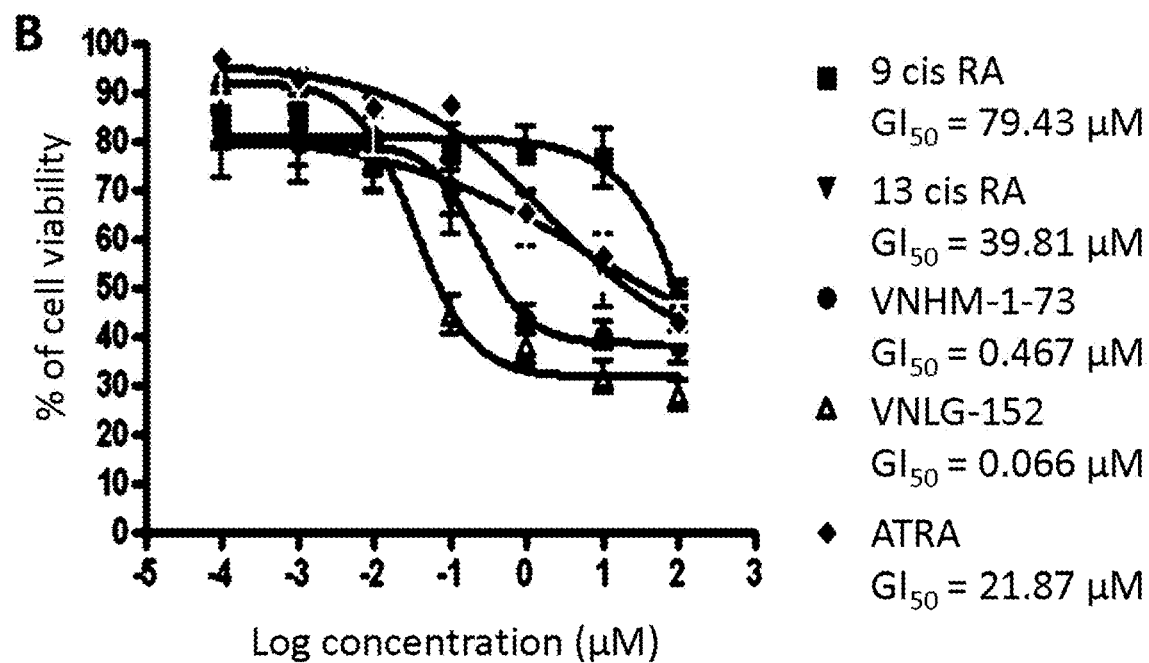

In contrast, the clinically relevant retinoids[17] tested, exhibited $GI_{50}$ values in the range between 63.09-95.63 µM (FIG. 1A). In similar studies, using human SEB-1 sebocytes, the $GI_{50}$ values of VNLG-152 and VNHM-1-73 were 0.066 and 0.467 µM, respectively. In marked contrast, the clinically relevant retinoids[17] tested, exhibited $GI_{50}$ values in the range between 21.87-79.43 µM (FIG. 1B).

The retinamides according to the present disclosure are potent anti-proliferative inhibitors of adult human keratinocytes and sebocytes compared to the clinically relevant retinoids. Most notably, VNHM-1-73 and VNLG-152 exhibited 59.3- and 317.4-fold, respectively (for NHAKs), and 85-603-fold, respectively (for SEB-1) more potent inhibition of keratinorytes/seborytes growth than the U.S. Food and Drug Administration (FDA) approved anti-acne drug, 13-CRA (isotretinoin). Detailed studies on the effect of retinamides of the present disclosure on the biochemical molecules and cellular pathways associated with acne pathogenesis are ongoing to elucidate the molecular mechanisms by which the retinamides of the present disclosure inhibit the growth of adult keratinocytes and sebocytes.

In adult human keratinocytes and sebocytes, retinamides of the present disclosure, and in particular, VNLG-152 and VNHM-1-73, strongly inhibit the growth of the keratinocytes and sebocytes, as compared to other retinoids such as ATRA and 13-CRA. VNLG-152 is also powerful in inducing apoptosis in NHAKs at minimal concentrations compared to ATRA or 13-CRA. Most notably, the effect of VNLG-152 in inhibiting NHAKs and sebocytes as determined by their $GI_{50}$ values (0.066-0.239 µmol/L) was remarkably more prevailing than $GI_{50}$ values observed for 13-CRA (isotretinoin) (26.02-96.45 µmol/L) that has earned much clinical interest for the treatment of acne vulgaris and other skin disorders. 13-CRA, 9-CRA, and ATRA have been shown to reduce proliferation of immortalized human sebocytes SZ95 by approximately 50% after 9 days.[63] 13-CRA have been reported to cause significant dose-dependent and time-dependent decreases in viable SEB-1 sebocytes in a manner far better than 9-CRA or ATRA.[64] It has also been reported that the ability of 13-CRA to induce apoptosis cannot be recapitulated by 9-cis RA or ATRA, indicating that 13-CRA was better than 9-CRA or ATRA in reducing sebum production and the resolution of acne.[64]

Remarkably, the present inventors have discovered that VNLG-152 inhibits the growth/proliferation and induces apoptosis in normal human adult keratinocytes at concentrations far less than that observed for 13-CRA. Moreover, VNLG-152 is about 35 times more potent than 13-CRA in reducing the growth of SEB-1 sebocytes. Combination studies with 13-CRA and VNLG-152 in NHAKs show that VNLG-152 actually increases the growth inhibiting potencies of 13-CRA. These results together indicate that VNLG-152 exhibits potent antikeratinization and sebosuppressive effects in normal human adult keratinocytes and SEB-1 sebocytes, and in a manner far better than 13-CRA or ATRA.

Reconstructed human epidermis (RHE) is a stratified culture that shares histological features that closely resemble human epidermis in vivo (basal layer and differentiating spinous, granular, and cornified layers). RHE is commonly used to evaluate therapeutic efficacy of compounds for keratinization disorders.[61] VNLG-152 induces in vitro effects in RHE cultures, which are more potent compared to 13-CRA-treated cultures. These effects include degranulation, induction of K19 expression, and reduction of K10 and filaggrin. K19 is a non-epidermal keratin that is absent in normal human epidermis. K10 is an early biomarker of epidermal differentiation and is normally expressed in all suprabasal layers. Filaggrin is a marker of late-stage keratinocyte differentiation that is normally expressed in the stratum granulosum.[62,65,66] Although the immunohistochemistry data are not quantitative, the demonstrated in vitro efficacy, of VNLG-152 suggests that the retinamide directly affects differentiating keratinocytes with well-established dekeratinizing effects. The antikeratinizing effects of VNLG-152 in RHE are either similar (as compared to ATRA) or more potent (as compared to 13-CRA) to other available topical retinoids.

Retinamides of the present disclosure, including VNLG-152, exhibit exclusive antikeratinization and sebosuppressive effects in normal adult human keratinocytes, sebocyte cells and RAF cultures. Thus, retinamides of the present disclosure, including VNLG-152, are capable of inducing strong in vitro dekeratinizing and sebosuppressive effects may be effective in treating skin diseases involving abnormal keratinization.

Example 2

To determine whether VNLG-152 potentiates the anti-proliferative effects of ATRA or 13-CRA on NHAK, NHAK cells were continuously incubated with ATRA or 13-CRA (0.1 to 10,000 nM) alone and in combination with low dose (40 nM, dose that exhibited low [<10%] anti-proliferative effect) of VNLG-152.

Figures 2A, 2B:
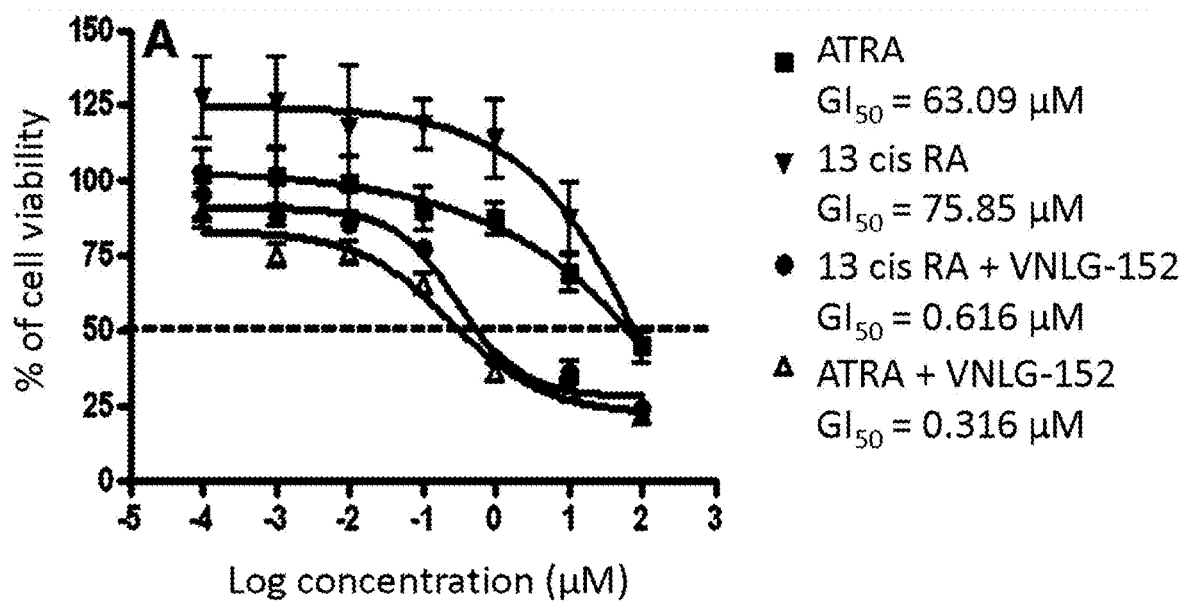

ATRA and 13-CRA inhibited NHK cells in dose-dependent fashions with $GI_{50}$ values of 63.09 and 75.85 µM, respectively (FIG. 2A). VNLG-152 in combination with ATRA or 13-CRA significantly enhanced the anti-proliferative activities of ATRA or 13-CRA, by 200- and 123-fold, respectively (FIGS. 2A and 2B).

Example 3

To further determine whether the observed decrease in growth of keratinocytes was due to induction of cell death, we evaluated apoptosis inducing potential of VNLG-1.52 compared to ATRA and 13-CRA in keratinocytes by acridine orange ethidium bromide (AO/EB) dual staining.

Figure 3A:
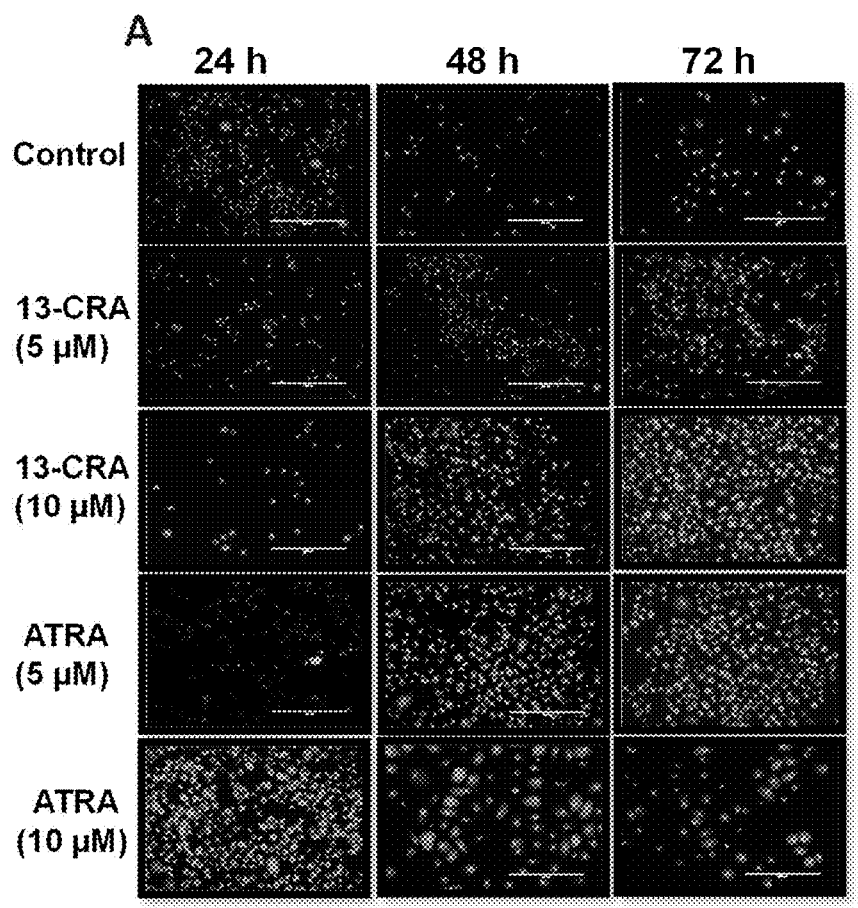
Figure 3B:
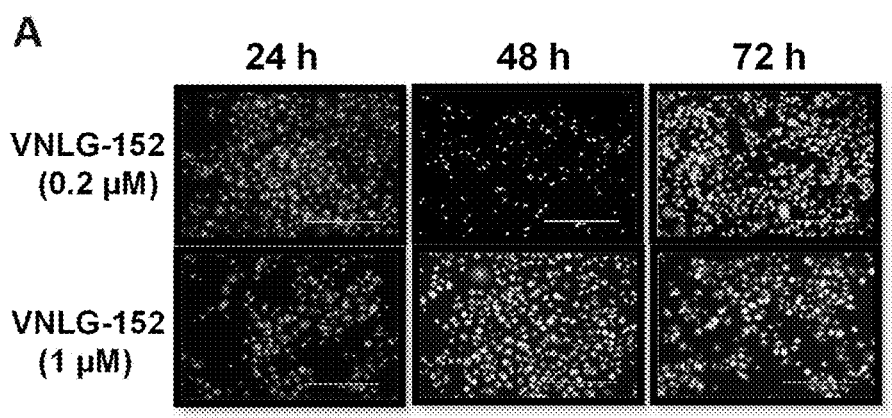
Figure 3C:
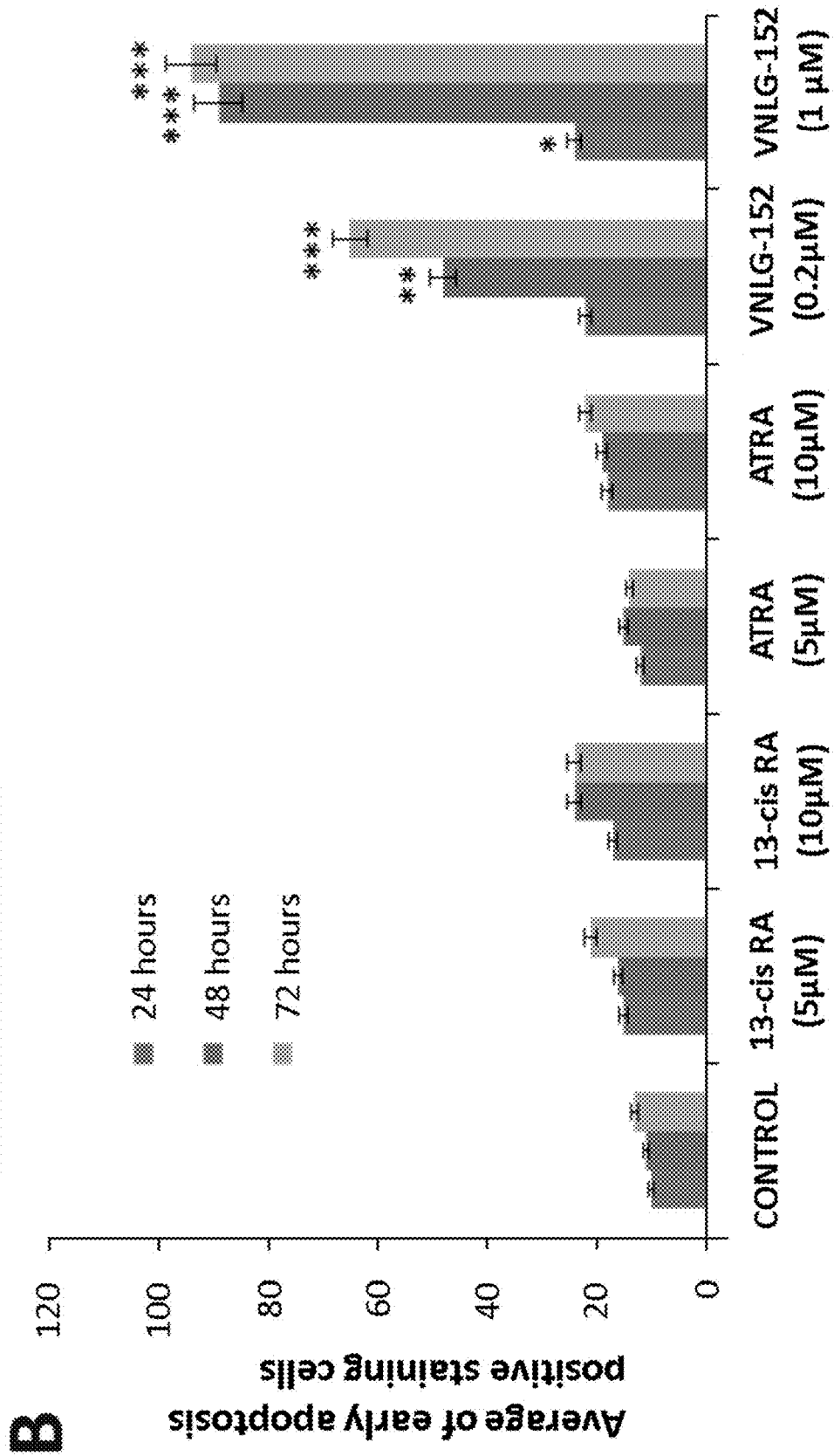

AO/EB dual staining established that VNLG-152 (0.2 µM, 48 and 72 h) exhibit strong pro-apoptotic effects compared to that of 13-CRA and ATRA (5 and 10 µM at 24, 48 and 72 h) (FIGS. 3A, 3B, and 3C). In FIGS. 3A and 3B, the plates were analyzed for early apoptotic and viable cells using acridine orange/ethidium bromide staining. Viable cells (the nucleus evenly circulated in the cell center) and early apoptotic cells displayed yellow green fluorescence in the nucleus. Late apoptotic cells exhibited orange fluorescence in the nucleus. In FIG. 3C, the bars are means of three replicate determinations plus standard deviations. Statistical analysis was performed with ANOVA two factor with replication (*$P<0.05$, $P<0.01$, *$P<0.001$).

The apoptosis inducing potential of VNLG-152 was evaluated by TUNEL assay in NHAK. The individual cell lines as indicated were seeded in 8 well chamber slides, and treated with indicated concentrations and times of 13-CRA, ATRA and VNLG-/152. After 72 hours, the plates were analyzed for TUNEL positive staining. Statistical analysis was performed with ANOVA two factor with replication (*P<0.05, P<0.01, *P<0.001).

Figure 4A:
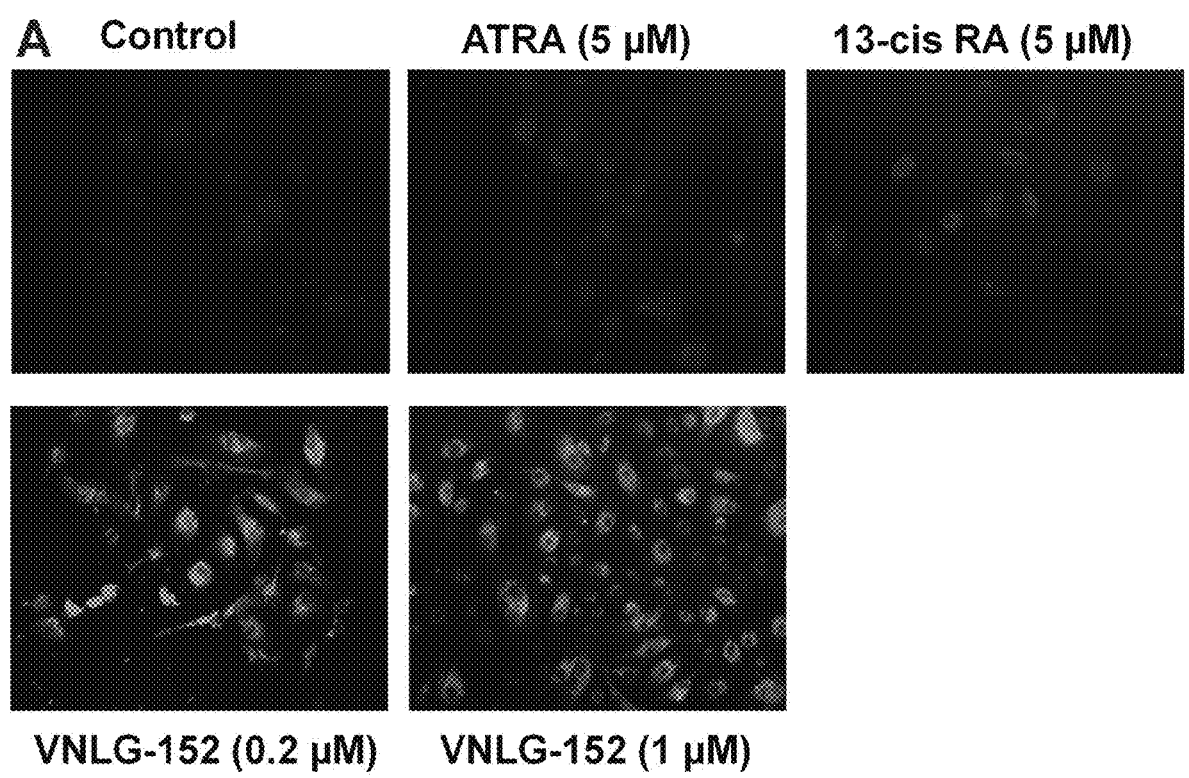
Figure 4B:
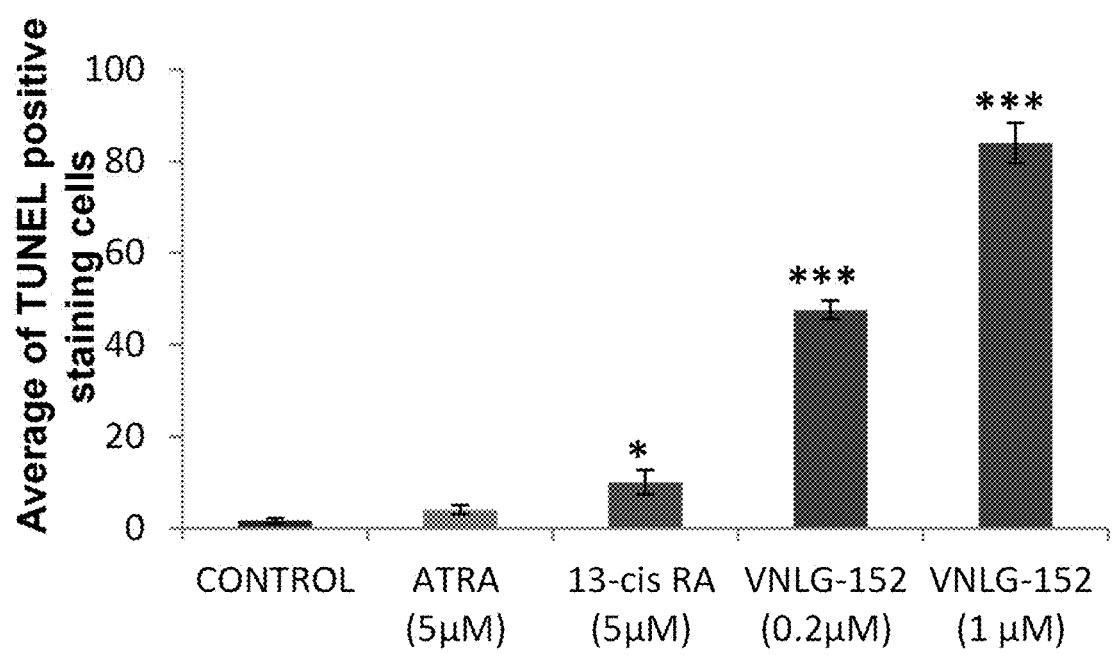

After 72 hours, even at a low concentration of 0.2 μM VNLG-152 efficiently induced apoptosis (~50% versus control), in contrast to ATRA and 13-CRA. Induction of apoptosis increased to ~84% with 1 μM VNLG-152. (FIGS. 4A and 4B).

Example 4

Figure 5A:
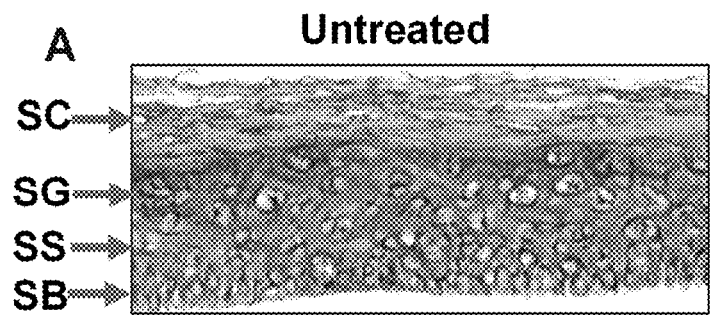
FIGS. 5A to 5E show a morphological comparison of reconstructed human epidermis (RHE) tissues treated topically with formulations containing various retinoids and a retinamide according to the present disclosure (namely, VNLG-152). RHE tissues were untreated (FIG. 5A) or treated with vehicle (ethanol) (FIG. 5B), ATRA 0.02% solution (FIG. 5C), 13-CRA 0.02% (FIG. 5D); and VNLG-152 0.02% (FIG. 5E).
Figure 5B:
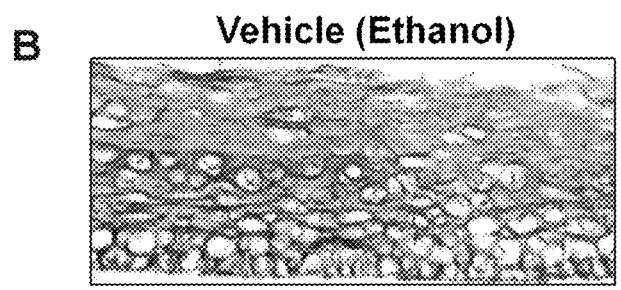
Figure 5C:
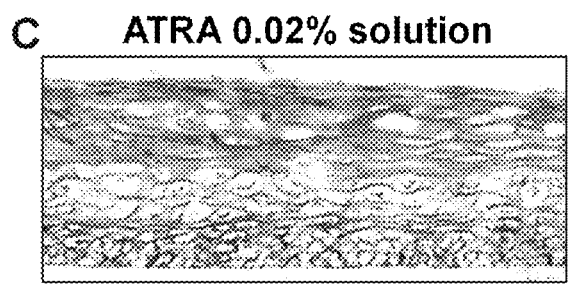
Figure 5D:
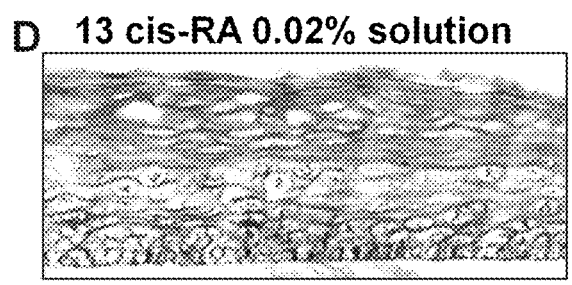
Figure 5E:
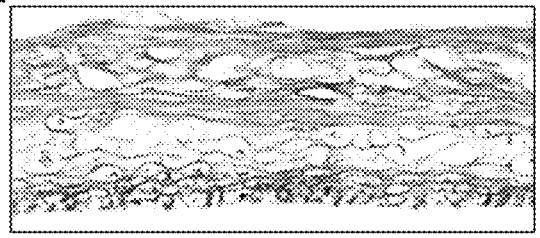

Histological analysis of control RHE showed a keratinized, multistratified epithelium resembling human epidermis in vivo containing intact basal (cells were polarized vertically), spinous, granulous and cornified cell layers and numerous keratohyalin granules in the stratum granulosum. RHE tissues were treated with indicated concentration and incubated for 3 days at 37° C. Following treatment tissues were fixed, sectioned and stained with H and E. Representative images from three independent experiments are shown in FIG. 5A to 5E. RHE tissues were untreated (FIG. 5A) or treated with vehicle (ethanol) (FIG. SB), ATRA 0.02% solution (FIG. 5C), 13-CRA 0.02% (FIG. 5D); and VNLG-152 0.02% (FIG. 5E). The RHE treated with VNLG-152, ATRA and 13 CRA showed a loss of keratohyalin granules in the upper granular layer. Whereas vehicle treated cultures were similar to untreated controls, indicating that VNLG-152 may have a therapeutic benefit in the local management of keratinization disorders. In the figures, "SC" refers to "stratum corneum", "SG" to "stratum granulosum", "SS" to "stratum spinosum", and "SB" to "stratum basale".

Example 5

Figure 6A:
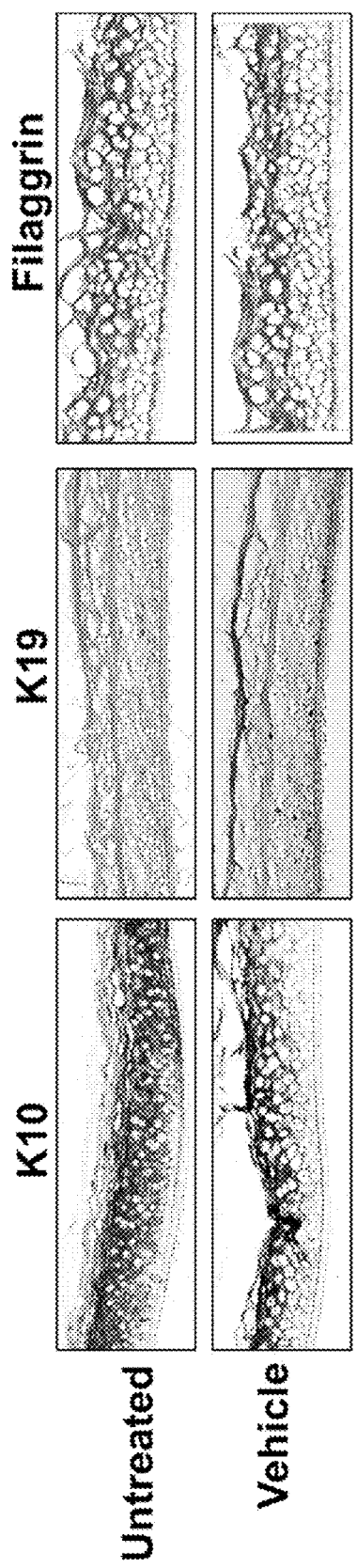
FIGS. 6A and 6B show keratin 10 (K10), keratin 19 (K19) and filaggrin expressions in RHE cultures treated topically with various agents. RHE tissues were untreated (FIG. 6A) or treated with vehicle alone and treated with VNLG-152, ATRA or 13-CRA (FIG. 6B).
Figure 6B:
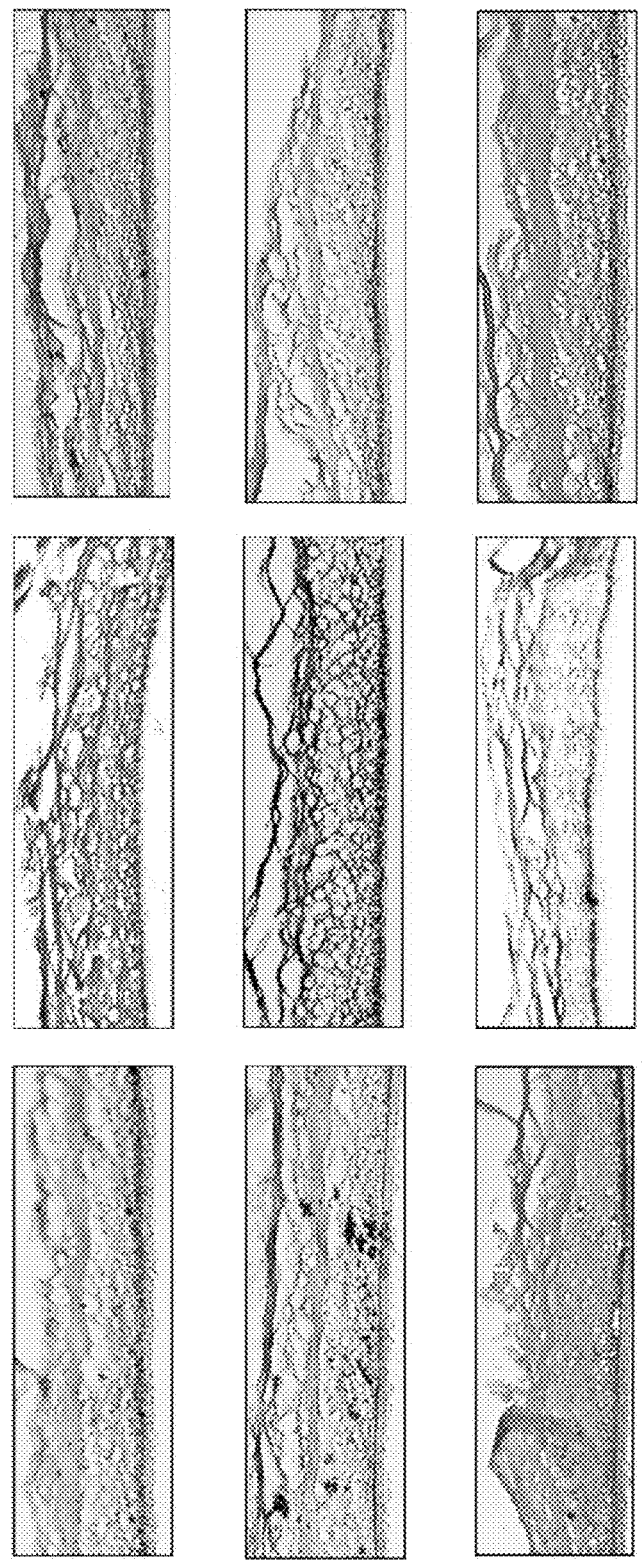

RHE tissues were untreated (FIG. 6A) or treated with vehicle alone and treated with VNLG-152, ATRA or 13-CRA (FIG. 6B). Following incubation for 3 days at 37° C., tissues were fixed, sectioned, and stained for K10, K19 or filaggrin. Representative micrographs from triplicate cultures are shown. The immunolabelling of K10 and filaggrin revealed that in supra a basal (sb) and stratum granulosum (sg) layer was strongly expressed in both vehicle and untreated control groups. Treatment with VNLG-152, and ATRA reduced the expression of these proteins in sb and sg layers. In 13-CRA treated tissues, the expression of these proteins (K10 and filaggrin) was slightly increased compared to VNLG-152 and ATRA treated tissues. The expression of K19 was not present in vehicle and untreated control groups. Treatment with VNLG-152 and ATRA induced significant increase in the expression of K19 in viable cell layers. In 13-CRA treated tissues, the expression of K19 although higher to control, was comparatively lower than VNLG-152 or ATRA treated groups.

REFERENCES

1. Zotrboulis, "Is acne vulgaris a genuine inflammatory disease?", *Dermatology*, 2001, 203(4), 277-9.
2. Katsambas and Dessinioti, "New and emerging treatments in dermatology: acne", *Dermatologic Therapy*, 2008, 21(2), 86-95.
3. White, "Recent findings in the epidemiologic evidence, classification, and subtypes of acne vulgaris", *Journal of the American Academy of Dermatology*, 1998, 39(2, Pt 3), S34-7.
4. Gollnick., "Current concepts of the pathogenesis of acne: implications for drug treatment", *Drugs*, 2003, 63(15), 1579-96.
5. Mangelsdorf, D. A. et al., THE RETINOIDS: BIOLOGY, CHEMISTRY, AND MEDICINE, 2nd Ed. Sporn, M. B., Roberts, A. B., Goodman, D. S., editors, New York: Raven Press, 1994, 319-349.
6. Orfanos et al., "Current use and future potential role of retinoids in dermatology", *Drugs*, 1997, 53(3), 358-88.
7. Zouboulis, "Retinoids—which dermatological indications will benefit in the near future?", *Skin Pharmacology and Applied Skin Physiology*, 2001, 14(5), 303-15.
8. Leyden, "A review of the use of combination therapies for the treatment of acne vulgaris", *Journal of the American Academy of Dermatology*, 2003, 49(3, Suppl), S200-10.
9. Leyden et al. "Topical retinoids in inflammatory acne: a retrospective, investigator-blinded, vehicle-controlled, photographic assessment", *Clinical Therapeutics*, 2005, 27(2), 216-24.
10. Thiboutot et al., "New insights into the management of acne: An update from the Global Alliance to improve outcomes in Acne group", *Journal of the American Academy of Dermatology*, 2009, 60(5 Suppl), S1-50.
11. Thielitz et al, "Control of microcomedone formation throughout a maintenance treatment with adapalene gel, 0.1%", *Journal of the European Academy of Dermatology and Venereology*, 2007, 21(6), 747-53.
12. Chambon, "A decade of molecular biology of retinoic acid receptors", *FASEB*, 1996. 10(9), 940-954.
13. (a) Miller, *J. Cancer*, 1998, 83, 1471-1482; (b) Altucci and Gronemeyer, *Nat. Reu. Cancer*, 2001, 1, 181-193; (c) Fontana and Rishi, *Leukemia*, 2002, 16, 463˜72; (d) Kuijpers et al., *Br. J. Dermalol.*, 1998, 139, 380-389; (e) Thacher et al., *J. Med. Chem.*, 2001, 44, 287-296.
14. Lotan et al., "Retinoids and apoptosis, implications for cancer chemoprevention and therapy", *J Nat'l Cancer Inst.* 1995, 87, 1655-1657.
15. Zouboulis, Retinoids, DRUG THERAPY IN DERMATOLOGY, Millikan, L. E., editor, New York: Marcel Dekker, 2000, 171-233.
16. Tsukada et al., "High albumin levels restrict the kinetics of 13-cis retinoic acid uptake and intracellular isomerization to all-trans retinoic acid and inhibit its anti-proliferative effect on SZ95 sebocytes", *Journal of Investigative Dermatology*, 2002, 119(1), 182-5.
17. Zouboulis, "Exploration of retinoid activity and the role of inflammation in acne: issues affecting future directions for acne therapy", *Journal of the European Academy of Dermatology and Venereology*, 2001, 15(Suppl 3), 63-7
18. (a) Mundi et al., *J. Blood*, 1992. 79, 299-303; (b) Mundi et al., *J. Cancer Res.*, 1992, 52, 2138-2142
19. Miller, *J. Cancer*, 1998, 83, 1471-1482
20. Njar, *Mmi-Rep. Mecl. Chem.*, 2002, 2, 261-269.
21. Njar et al., "Retinoic acid metabolism blocking agents (RAMBAs) for treatment of cancer and dermatological diseases". *Bioorg. Med. Chem.*, 2006, 14, (13), 4323-40.
22. Belosay et al., "Effects of novel retinoic acid metabolism blocking agent (VN/14-1) on letrozole-insensitive breast cancer cells", *Cancer Res.*, 2006, 66(23:), 11485-93; Patel et al., "Novel retinoic acid metabolism blocking agents have potent inhibitory activities on human breast cancer cells and tumour growth", *Br. J. Cancer*, 2007, 96 (8), 1204-15.
23. Huynh et al., "Inhibitory effects of retinoic acid metabolism blocking agents (RAMBAs) on the growth of human prostate cancer cells and LNCaP prostate tunour xenografts in SCID mice", *Br. J. Cancer*, 2006, 94, 513-523.

24. Patel et al., "Novel retinoic acid metabolism blocking agents endowed with multiple biological activities are efficient growth inhibitors of human breast and prostate cancer cells in vitro and a human breast tumor xenograft in nude nice", *J. Med. Chem.*, 2004, 47, 6716-6729.
25. Patel et al., "Novel retinoic acid metabolism blocking agents have potent inhibitory activities on human breast cancer cells and tumour growth", *Br. J. Cancer*, 2007, 96, 1204-1215.
26. Belosay et al., "Effects of novel retinoic acid metabolism blocking agent (VN/14-1) on letrozole-insensitive breast cancer cells", *Cancer Res.*, 2006, 66, 11485-11493.
27. Ramalingam et al., "First MNKs degrading agents block phosphorylation of eIF4E, induce apoptosis, inhibit cell growth, migration and invasion in triple negative and Her2-overexpressing breast cancer cell lines", *Oncotarget*, 2014, 5(2), 530-43.
28. Ramamurthy et al., "Simultaneous targeting of AR and MNK signaling pathways by novel retinamides induce profound anti-tumor and anti-invasive activities in human prostate cancer cell lines", *Oncotarget*, 2015, 6(5), 3195-210.
29. (a) Avdulov et al., "Activation of translation complex eIF4F is essential for the genesis and maintenance of the malignant phenotype in human mammary epithelial cells", *Cancer cell*, 2004, 5(6), 553-63; (b) Gebauer and Hentze, "Molecular mechanisms of translational control", *Nature Reviews, Molecular Cell Biology*, 2004, 5(10), 827-35; (c) Sonenberg and Hinnebusch, "Regulation of translation initiation in eukaryotes: mechanisms and biological targets", *Cell*, 2009, 136(4), 731-45.
30. (a) Nasr et al., "eIF4F suppression in breast cancer affects maintenance and progression", *Oncogene*, 2013, 32 (7), 861-71; (h) Robichaud et al., "Phosphorylation of eIF4E promotes EMT and metastasis via translational control of SNAIL and MMP-3". *Oncogene*, 2014; (c) Wendel et al., "Dissecting eIF4E action in tumorigenesis", *Genes & Development*, 2007, 21(24), 3232-7.
31. Mehta et al., "Metabolism of N-[4-hydroxyphenyl] retinamide (4-HPR) to N-[4-methoxyphenyl]retinamide (4-MPR) may serve as a biomarker for its efficacy against human breast cancer and melanoma cells", *Eur. J. Cancer*, 1998. 34, 902-907.
32. Silverman, THE ORGANIC CHEMISTRY OF DRUG DESIGN AND DRUG ACTION, San Diego: Academic Press, 1992, 1-422.
33. Bubert et al., "3,17-Disubstituted 2-Alkylestra-1,3,5 (10)-trien-3-ol Derivatives: Synthesis, In Vitro and In Vivo Anticancer Activity", *J. Med. Chem.*, 2007, 50, 4431-4443.
34. Leese et al., "A-ring-substituted estrogen-3-O-sulfamates: potent multitargeted anticancer agents", *J. Med. Chem.*, 2005, 48, 5243-5256.
35. Leese et al., "2-substituted estradiol bis-sulfamates multitargeted antitumor agents: synthesis, in vitro SAR, protein crystallography, and in vivo activity", *J. Med. Chem.*, 2006, 49, 7683-7696.
36. Day et al., "The effects of 2-substituted oestrogen sulphamates on the growth of prostate and ovarian cancer cells", *J. Steroid Biochem. Mol. Biol.*, 2003, 84, 317-325.
37. Stanway et al, "Phase I study of STX 64 (667 Coumate) in breast cancer patients: the first study of a steroid sulfatase inhibitor", *Clin. Cancer Res.*, 2006, 12, 1585-1592.
38. Woo et al., "Dual aromatase-steroid sulfatase inhibitors", *J. Med. Chem.*, 2007, 50, 3540-3560.
39. Frickel and Nuerrenbach, U.S. Pat. No. 4,459,404A (1984).
40. Boenoist et al., "Convenient and simplified approaches to N-momprotected triaminepropane derivatives: Key intermediates for bifunctional chelating agent", *Synthesis*, 1998, 1113-1118.
41. Yang et al., "Preparation of a fully substituted purine library", *J. Comb. Chem.*, 2005, 7, 474-482.
42. Gediya et al., "A new simple and high-yield synthesis of suberoylanilide hydroxamic acid and its inhibitory effect alone or in combination with retinoids on proliferation of human prostate cancer cells", *J. Med. Chem.*, 2005, 48, 5047-5051.
43. Gediya et al., "Improved synthesis of histone deacetylase inhibitors (HDACIs) (MS-275 and CI-994) and inhibitory effects of HDACIs alone and in combination with RAMBAs or retinoids on growth of human LNCaP prostate cancer cells and tumor xenografts", *Bioorg. Med Chem.*, 2008, 16(6), 3352-60.
44. Khandelwal et al., "Synergistic effects of MS-275 and VN/66-1 in a hormone-refractory prostate cancer model", submitted to *Cancer Research*, 2007
45. Njar et al., "Potent inhibition of retinoic acid metabolism enzyme(s) by novel azolyl retinoids", *Bioorg. Med. Chem. Lett.*, 2000, 10, 1905-1908.
46. Learmonth, U.S. Pat. No. 7,119,197B2 (2006).
47. O'Neill et al., "Enantiomeric 1,2,4-trioxanes display equivalent in vitro antimalarial activity versus *Plasmodium falciparum* malaria parasites: implications for the molecular mechanism of action of the artemisinins" *Chembiochem.*, 2005, 6, 2048-2054.
48. Njar, V. C. O., "High-yield synthesis of novel imidazoles and triazoles from alcohols and phenols", *Synthesis*, 2000, 14, 2019-2028.
49. Totleben et al., "Imidazole Transfer from 1,1'-Carbonyldiimidazole and 1,1'-(Thiocarbonyl)diimidazole to Alcohols. A New Protocol for the Conversion of Alcohols to Alkylheterocycles", *J. Org. Chem.*, 1997, 62, 7319-7323.
50. Dominguez et al., "Synthesis of enantipure C3- and C4-hydroxyretinals and their enzymatic reduction by ADH8 from *Xenopus laevis*", *Org. Biomol. Chem.*, 2006, 4, 155-164.
51. Tiecco et al., "A chiral electrophilic selenium reagent to promote the kinetic resolution of racemic allylic alcohols", *Org. Lett.*, 2004, 6, 4751-4753.
52. Yadav et al., "Ultrasound-accelerated synthesis of chiral allylic alcohols promoted by indium metal", *Tetrahedron*, 2003, 59, 55333-55336.
53. Kamal et al., "One-pot synthesis and resolution of chiral allylic alcohols", *Tetrehedron Asymmetry*, 2003, 14, 2839-2844.
54. Vedejs and MacKay, "A. Kinetic resolution of allylic alcohols using a chiral phosphine catalyst", *Org. Lett.*, 2001, 3, 535-536.
55. Fujima et al., "Synthesis of (S)-3-(N-methylamino)-1-(2-thienyl)propan-1-ol: Revisiting Eli Lilly's resolution-racemization-recycle synthesis of duloxetine for its robust processes", *Org. Process Res. Dev.*, 2006, 10, 905-913.
56. Frye et al., "Structure-activity relationships for inhibition of type 1 and 2 human 5 alpha-reductase and human adrenal 3 beta-hydroxy-delta 5-steroid dehydrogenase/3-keto-delta 5-steroid isomerase by 6-azaandrost-4-en-3-ones: optimization of the C17 substituent", *J. Med. Chem.*, 1995. 38, 2621-262.7.
57. Curley and Mershon, U.S. Pat. No. 6,696,606B2 (2004).
58. (a) Ramalingam et al., "First MNKs degrading agents block phosphorylation of eIF4E, induce apoptosis, inhibit cell growth, migration and invasion in triple negative and Her2-overexpressing breast cancer cell lines", *Oncotarget*, 2014, 5(2), 530-43; (b) Ramamurthy et al., "Simultaneous targeting of AR and MNK signaling pathways by novel retinamides induce profound anti-tumor and anti-invasive activities in human prostate cancer cell lines", *Oncotarget*, 2014, in press.
59. (a) Hu et al., "Synthesis, biological evaluation, and molecular modeling studies of methylene imidazole substituted biaryls as inhibitors of human 17alpha-hydroxylase-17,20-lyase (CYP17)—part II: Core rigidification and influence of substituents at the methylene bridge", *Bioorganic & Medicinal Chemistry*, 2008, 16(16), 7715-27; (b) Mahalingam et al., "Synthesis of rigidified eIF4E/eIF4G inhibitor-1 (4EGI-1) mimetic and their in vitro characterization as inhibitors of protein-protein interaction", *Journal of Medicinal Chemistry*, 2014, 57(12), 5094-111.
60. (a) Agranat et al., "Putting chirality to work: the strategy of chiral switches", *Nature Reviews, Drug Discovery*, 2002, 1(10), 753-68; (b) Caner et al., "Trends in the development of chiral drugs", *Drug Discovery Today*, 2004, 9(3), 105-10.
61. Poumay et al., "A simple reconstructed human epidermis: preparation of the culture model and utilization in in vitro studies", *Arch. Dermatol. Res.*, 2004, 296(5), 203-11.
62. Hsia et al., "Effects of topically applied acitretin in reconstructed human epidermis and the rhino mouse", *J. Invest. Dermatol.*, 2008, 128(1), 125-30.
63. Tsukada et al., "13-cis retinoic acid exerts its specific activity on human sebocytes through selective intracellular isomerization to all-trans retinoic acid and binding to retinoid acid receptors", *J. Invest. Dermatol.* 2000, 115(2), 321-7.
64. Nelson et al., "13-cis Retinoic acid induces apoptosis and cell cycle arrest in human SEB-1 sebocytes", *J. Invest. Dermatol.*, 2006, 126(10), 2178-89.
65. Ekholm and Egelrud, "Expression of stratum corneum chymotryptic enzyme in relation to other markers of epidermal differentiation in a skin explant model", *Exp. Dermatol.*, 2000, 9(1), 65-70.
66. Poumay et al., "High-cell-density phorbol ester and retinoic acid upregulate involucrin and down regulate suprabasal keratin 10 in autocrine cultures of human epidermal keratinocytes", *Mol. Cell Biol. Res. Comm'n.*, 1999, 2(2), 138-44.
67. Chapman, "Drug discovery: the leading edge", *Nature*, 2004, 430, 109-115.
68. Hoffmann et al., "Modeling of purine derivatives transport across cell membranes based on their partition coefficient determination and quantum chemical calculations", *J. Med. Chem.*, 2005, 48, 4482-4486.
69. Johnson and Thomas, "Therapeutic potential of purine analogue combinations in the treatment of lymphoid malignancies", *Hematol. Oncol.*, 2000, 18, 141-153.
70. Legraverend and Grierson, "The purines: potent and versatile small molecule inhibitors and modulators of key biological targets", *Bioorg. Med. Chem.*, 2006, 14, 3987-4006.
71. de Koning and Diallinas, "Nucleobase transporters (review)", *Mol. Membr. Biol.*, 2000, 17, 75-94.
72. Njar et al., "Retinoids in clinical use", *J. Med. Chem.*, 2006, 2(4), 431-438.
73. Boehncke et al., "Unmet Needs in the Field of Psoriasis: Pathogenesis and Treatment", *Clin. Rev. Allergy Immunol.*, 2018, 55(3), 295-311.
74. Boehncke et al., "Psoriasis", *Lancet*, 2015, 386(9997), 983-94.
75. Boehncke, "Systemic Inflammation and Cardiovascular Comorbidity in Psoriasis Patients: Causes and Consequences", *Front Immunol.*, 2018, 9, 579
76. Conrad et al., "Psoriasis: from Pathogenesis to Targeted Therapies", Clin. Rev. Allergy Immunol., 2018, 54(1), 102-13.
77. Buerger et al., "Epidermal mTORC1 Signaling Contributes to the Pathogenesis of Psoriasis and Could Serve as a Therapeutic Target", *Front Immunol.*, 2018, 9, 2786.
78. Shaw et al., "Eczema prevalence in the United States: data from the 2003 National Survey of Children's Health", *J. Invest. Dermatol.*, 2011, 131(1), 67-73.
79. Silverberg et al., "Adult eczema prevalence and associations with asthma and other health and demographic factors: a US population-based study", *J. Allergy Clin. Immunol.*, 2013, 132(5), 1132-8.
80. Margolis et al., "Persistence of mild to moderate atopic dermatitis", *JAMA Dermatol.*, 2014, 150(6), 593-600.
81. Drucker et al., "The Burden Atopic Dermatitis: Summary of a Report for the National Eczema Association", *J. Invest. Dermatol.*, 2017, 137(1), 26-30.
82. Chong et al., "Treatment of Eczema: Corticosteroids and Beyond", *Clin. Rev. Allergy Immunol.*, 2016, 51(3), 249-62.
83. Oji et al., "Revised nomenclature and classification of inherited ichthyoses: results of the First Ichthyosis Consensus Conference in Soreze 2009", *J. Am. Acad. Dermatol.*, 2010, 63(4), 607-41.
84. Vahlquist et al., "Congenital ichthyosis: an overview of current and emerging therapies", *Acta Derm. Venereol.*, 2008, 88(1), 4-14.
85. Hernandez-Martin et al., "Prevalence of autosomal recessive congenital ichthyosis: a population-based study using the capture-recapture method in Spain", *J. Am. Acad. Dermatol.*, 2012, 67(2), 240-4.
86. Oji et al., "Ichthyoses: Differential diagnosis and molecular genetics", *Eur. J. Dermatol.*, 2006, 16(4), 349-59.
87. Ganemo et al., "Quality of life in adults with congenital ichthyosis", *J. Adv. Nurs.*, 2003, 44(4), 412-9.
88. Kamalpour et al., "Resource utilization and quality of life associated with congenital ichthyoses", *Pediatr. Dermatol.*, 2011, 28(5), 512-8.
89. Vahlquist A et al., "Oral liarozole in the treatment of patients with moderate/severe lamellar ichthyosis: results of a randomized, double-blind, multinational, placebo-controlled phase II/III trial", *Br. J. Dermatol.*, 2014, 170(1), 173-81.
90. Christenson et al., "Incidence of basal cell and squamous cell carcinomas in a population younger than 40 years", *JAMA*, 2005, 294(6), 681-90.
91. Marzuka et al., "Basal cell carcinoma: pathogenesis, epidemiology, clinical features, diagnosis, histopathology, and management", *Yale J. Biol. Med.*, 2015, 88(2), 167-79.
92. Han et al., "Clinical Significance of Eukaryotic Initiation Factor 4E (eIF4E) Level among Cases Suffering Basal Cell Carcinoma of Skin", *Med. Sci. Monit.*, 2019, 25, 7936-41.
93. Salehi et al., "Significance of eIF4E expression in skin squamous cell carcinoma", *Cell Biol/Int.*, 2007, 31(11), 1400-4.
94. Zhan et al., "The role of eIF4E in response and acquired resistance to vemurafenib in melanoma", *J. Invest. Dermatol.*, 2015, 135(5), 1368-76.

95. Kwegyir-Afful et al., "Galeterone and the next generation galeterone analogs, VNPP414 and VNPP433-3β exert potent therapeutic effects in castration-/drug-resistant prostate cancer preclinical models in vitro and in vivo", Cancers, 2019 11(11), 1637-1655.
96. Bissantz et al., "A medicinal chemist's guide to molecular interactions", J. Med. Chem., 2010, 53(14), 5061-5084.
7. Purushottamachar et al., "Systematic structure modifications of multitarget prostate cancer drug candidate galeterone to produce novel androgen receptor down-regulating agents as an approach to treatment of advanced prostate cancer", J. Med. Chem., 2013, 56(12), 4880-4898.
98. Clamon et al. "Phase I study and pharmacokinetics of weekly high-dose 13-cis-retinoic acid", Cancer Res., 1985, 45(4), 1874-8.
99. Reynolds et al., "Retinoid therapy of high-risk neuroblastoma", Cancer Letters, 2003, 197, 185-192.
100. Veal et al., "Pharmacokinetics and metabolism of 13-cis-retinoic acid (isotretinoin) in children with high-risk neuroblastoma—a study of the United Kingdom Children's Cancer Study Group", British Journal of Cancer, 2007, 96 (3), 424-31.
101. Marill et al., "Human cytochrome P450s involved in the metabolism of 9-cis- and 13-cis-retinoic acids", Biochem. Pharmacol., 2002, 63 (5), 933-43.
102. Johnson et al., "Synthesis and Characterization of a Highly Potent and Effective Antagonist of Retinoic Acid Receptors", J. Med. Chem., 1995, 38, 4764-7.
103. Zaveri et al., "Novel α3β4 Nicotinic Acetylcholine Receptor-Selective Ligands Discovery, Structure-Activity Studies, and Pharmacological Evaluation", J. Med. Chem., 2010, 53, 8187-8191.

The invention claimed is:

1. A method of treating a dermatological condition involving abnormal keratinization, comprising:
administering a pharmaceutical composition comprising a therapeutically effective amount of a first compound having the following General Formula 1A:

[General Formula 1A]

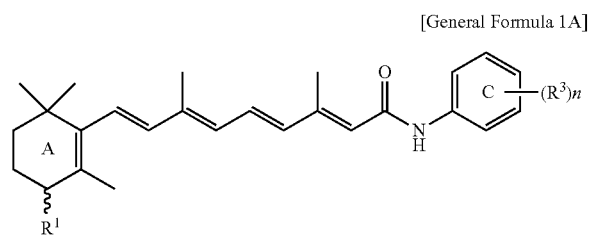

wherein $R^1$ is an azole group,
$R^3$ is a halogen group, a cyano group, a thiol group, or an alkyl group substituted with at least one substituent selected from the group consisting of a halogen group, a cyano group, and a thiol group, and
n is an integer from 0 to 5, and
wherein the method further comprises administering a second compound selected from the group consisting of all-trans-retinoic acid, 13-cis-retinoic acid, and 9-cis-retinoic acid,
wherein the therapeutically effective amount of the first compound potentiates inhibition of keratinocytes by the second compound.

2. The method according to claim 1, wherein the first compound inhibits sebocytes.

3. The method according to claim 2, wherein the first compound has the following General Formula 1A':

[General Formula 1A']

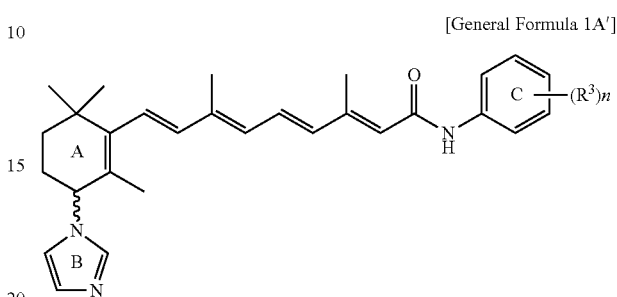

wherein $R^3$ is a halogen group, a cyano group, a thiol group, or an alkyl group substituted with at least one substituent selected from the group consisting of a halogen group, a cyano group, and a thiol group, and
n is an integer from 0 to 5.

4. The method according to claim 3, wherein $R^3$ is a halogen group, and n is an integer from 1 to 5.

5. The method according to claim 4, wherein the first compound is Compound VNLG-152 having the following formula:

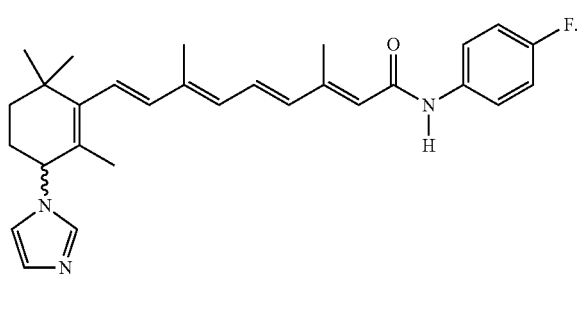 [SMILES: CC1=C(/C=C/C(C)=C/C=C/C(C)=C/C(=O)Nc2ccc(F)cc2)C(C)(C)CCC1n1ccnc1]

6. The method according to claim 1, wherein the dermatological condition is one selected from the group consisting of acne, eczema, psoriasis, ichthyosis, a cold sore, a wound, a burn, a sunburn and a skin cancer.

7. The method according to claim 6, wherein the dermatological condition is acne.

8. The method according to claim 1, wherein the second compound is all-trans-retinoic acid.

9. The method according to claim 1, wherein the second compound is 13-cis-retinoic acid.

10. The method according to claim 1, the method further comprising administering a third compound having the following General Formula 6:

[General Formula 6]

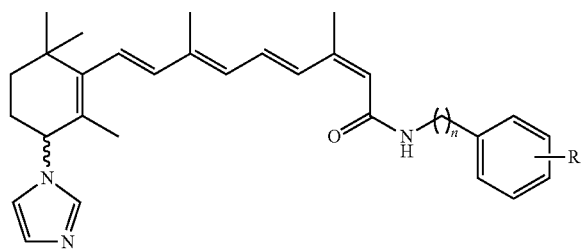

wherein R is OH, CO$_2$Me, imidazole, or 1H-tetrazole, and n is an integer from 1 to 6.

11. The method according to claim 10, wherein the third compound is Compound VNHM-1-73 having the following formula:

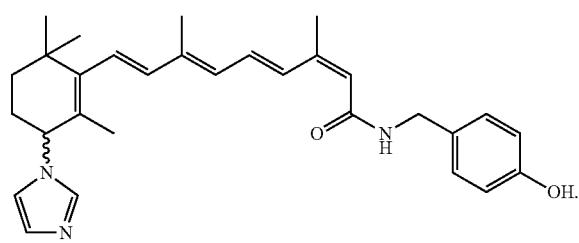 [SMILES: CC1=C(/C=C/C(C)=C/C=C/C(C)=C\C(=O)NCc2ccc(O)cc2)C(C)(C)CCC1n1ccnc1]

12. A method of treating a dermatological condition involving abnormal keratinization, comprising:
administering a pharmaceutical composition comprising a therapeutically effective amount of a first compound having the following General Formula 7:

[General Formula 7]

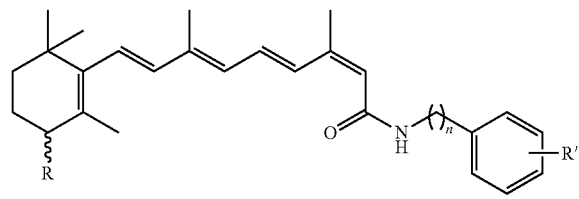

wherein R is a heteroaryl group,
R' is a hydrogen, a halogen group, a hydroxyl group, an alkyl group, an ester group, an ether group, a benzyl group, a thio group, a Weinreb amide group, or a heterocyclic group, and
n is an integer from 0 to 6, and
wherein the method further comprises administering a second compound selected from the group consisting of all-trans-retinoic acid, 13-cis-retinoic acid, and 9-cis-retinoic acid,
wherein the therapeutically effective amount of the first compound potentiates inhibition of keratinocytes by the second compound.

13. The method according to claim 12, wherein the first compound has the following General Formula 6:

[General Formula 6]

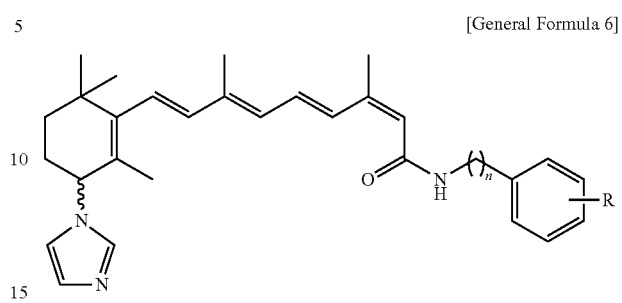

wherein R is OH, CO$_2$Me, imidazole, or 1H-tetrazole, and n is an integer from 1 to 6.

14. The method according to claim 13, wherein R is OH.

15. The method according to claim 14, wherein the first compound is Compound VNHM-1-73 having the following formula:

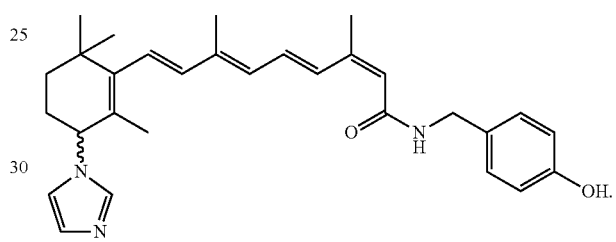

16. The method according to claim 12, wherein the dermatological condition is one selected from the group consisting of acne, eczema, psoriasis, ichthyosis, a cold sore, a wound, a burn, a sunburn and a skin cancer.

17. The method according to claim 16, wherein the dermatological condition is acne.

18. The method according to claim 12, wherein the second compound is all-trans-retinoic acid.

19. The method according to claim 12, wherein the second compound is 13-cis-retinoic acid, and 9 cis retinoic acid.

20. The method according to claim 12, the method further comprising administering Compound VNLG-having the following formula:

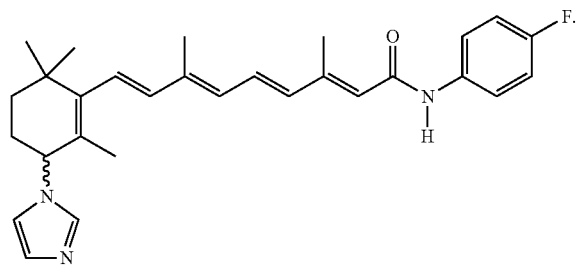 [SMILES: CC1=C(/C=C/C(C)=C/C=C/C(C)=C/C(=O)Nc2ccc(F)cc2)C(C)(C)CCC1n1ccnc1]

* * * * *